US012680709B2

(12) United States Patent
Green et al.

(10) Patent No.: US 12,680,709 B2
(45) Date of Patent: Jul. 14, 2026

(54) REFRIGERANT LEAK DETECTION AND MITIGATION SYSTEM AND METHOD

(71) Applicant: Gina Deborah Morse, Decatur, TX (US)

(72) Inventors: Kenneth Ray Green, Crossroads, TX (US); Douglas Hiram Morse, Decatur, TX (US)

( * ) Notice: Subject to any disclaimer, the term of this patent is extended or adjusted under 35 U.S.C. 154(b) by 395 days.

(21) Appl. No.: 18/382,580

(22) Filed: Oct. 23, 2023

(65) Prior Publication Data

US 2024/0093892 A1 Mar. 21, 2024

Related U.S. Application Data

(63) Continuation-in-part of application No. 17/734,406, filed on May 2, 2022, now Pat. No. 11,796,200,
(Continued)

(51) Int. Cl.
| | |
|---|---|
| *F24F 11/36* | (2018.01) |
| *F24F 11/526* | (2018.01) |
| *F24F 11/58* | (2018.01) |
| *F24F 11/84* | (2018.01) |
| *G05B 23/02* | (2006.01) |
(Continued)

(52) U.S. Cl.
CPC ............ *F24F 11/36* (2018.01); *F24F 11/526* (2018.01); *F24F 11/58* (2018.01); *F24F 11/84* (2018.01); *G05B 23/027* (2013.01); *F24F 11/52* (2018.01); *F24F 2110/10* (2018.01);
(Continued)

(58) Field of Classification Search
CPC .......... F24F 11/36; F24F 11/526; F24F 11/58; F24F 11/84; F24F 11/52; F24F 2110/10; F24F 2110/20; F24F 2110/65; G05B 23/027; G05B 2219/2654; G05B 19/042; F25B 2500/22; F25B 2500/222; F25B 2700/2115; F25B 2700/21174; F25B 49/005; F25B 2700/02; F25B 2700/2116;
(Continued)

(56) References Cited

U.S. PATENT DOCUMENTS

| | | | | |
|---|---|---|---|---|
| 2005/0086952 A1* | 4/2005 | Nonaka | ................. | F25D 11/022 62/129 |
| 2009/0044550 A1* | 2/2009 | Nishimura | ............ | F25B 49/005 62/149 |
| 2009/0107157 A1* | 4/2009 | Dube | .................... | F25B 49/005 62/149 |

* cited by examiner

*Primary Examiner* — Michael J Brown
(74) *Attorney, Agent, or Firm* — Kevin Mark Klughart

(57) ABSTRACT

A refrigerant leak detection (RLD) and/or mitigation/containment (RLM/RLC) system/method for use in heating, ventilation, and air conditioning (HVAC) systems that incorporates a plurality of temperature and/or humidity sensors (THS), alarm status indicator (ASI), and digital control processor (DCP) is disclosed. The THS are positioned within the HVAC system (condenser coils (HCC), evaporator coils (HEC), air intake fans (AIF), air supply plenums (ASP), air return plenums (ARP), and/or temperature controlled environment (TCE)) and reports THS temperature readings to the DCP via a common temperature sensor bus (TSB) and/or a wireless temperature interface (WTI). The DCP interprets THS temperature readings in a closed control loop (CCL) to dynamically determine if a refrigerant leak has occurred within the HVAC system. If a leak is detected, the DCP activates the ASI and optionally one or more refrigerant control valves (RCV) is closed to limit refrigerant leakage in the HVAC system.

20 Claims, 64 Drawing Sheets

Related U.S. Application Data which is a continuation of application No. 16/855,238, filed on Apr. 22, 2020, now Pat. No. 11,326,798, which is a continuation-in-part of application No. 16/747,422, filed on Jan. 20, 2020, now Pat. No. 11,428,448, and a continuation-in-part of application No. 16/580,717, filed on Sep. 24, 2019, now abandoned, and a continuation-in-part of application No. 15/902,452, filed on Feb. 22, 2018, now abandoned.

(60) Provisional application No. 62/938,132, filed on Nov. 20, 2019, provisional application No. 62/886,020, filed on Aug. 13, 2019, provisional application No. 62/854,676, filed on May 30, 2019, provisional application No. 62/750,383, filed on Oct. 25, 2018, provisional application No. 62/462,570, filed on Feb. 23, 2017.

(51) Int. Cl.

| | |
|---|---|
| *F24F 11/52* | (2018.01) |
| *F24F 110/10* | (2018.01) |
| *F24F 110/20* | (2018.01) |
| *F24F 110/65* | (2018.01) |

(52) U.S. Cl.
CPC ....... *F24F 2110/20* (2018.01); *F24F 2110/65* (2018.01); *F25B 2500/22* (2013.01); *F25B 2500/222* (2013.01)

(58) Field of Classification Search
CPC .... F25B 2700/21162; F25B 2700/2117; F25B 2700/21175
USPC ........................................................ 700/278
See application file for complete search history.

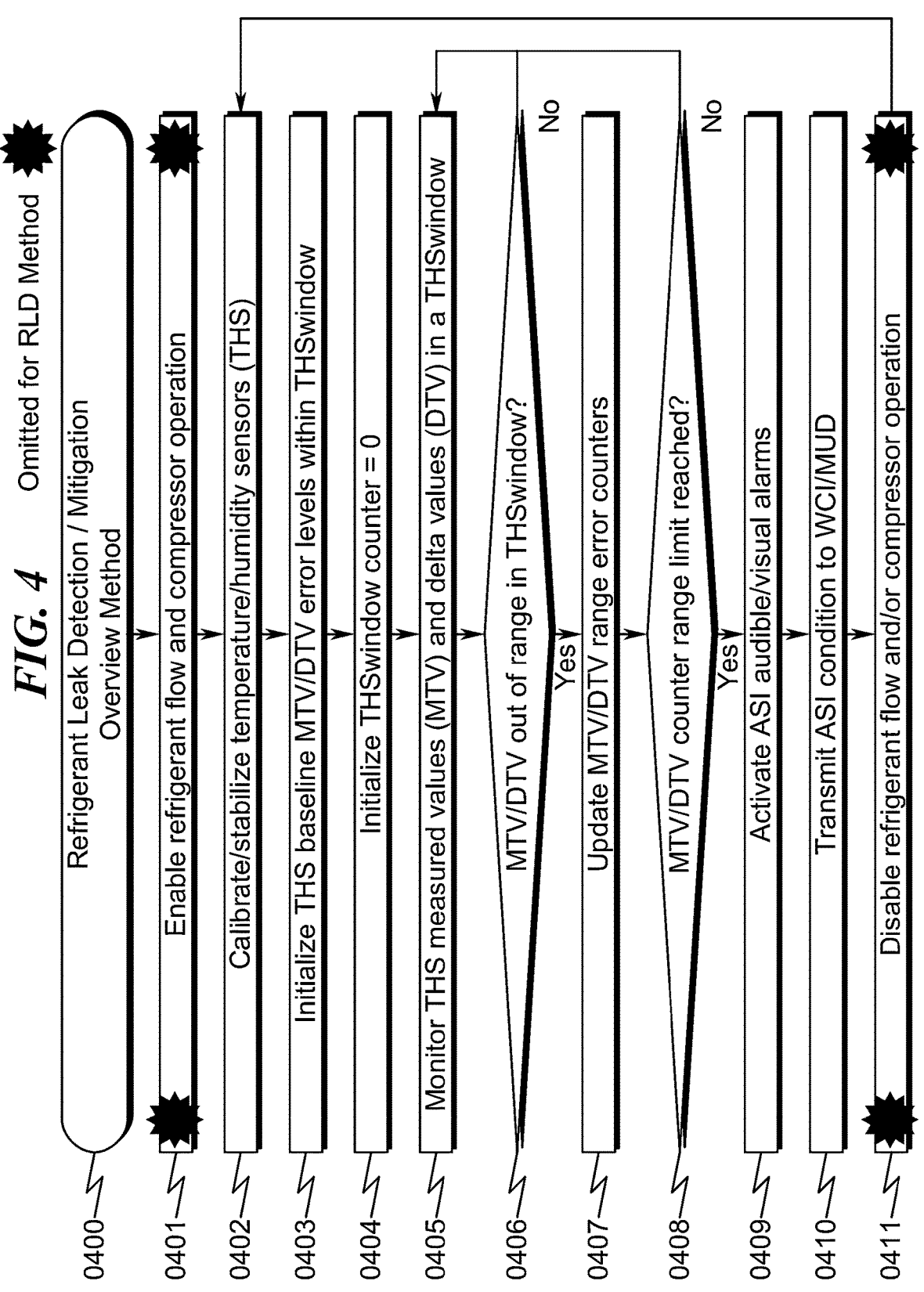

*FIG. 4*

Refrigerant Leak Detection / Mitigation Overview Method

0400 — Omitted for RLD Method

0401 — Enable refrigerant flow and compressor operation

0402 — Calibrate/stabilize temperature/humidity sensors (THS)

0403 — Initialize THS baseline MTV/DTV error levels within THSwindow

0404 — Initialize THSwindow counter = 0

0405 — Monitor THS measured values (MTV) and delta values (DTV) in a THSwindow

0406 — MTV/DTV out of range in THSwindow? No / Yes

0407 — Update MTV/DTV range error counters

0408 — MTV/DTV counter range limit reached? No / Yes

0409 — Activate ASI audible/visual alarms

0410 — Transmit ASI condition to WCI/MUD

0411 — Disable refrigerant flow and/or compressor operation

*FIG. 5*

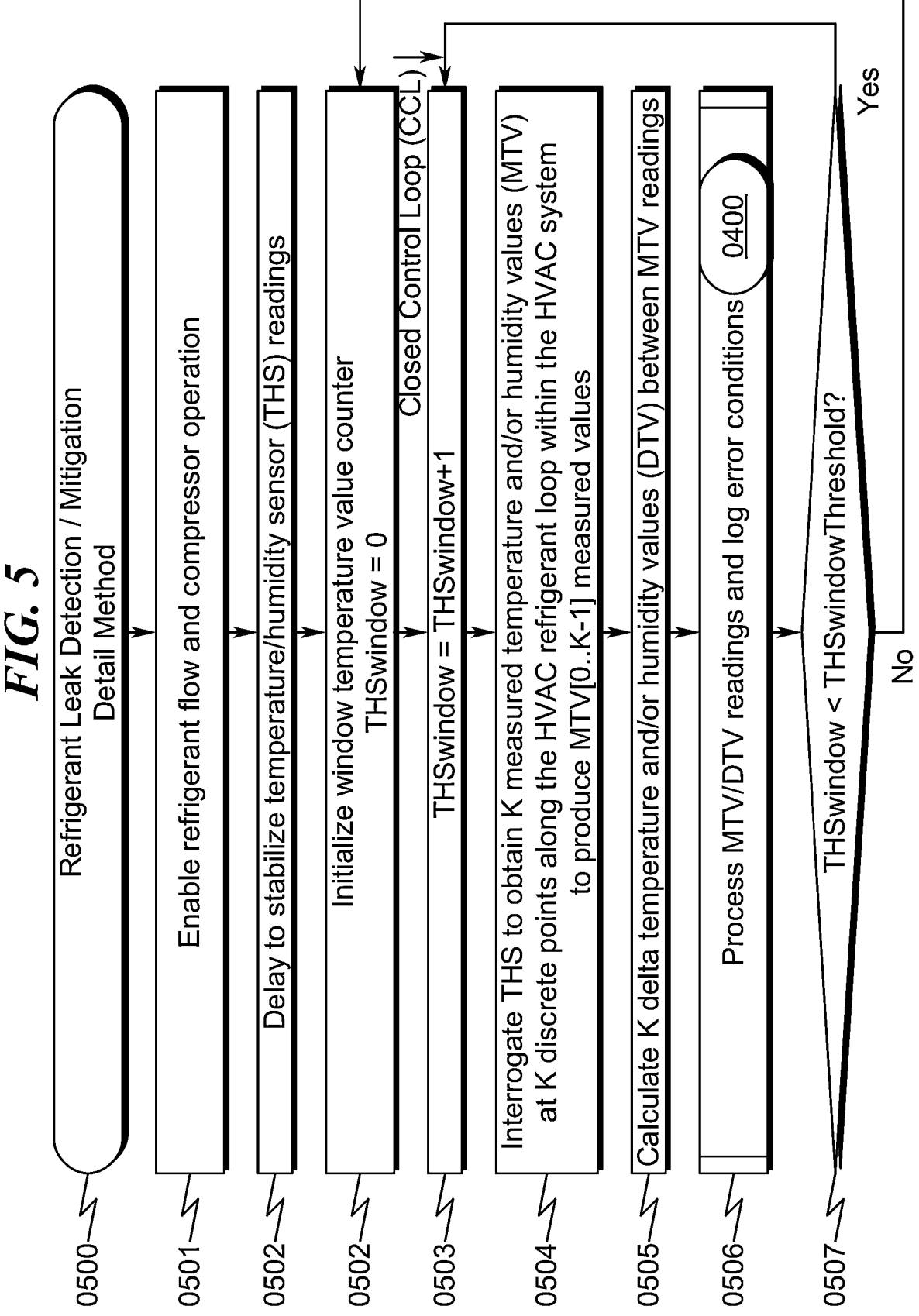

Refrigerant Leak Detection / Mitigation Detail Method — 0500

Enable refrigerant flow and compressor operation — 0501

Delay to stabilize temperature/humidity sensor (THS) readings — 0502

Initialize window temperature value counter THSwindow = 0 — 0502

Closed Control Loop (CCL)

THSwindow = THSwindow+1 — 0503

Interrogate THS to obtain K measured temperature and/or humidity values (MTV) at K discrete points along the HVAC refrigerant loop within the HVAC system to produce MTV[0..K-1] measured values — 0504

Calculate K delta temperature and/or humidity values (DTV) between MTV readings — 0505

Process MTV/DTV readings and log error conditions    0400 — 0506

THSwindow < THSwindowThreshold? — 0507

Yes

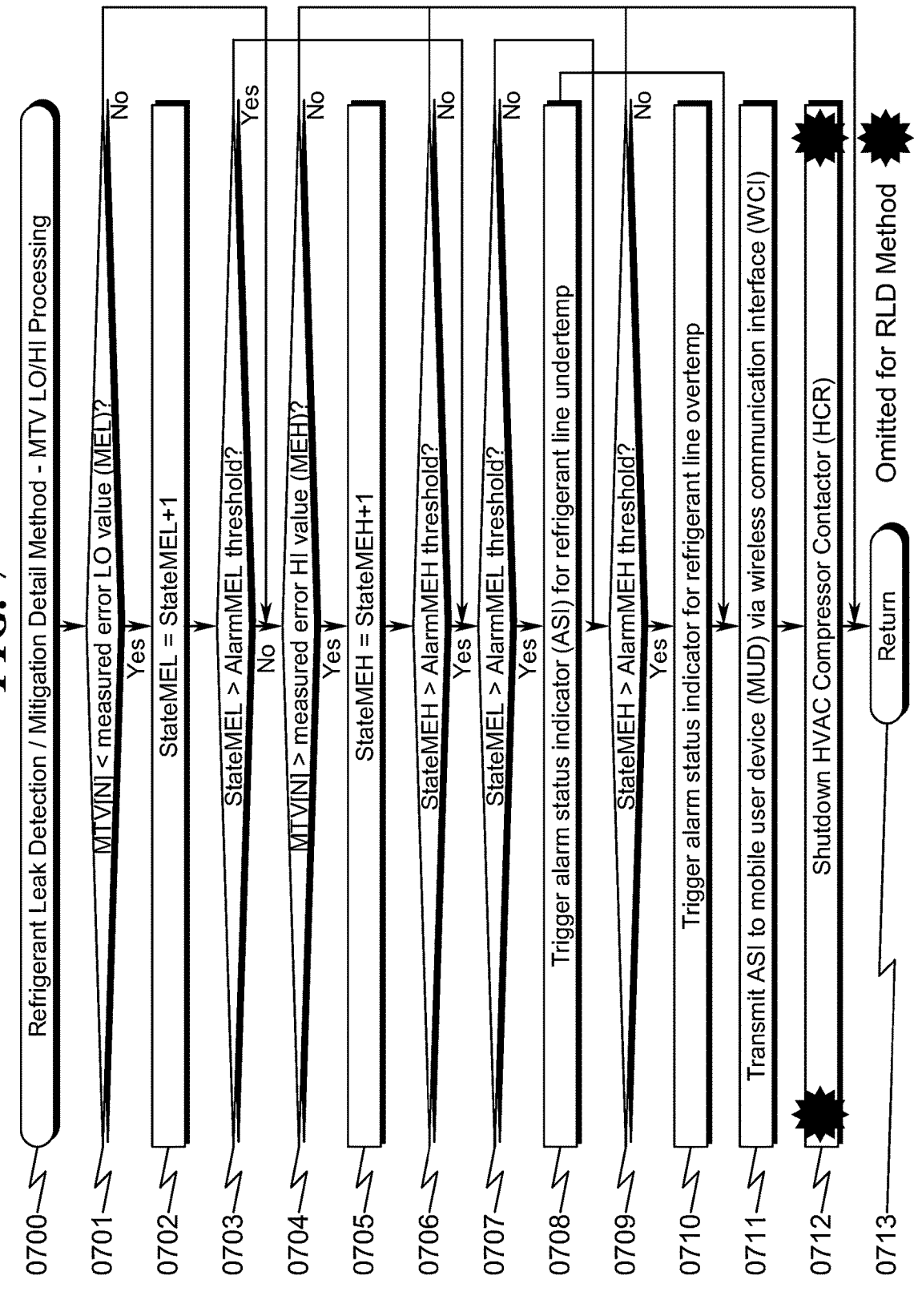

0700 — Refrigerant Leak Detection / Mitigation Detail Method - MTV LO/HI Processing 0701 — |MTV[N]| < measured error LO value (MEL)?  Yes / No 0702 — StateMEL = StateMEL+1

0703 — StateMEL > AlarmMEL threshold?  Yes / No

0704 — |MTV[N]| > measured error HI value (MEH)?  Yes / No

0705 — StateMEH = StateMEH+1

0706 — StateMEH > AlarmMEH threshold?  Yes / No

0707 — StateMEL > AlarmMEL threshold?  Yes / No

0708 — Trigger alarm status indicator (ASI) for refrigerant line undertemp

0709 — StateMEH > AlarmMEH threshold?  Yes / No

0710 — Trigger alarm status indicator for refrigerant line overtemp

0711 — Transmit ASI to mobile user device (MUD) via wireless communication interface (WCI)

0712 — Shutdown HVAC Compressor Contactor (HCR)

0713 — Return

Omitted for RLD Method

FIG. 8

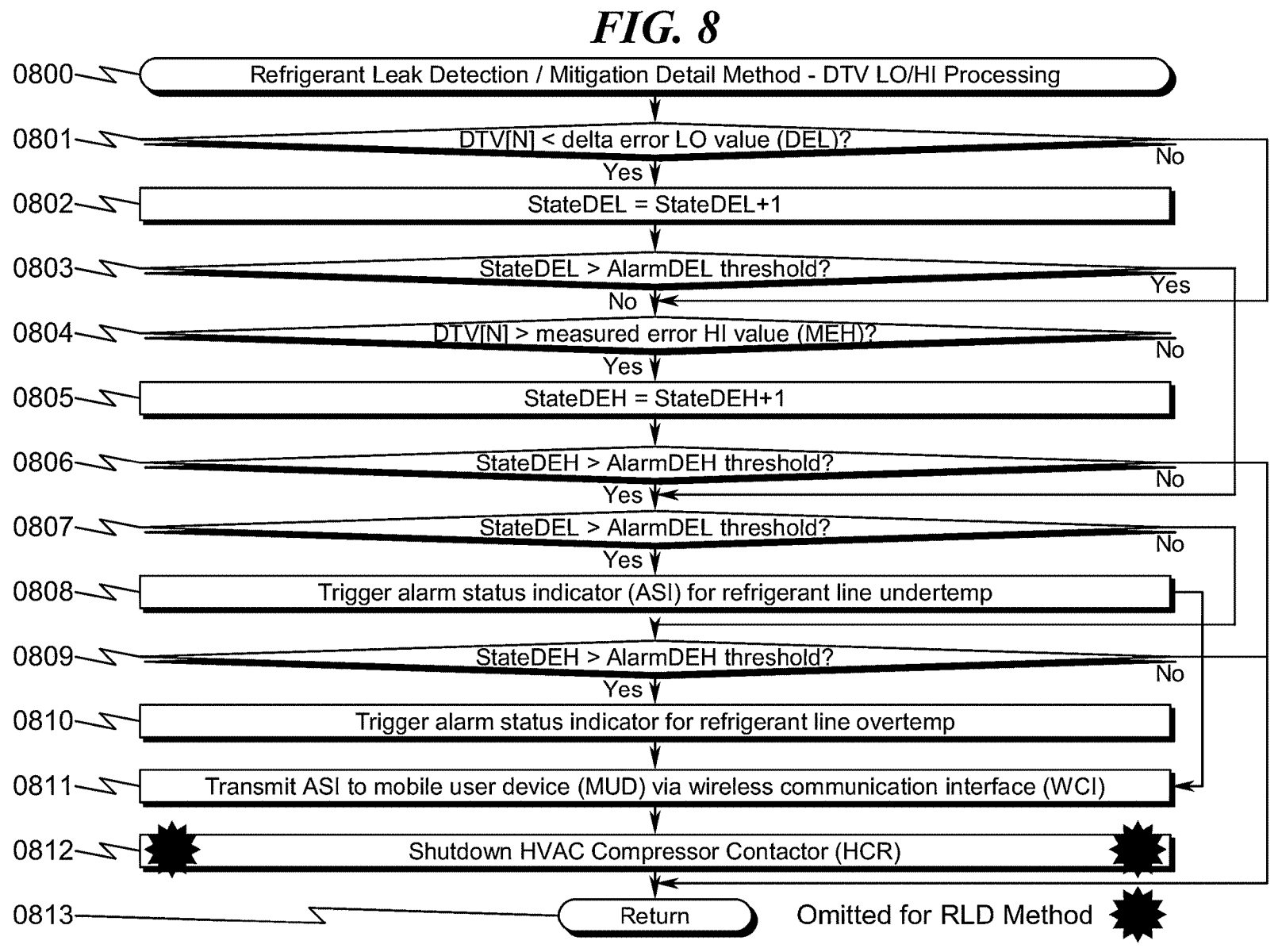

0800 — Refrigerant Leak Detection / Mitigation Detail Method - DTV LO/HI Processing 0801 — DTV[N] < delta error LO value (DEL)?   No / Yes 0802 — StateDEL = StateDEL+1

0803 — StateDEL > AlarmDEL threshold?   Yes / No

0804 — DTV[N] > measured error HI value (MEH)?   No / Yes

0805 — StateDEH = StateDEH+1

0806 — StateDEH > AlarmDEH threshold?   No / Yes

0807 — StateDEL > AlarmDEL threshold?   No / Yes

0808 — Trigger alarm status indicator (ASI) for refrigerant line undertemp

0809 — StateDEH > AlarmDEH threshold?   No / Yes

0810 — Trigger alarm status indicator for refrigerant line overtemp

0811 — Transmit ASI to mobile user device (MUD) via wireless communication interface (WCI)

0812 — Shutdown HVAC Compressor Contactor (HCR)

Omitted for RLD Method

0813 — Return

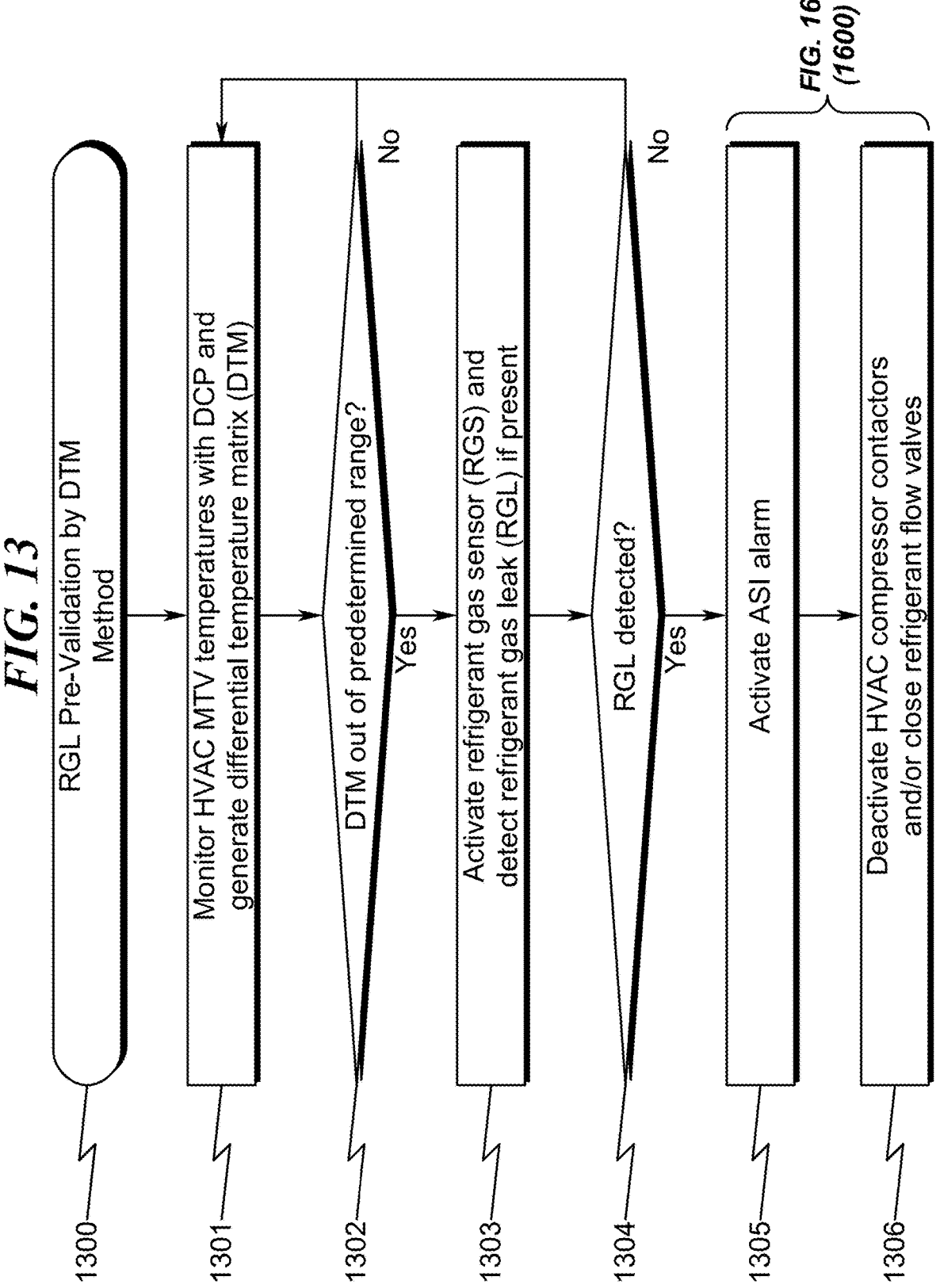

*FIG. 13*

1300 — RGL Pre-Validation by DTM Method

1301 — Monitor HVAC MTV temperatures with DCP and generate differential temperature matrix (DTM)

1302 — DTM out of predetermined range? No / Yes

1303 — Activate refrigerant gas sensor (RGS) and detect refrigerant gas leak (RGL) if present 1304 — RGL detected? No / Yes 1305 — Activate ASI alarm 1306 — Deactivate HVAC compressor contactors and/or close refrigerant flow valves

*FIG. 16 (1600)*

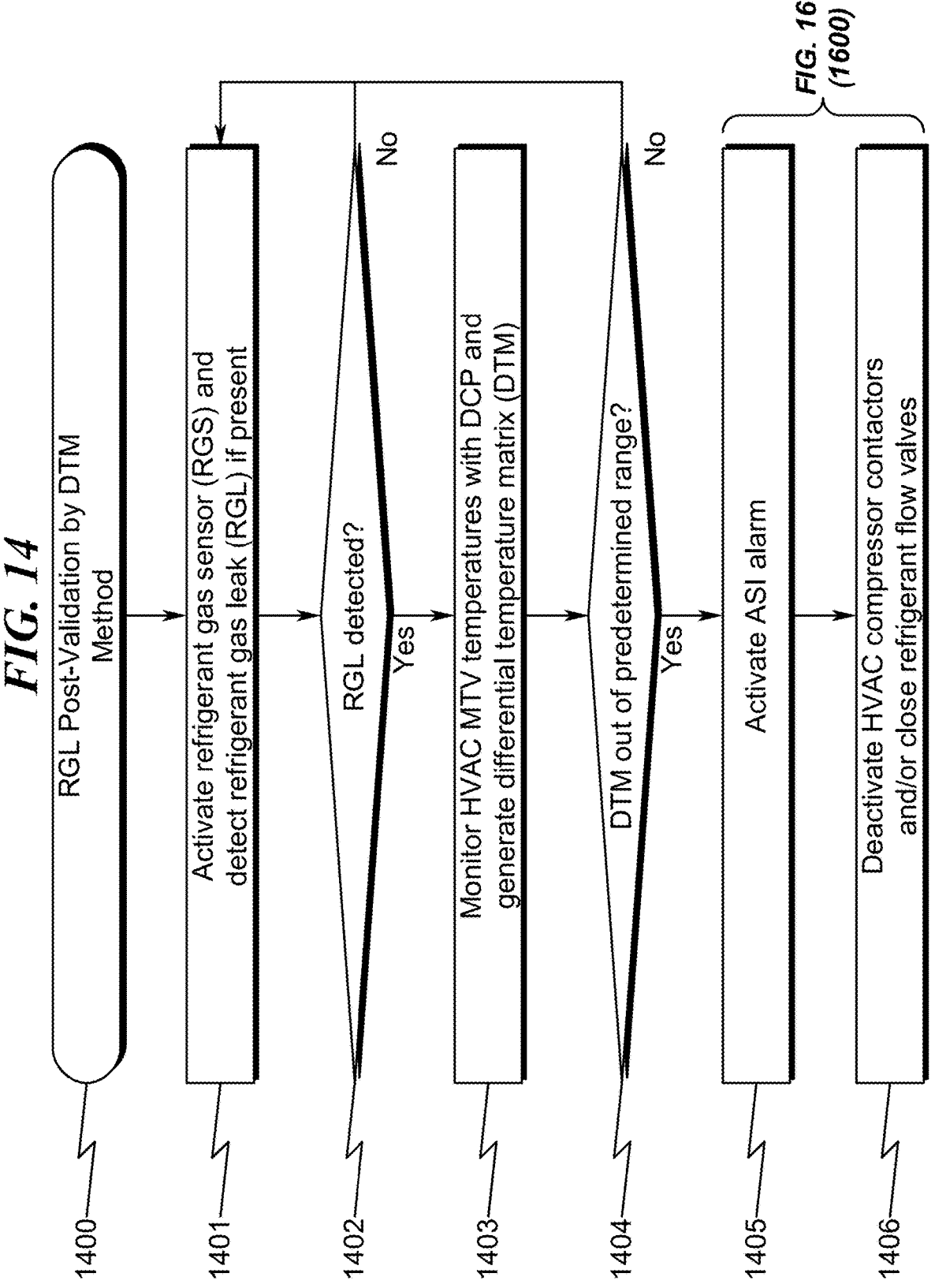

FIG. 14

1400 — RGL Post-Validation by DTM Method

1401 — Activate refrigerant gas sensor (RGS) and detect refrigerant gas leak (RGL) if present 1402 — RGL detected? — No / Yes 1403 — Monitor HVAC MTV temperatures with DCP and generate differential temperature matrix (DTM)

1404 — DTM out of predetermined range? — No / Yes

1405 — Activate ASI alarm

1406 — Deactivate HVAC compressor contactors and/or close refrigerant flow valves

FIG. 16 (1600)

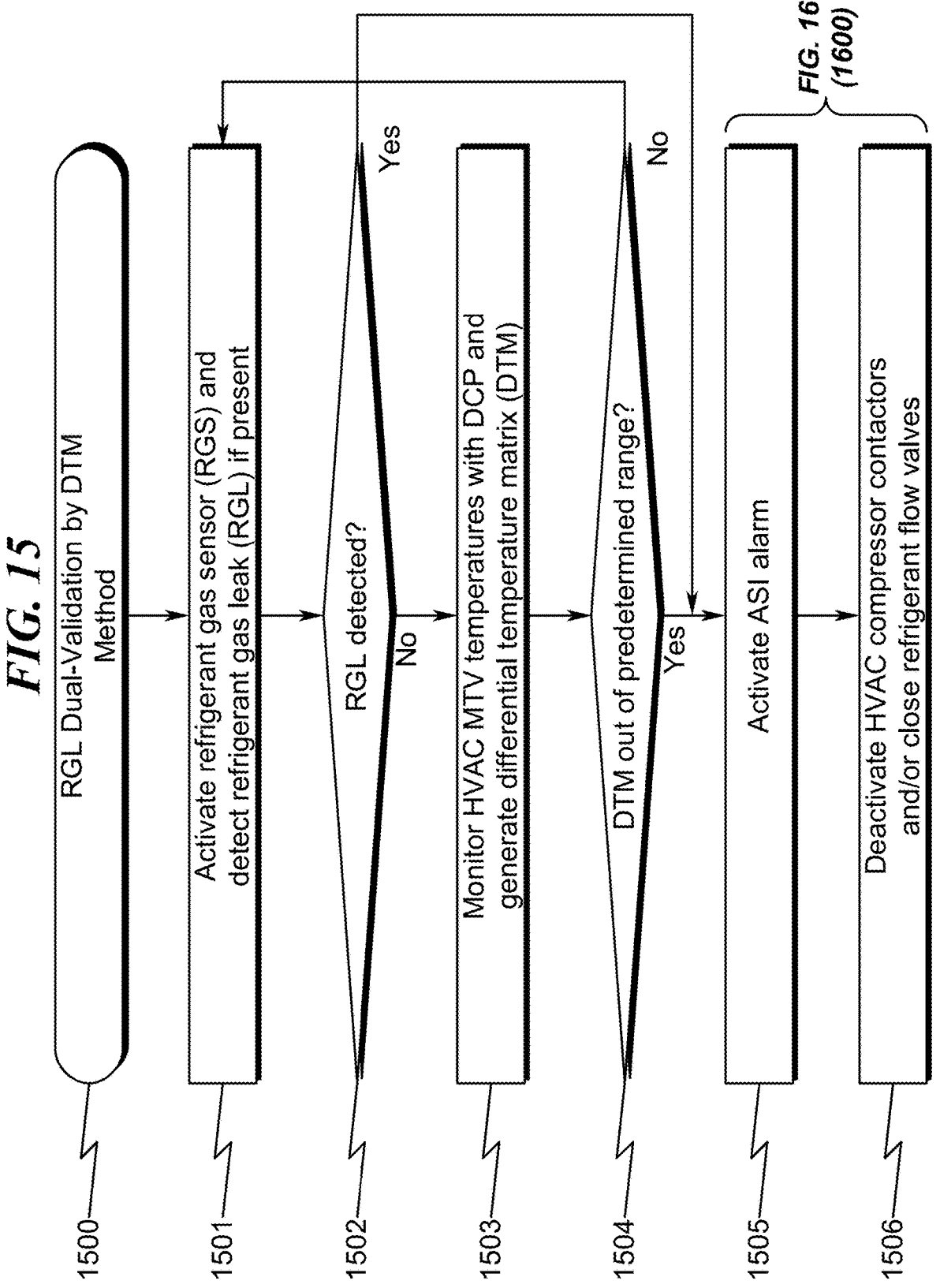

FIG. 15

1500 — RGL Dual-Validation by DTM Method

1501 — Activate refrigerant gas sensor (RGS) and detect refrigerant gas leak (RGL) if present 1502 — RGL detected?

1503 — Monitor HVAC MTV temperatures with DCP and generate differential temperature matrix (DTM)

1504 — DTM out of predetermined range?

1505 — Activate ASI alarm

1506 — Deactivate HVAC compressor contactors and/or close refrigerant flow valves Yes No No Yes

FIG. 16 (1600)

1600 — Alarm Mode Method

1601 — De-Energize compressor RELAY

1602 — Close SVS & SVL valves

1603 — Open T1/T2 HVAC fan contacts

1604 — Enable audible alarm

1605 — Fast flash LED

1606 — Output message to WIRELESS port

1607 — Wait for system reset

1800

2000

2100

2200

2300

2400

2600

2700

2800

2900

3000

3100

3200

3300

3400

*FIG. 35*
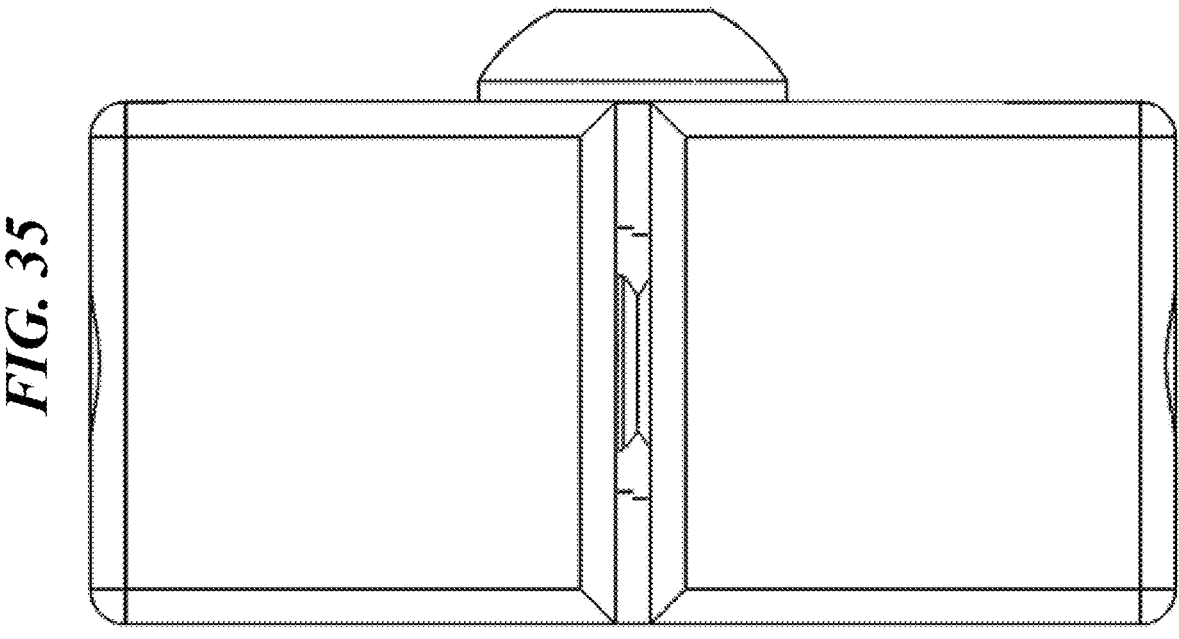
3500

3600

*FIG. 37*
3700
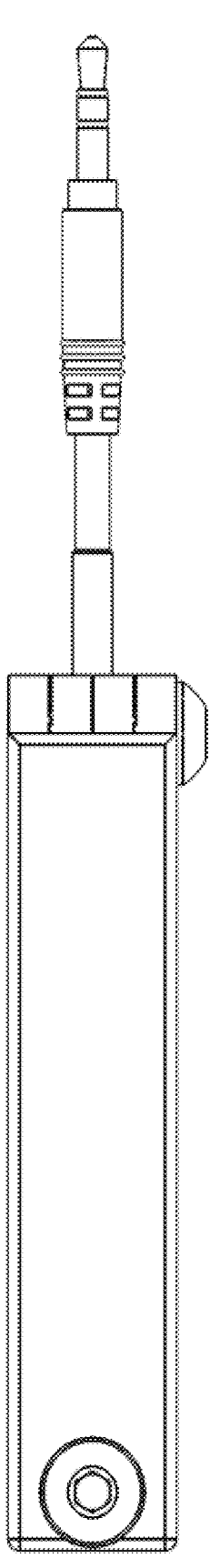

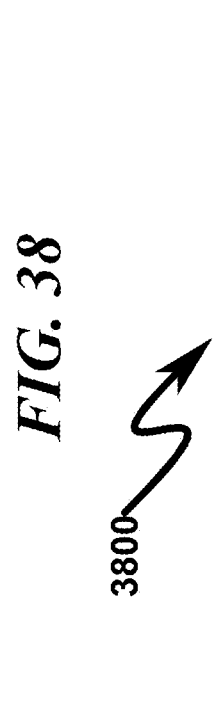
*FIG. 38*
3800
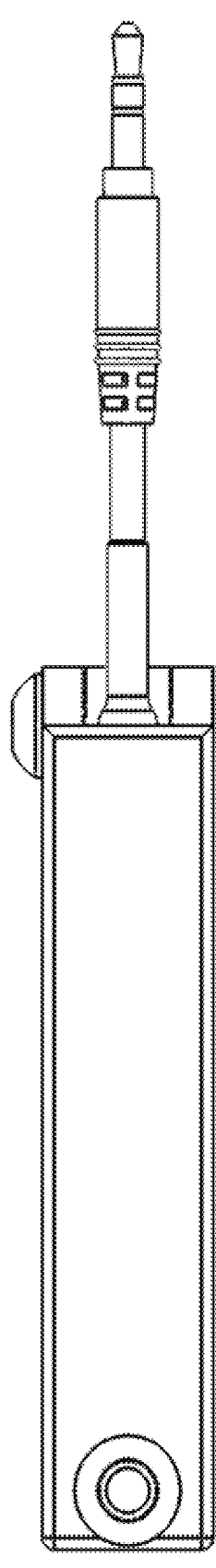

3900

4100

4200

4300

4400

4500

4700

4800

4900

5000

*FIG. 51*
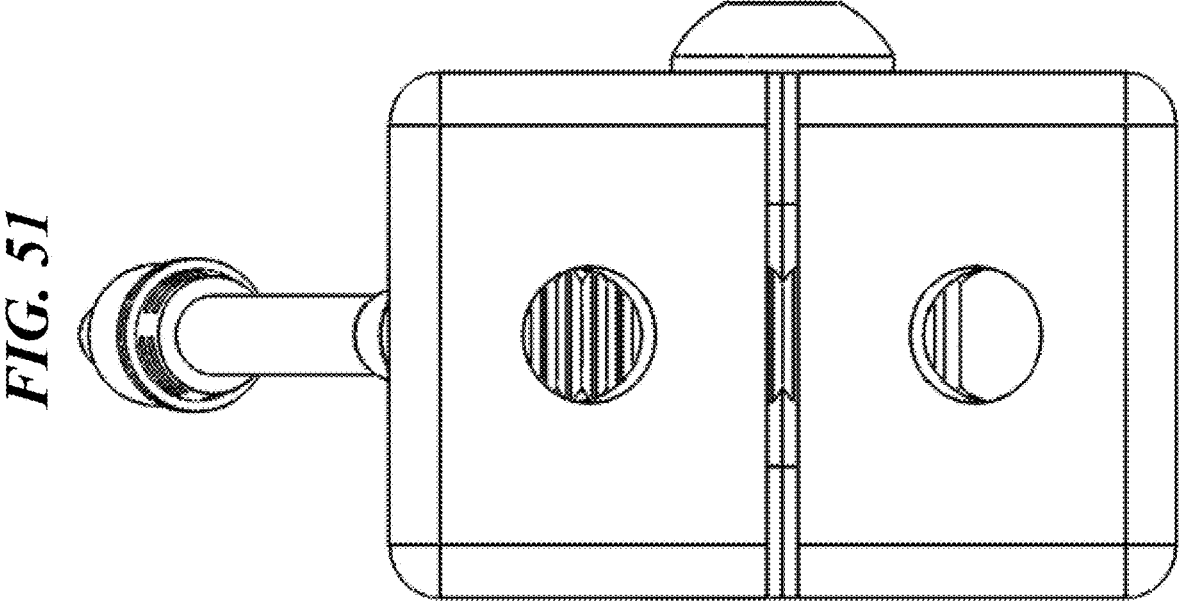
5100

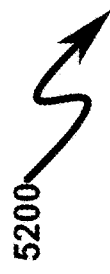
*FIG. 52*
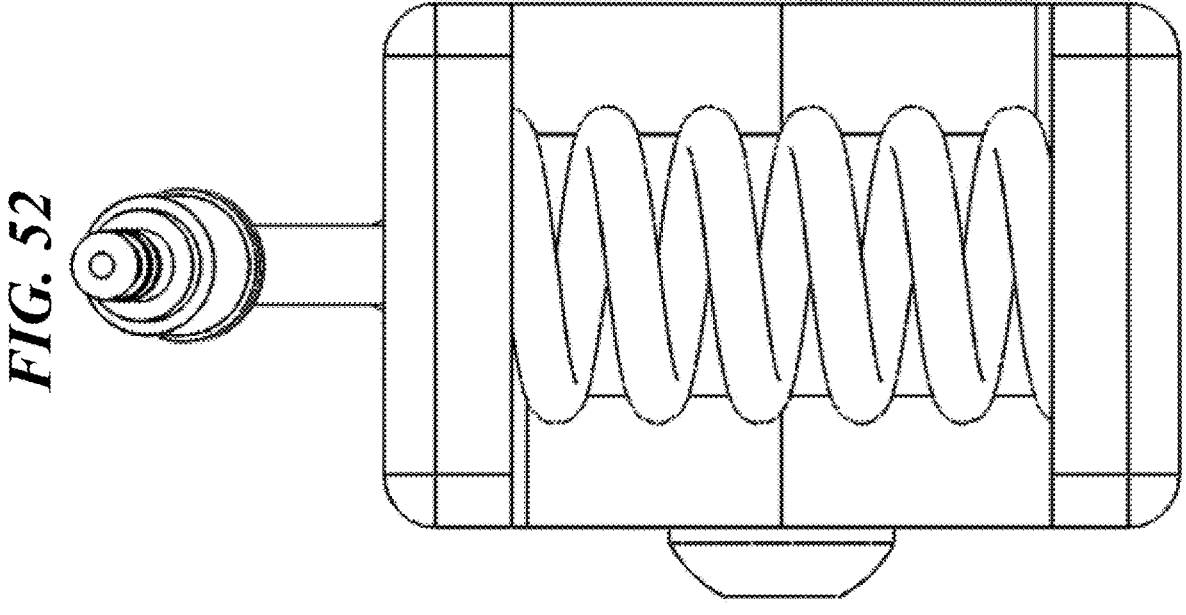
5200

5300

5400

5600

5700

5800

5900

6000

6100

6200

6300

6400

REFRIGERANT LEAK DETECTION AND MITIGATION SYSTEM AND METHOD

CROSS REFERENCE TO RELATED APPLICATIONS

Continuation-In-Part Patent Application (CIP)

This is a continuation-in-part patent application (CIP) of and incorporates by reference United States Utility Patent Application for REFRIGERANT LEAK DETECTION AND MITIGATION SYSTEM AND METHOD by inventors Kenneth Ray Green and Douglas Hiram Morse, filed electronically with the USPTO on 2022 May 2, with Ser. No. 17/734,406, EFS ID 45611163, confirmation number 6626, issued as U.S. Pat. No. 11,796,200 on 2023 Oct. 24.

Continuation Patent Application (CPA)

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 2022 May 2, with Ser. No. 17/734,406, EFS ID 45611163, confirmation number 6626, issued as U.S. Pat. No. 11,796,200 on 2023 Oct. 24, is a continuation patent application (CPA) of and incorporates by reference United States Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326, 798 on 2022 May 10, is a continuation-in-part (CIP) patent application of and incorporates by reference U.S. Utility Patent Application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326, 798 on 2022 May 10, is a continuation-in-part (CIP) patent application of and incorporates by reference U.S. Utility Patent Application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22

Apr. 2020, with Ser. No. 16/855,238, EFS ID 39231336, confirmation number 3025, issued as U.S. Pat. No. 11,326, 798 on 2022 May 10, is a continuation-in-part (CIP) patent application of and incorporates by reference U.S. Utility Patent Application for REFRIGERANT METERING SYSTEM AND METHOD by inventor Kenneth R. Green, filed electronically with the USPTO on 20 Jan. 2020, with Ser. No. 16/747,422, EFSID 38342840, confirmation number 1232.

PCT Patent Applications

This patent application claims benefit under 35 U.S.C. § 120 and incorporates by reference PCT Patent Application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with serial number PCT/US2018/019161.

Utility Patent Applications

This patent application claims benefit under 35 U.S.C. § 120 and incorporates by reference United States Utility Patent Application for REFRIGERANT LEAK DETECTION AND MITIGATION SYSTEM AND METHOD by inventors Kenneth Ray Green and Douglas Hiram Morse, filed electronically with the USPTO on 2022 May 2, with Ser. No. 17/734,406, EFS ID 45611163, confirmation number 6626, issued as U.S. Pat. No. 11,796,200 on 2023 Oct. 24.

This patent application claims benefit under 35 U.S.C. § 120 and incorporates by reference United States Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326, 798 on 2022 May 10, claims benefit under 35 U.S.C. § 120 and incorporates by reference United States Utility Patent Application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326, 798 on 2022 May 10, claims benefit under 35 U.S.C. § 120 and incorporates by reference United States Utility Patent Application for DISTRIBUTED RESIDENTIAL CLIMATE-CONTROL SYSTEMS AND METHODS WITH DISTRIBUTED PROTECTION AGAINST REFRIGER- ANT LOSS by inventors Kenneth R. Green, et al., filed electronically with the USPTO on 24 Sep. 2019, with Ser. No. 16/580,717, EFS ID 37259582, confirmation number 6370.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326, 798 on 2022 May 10, claims benefit under 35 U.S.C. § 120 and incorporates by reference United States Utility Patent Application for REFRIGERANT METERING SYSTEM AND METHOD by inventor Kenneth R. Green, filed electronically with the USPTO on 20 Jan. 2020, with Ser. No. 16/747,422, EFSID 38342840, confirmation number 1232.

Provisional Patent Applications

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326, 798 on 2022 May 10, claims benefit under 35 U.S.C. § 119 and incorporates by reference United States Provisional Patent Application for LEAK CONTAINMENT SYSTEMS by inventors Kenneth R. Green, et al., filed electronically with the USPTO on 20 Nov. 2019, with Ser. No. 62/938,132, EFS ID 37810820, confirmation number 6339.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326, 798 on 2022 May 10, claims benefit under 35 U.S.C. § 119 and incorporates by reference United States Provisional Patent Application for LEAK DETECTION TROUBLE-SHOOTER by inventors Kenneth R. Green, et al., filed electronically with the USPTO on 13 Aug. 2019, with Ser. No. 62/886,020, EFS ID 36861132, confirmation number 1376.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326, 798 on 2022 May 10, claims benefit under 35 U.S.C. § 119 and incorporates by reference United States Provisional Patent Application for AC BOX ENGINEERING, DESIGNS, AND DEVICES by inventors Kenneth R. Green, et al., filed electronically with the USPTO on 30 May 2019, with Ser. No. 62/854,676, EFS ID 36158820, confirmation number 6929.

U.S. Utility Patent Application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370, claims benefit under 35 U.S.C. § 119 and incorporates by reference United States Provisional Patent Application for DISTRIBUTED RESIDENTIAL CLIMATE-CONTROL SYSTEMS AND METHODS WITH REFRIGERANT MANAGEMENT by inventors Kenneth R. Green, et al., filed electronically with the USPTO on 25 Oct. 2018, with Ser. No. 62/750,383, EFS ID 34113773, confirmation number 1062.

U.S. Utility Patent Application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253, claims benefit under 35 U.S.C. § 119 and incorporates by reference United States Provisional Patent Application for REFRIGERANT LEAK CONTAINMENT SYSTEM by inventor Kenneth R. Green, filed electronically with the USPTO on 23 Feb. 2017, with Ser. No. 62/462,570, confirmation number 1047.

PARTIAL WAIVER OF COPYRIGHT

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to heating, ventilation, and air conditioning (HVAC) systems, and specifically the detection and mitigation of refrigerant leaks within these HVAC systems. Without limitation, the present invention may have application in situations where a refrigerant leak must be detected or mitigated in a Variable Refrigerant Flow (VRF) climate control heating, ventilation, and air conditioning (HVAC) system. In these situations the HVAC system may service multiple air handler units and as such a refrigerant leak in any one of the related evaporator coil(s) and/or condenser coil(s) can result in a significant disruption of HVAC service to the facility. The present invention in these circumstances is designed to detect the cause of the refrigerant leak and provide an indication of the failing refrigerant coil within the multiple refrigerant paths within the HVAC system and optionally mitigate the refrigerant leak by isolating a failing refrigerant coil within the system and allow the HVAC system to continue functioning in a fallback operational mode.

Furthermore, the present invention is specifically targeted at reducing false positive indications by refrigerant gas leak (RGL) detectors by performing a thermal analysis of the HVAC system components to generate a differential temperature matrix (DTM) that can be used to either detect refrigerant leaks directly and/or qualify the indication of a refrigerant leak by a RGL detector to prevent the false indication of a refrigerant gas leak in ambient conditions where anomalous readings may be present or common. This approach may also be utilized in situations where temperature sensors are placed in a spatially diverse manner within a HVAC system and operate on low power levels such as from a battery or the like. In this manner the temperature sensors can be integrated within an existing HVAC system with a minimum of existing infrastructure modification.

BACKGROUND AND PRIOR ART

Regulatory Background

The Clean Air Act (CAA) (42 U.S.C. § 7401 et seq.) is a comprehensive Federal law that regulates all sources of air emissions. The 1970 CAA authorized the U.S. Environmental Protection Agency (EPA) to establish National Ambient Air Quality Standards (NAAQS) to protect public health and the environment. Section 608 of the Clean Air Act prohibits the knowing release of refrigerant during the maintenance, service, repair, or disposal of air-conditioning and refrigeration equipment. The EPA requires proper refrigerant management practices by owners and operators of refrigeration and air-conditioning systems, technicians, and others.

In the fall of 2016, the EPA updated the existing requirements related to ozone depleting substances (ODS), such as CFCs and HCFCs, and extended them to substitutes such as HFCs. The updates include:

(1) More stringent requirements for repairing leaks in larger appliances;

(2) New recordkeeping for the disposal of appliances containing five to 50 pounds of refrigerant;

(3) New reporting requirement that kicks in when larger appliances leak 125% or more of their charge in a calendar year;

(4) Restricting the sale of HFC refrigerant to technicians certified under Sections 608 or 609 of the Clean Air Act; and (5) Changes to improve readability and simplify compliance.

Regulation Application

The following regulatory requirements apply to supermarkets and property and facility managers as of Jan. 1, 2019:

Affected Appliances

The leak repair regulations apply to industrial process refrigeration (IPR), commercial refrigeration, and comfort cooling appliances containing 50 pounds or more of ODS or substitute refrigerant.

Leak Rate Calculations

Owners/operators must calculate the leak rate every time ODS or substitute refrigerant is added to an appliance (unless the addition is made immediately following a retrofit, installation of a new appliance, or qualifies as a seasonal variance).

Appliance Repairs

Owners/operators must identify and repair leaks that exceed 30% for IPR, 20% for commercial refrigeration, and 10% for comfort cooling within 30 days of when the ODS or substitute refrigerant is added. Leaks must be repaired such that the leak rate is brought below the applicable leak rate.

Owners/operators of all three appliance types must perform and document both an initial and follow-up verification test of leak repairs, for appliances that exceed the applicable leak rate. An initial verification test must be performed before any additional refrigerant is added to the appliance. A follow-up verification test must be performed only after the appliance has returned to normal operating characteristics and conditions. There is no minimum timeframe.

The verification tests must demonstrate that leaks were successfully repaired. If either the initial or follow-up verification test indicates that repairs were not successful, owners/operators may conduct as many additional repairs and verification tests as needed within the 30 day repair period.

Owners/operators of IPR, commercial refrigeration, and comfort cooling equipment may request limited extensions to the 30 day (120 days if an industrial process shutdown is required) repair deadline.

If owners/operators fail to bring the leak rate below the threshold leak rate, owners/operators must create and implement a retrofit or retirement plan.

Leak Inspections

Owners/operators must conduct leak inspections for appliances that have exceeded the applicable leak ate, according to the schedule in the schedule below. Leak inspections must be conducted by a certified technician. All visible and accessible components of an appliance must be inspected.

Quarterly or annual leak inspections are not required on appliances (or portions of appliances) that are continuously monitored by an automatic leak detection system that is audited and calibrated annually.

Commercial Refrigeration and Industrial Process Refrigeration

For full charge>500 pounds, the frequency of leak inspections is once every three months until the owner/operator can demonstrate through leak rate calculations that the leak rate has not exceeded 20% (commercial refrigeration) or 30% (IPR) for four quarters in a row.

For full charge 50 to 500 pounds, the frequency of leak inspections is once per calendar year until the owner/operator can demonstrate through the leak rate calculations that the leak rate has not exceeded 20% (commercial refrigeration) or 30% (IPR) for one year.

Comfort Cooling

For full charge 50 or more pounds, the frequency of leak inspections is once per calendar year until the owner/operator can demonstrate through the leak rate calculations that the leak rate has not exceeded 10% for one year.

Retrofit or Retirement Plans Owners/operators must create a retrofit or retirement plan within 30 days$_3$ of an appliance leaking ODS or substitute refrigerant above the applicable leak rate if:

(a) The owner/operator intends to retrofit or retire rather than repair the leak; or (b) The owner/operator fails to identify and repair the leak; or (c) The appliance continues to leak above the applicable leak rate after required repairs and verification tests.

Retrofit or retirement plans must contain: identification and location of the appliance; type and full charge of the refrigerant in use; type and full charge of alternative refrigerant (if retrofitting); itemized procedure for converting the appliance to a different refrigerant, including changes required for compatibility with the new refrigerant (if retrofitting); plan for disposition of recovered refrigerant; plan for disposition of the appliance (if retiring); and a schedule for completion within one year.

The retrofit or retirement must be completed within one year of the plan's date unless granted extra time.

Owners/operators must repair all identified leaks as part of any retrofit.

Owners/operators may request relief from the obligation to retrofit or retire an appliance if they can establish within 180 days of the plan's date that the appliance no longer exceeds the applicable leak rate and agrees in writing to repair all identified leaks within one year of the plan's date.

Chronically Leaking Appliances

Owners/operators must submit reports to the EPA if any appliance leaks 125% or more of its full charge in one calendar year. This report must describe efforts to identify leaks and repair the appliance.

Recordkeeping and Reporting Requirements

Owners/operators must maintain hard or electronic copies of:

Records documenting the full charge of appliances.

Records, such as invoices, showing when service or maintenance is performed, when refrigerant is added to an appliance (or removed, in the case of disposal), when a leak inspection is performed, and when a verification test is conducted.

If using an automatic leak detection system, documentation that the system is installed and calibrated annually and records of when the monitoring system identifies a leak and the location of the leak.

Retrofit and/or retirement plans.

Requests submitted to the EPA to extend the repair or retrofit deadlines.

If a system is mothballed to suspend a deadline, maintain records documenting when the system was mothballed and when it was brought back on-line (i.e., when refrigerant was added back into the appliance).

Records to demonstrate a seasonal variance.

Reports on appliances that leak 125% or more of the full charge in a calendar year.

Prior Art Application to Regulation Requirements

The prior art has yet to address the EPA regulatory requirements regarding refrigerant leak detection, mitigation, and the requirement for monitoring of refrigerant leaks and the associated recordkeeping requirements of these EPA regulations.

Application to Existing HVAC Systems

Conventional HVAC systems often experience failures of refrigerant coils within the refrigerant flow loop. This may take the form of condenser or evaporator coil failures. In either case the loss of refrigerant can cause system failure in multiple locations, especially if the system incorporates a single compressor/condenser and multiple evaporator coils, as might be configured in a commercial building or other similar structure.

Prior art mechanisms to detect and/or mitigate these failures have proven unsuccessful in discriminating true refrigerant leaks from ambient hydrocarbon emissions as might be experienced from the use of cleaning solvents and/or other cleaning materials that are typically used in a commercial building context. For this reason, a system that can detect and/or mitigate refrigerant leaks in a HVAC system and provide monitoring/logging of refrigerant leaks represents a long-felt need within the HVAC servicing industry, especially in light of recently enacted EPA regulatory requirements.

U.S. Utility Patent Application for REFRIGERANT LEAK DETECTION AND MITIGATION SYSTEM AND METHOD by inventors Kenneth Ray Green and Douglas Hiram Morse, filed electronically with the USPTO on 2022 May 2, with Ser. No. 17/734,406, EFS ID 45611163, confirmation number 6626, issued as U.S. Pat. No. 11,796,200 on 2023 Oct. 24 is incorporated here by reference and describes a method of detecting refrigerant gas leaks using a refrigerant gas sensor (RGS).

A common issue with all refrigerant gas sensors (RGS) in this context is false positive readings that may occur as a result of commercial and/or industrial environments such as commercial buildings, hotels, and the like where cleaning agents often falsely trigger conventional RGS and indicate a RGL where in fact no such leak has occurred. The patents incorporated herein provide a methodology to screen RGS readings in order to minimize these false readings of RGL.

The present invention extends this screening function to incorporate measured thermal differential temperatures along various elements within the HVAC system to determine if a refrigerant leak has occurred. These measured thermal differential values (DTV) can be incorporated into a differential temperature matrix (DTM) that describes the thermal state of the HVAC system. The DTM can be compared against a set of predetermined values for a particular HVAC system to determine the presence or absence of a refrigerant leak.

This differential temperature information may be used to directly determine the presence of a refrigerant leak within the HVAC system and/or alternatively qualify or further screen the results of a refrigerant gas leak detector as described within patents incorporated within this application. In this manner a more accurate determination of a refrigerant leak state may be obtained that would normally be available using only a refrigerant gas sensor.

BRIEF SUMMARY OF THE INVENTION

The present invention pertains to a system and method wherein a HVAC system having a failing refrigerant coil (or other system component leaking refrigerant) may be quickly detected, isolated, and brought back to service.

To accomplish this goal the present invention implements a system and method of refrigerant detection that indirectly determines a refrigerant leak via the use of a plurality of temperature/humidity sensors (THS) placed within the HVAC system. Closed-loop monitoring of the THS allows a differential temperature matrix (DTM) to be collected by a digital control processor (DCP) that defines the thermal state of the HVAC system. This DTM can then be compared by the DCP to predetermined values to determine if a refrigerant leak is actual, probable, and/or suspected. The results of this DTM analysis can then be used to actuate an alarm status indicator (ASI), trigger other communication to a mobile user device (MUD), and/or actuate/deactivate contactors and/or valves in the HVAC system to mitigate the detected refrigerant leak.

The use of the DTM may be integrated with other refrigerant gas detection techniques to qualify the suspected detection of a refrigerant leak using these other methods. In a typical scenario, the refrigerant leak detector may be tolerant of background hydrocarbon emissions as well as dynamically adaptable to the changing characteristics of wide variety of refrigerant gas sensors (RGS) as described by patents incorporated by reference into this application. By dynamically calibrating the operation of the RGS and adjusting for background detected hydrocarbon levels using a closed control loop (CCL) operating between a digital control processor (DCP) and a sensor signal conditioner (SSC), the overall system/method can be used to both detect true refrigerant leaks and in some embodiments close solenoid valves and/or electrical contactors to inhibit HVAC operation and isolate failing components to mitigate refrigerant loss in the HVAC system.

BRIEF DESCRIPTION OF THE DRAWINGS

For a fuller understanding of the advantages provided by the invention, reference should be made to the following detailed description together with the accompanying drawings wherein:

FIG. 4 illustrates a flowchart depicting a preferred invention embodiment of a refrigerant leak detection/mitigation overview method;

FIG. 5 illustrates a flowchart depicting a preferred invention embodiment of a refrigerant leak detection/mitigation detail method (sheet 1 of 4);

FIG. 7 illustrates a a flowchart depicting a preferred invention embodiment of a refrigerant leak detection/mitigation detail method (sheet 3 of 4);

FIG. 8 illustrates a flowchart depicting a preferred invention embodiment of a refrigerant leak detection/mitigation detail method (sheet 4 of 4);

FIG. 13 illustrates a flowchart depicting a RGL Pre-Validation by DTM method;

FIG. 14 illustrates a flowchart depicting a RGL Post-Validation by DTM;

FIG. 15 illustrates a flowchart depicting a RGL Dual-Validation by DTM;

FIG. 35 illustrates a left side view of a preferred exemplary THS thermal contact clamp (TCC) incorporating a typical temperature sensor;

FIG. 37 illustrates a top view of a preferred exemplary THS thermal contact clamp (TCC) incorporating a typical temperature sensor;

FIG. 38 illustrates a bottom view of a preferred exemplary THS thermal contact clamp (TCC) incorporating a typical temperature sensor;

FIG. 51 illustrates a left side view of a preferred exemplary THS spring-loaded thermal contact clamp (TCS) incorporating a typical temperature sensor;

FIG. 52 illustrates a right side view of a preferred exemplary THS spring-loaded thermal contact clamp (TCS) incorporating a typical temperature sensor;

DESCRIPTION OF THE PRESENTLY PREFERRED EXEMPLARY EMBODIMENTS

Figure 1:
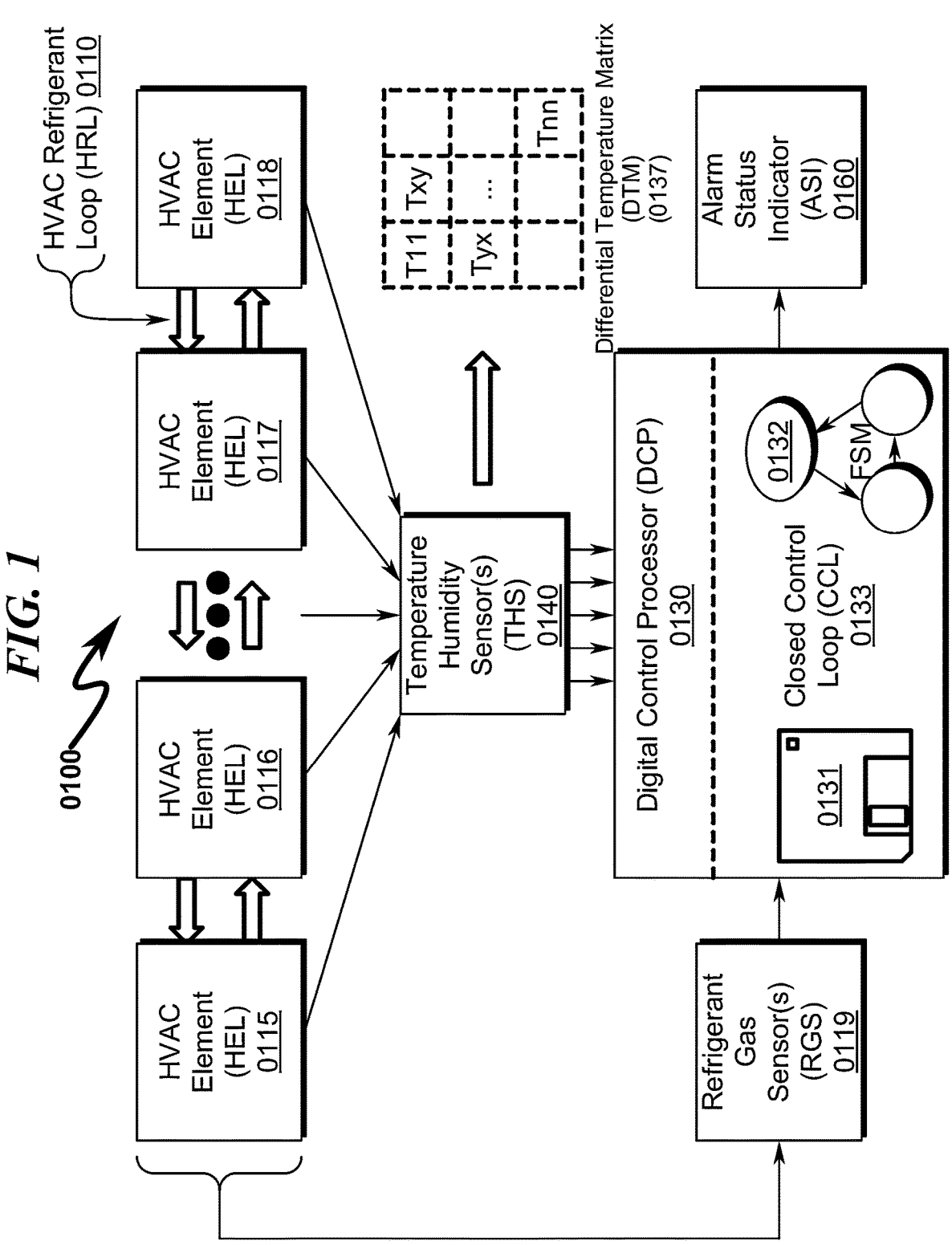
FIG. 1 illustrates a generalized system block diagram depicting a preferred exemplary embodiment of a present invention refrigerant leak detection system (RLD) incorporating one or more temperature/humidity sensors (THS) in conjunction with a digital control processor (DCP) operating in a closed control loop (CCL) to monitor the state of a HVAC system for refrigerant leaks.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a REFRIGERANT LEAK DETECTION AND MITIGATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

HVAC Heating/Cooling Operation not Limitive

The present invention will be described in terms of a conventional HVAC heating/cooling system. In some application contexts, the system is operated solely as a cooling system. Thus, the present invention is not limited to heating, cooling, or heating/cooling systems, but combinations of these configurations are also anticipated. The present invention may be utilize with heat pumps, heat recovery, refrigeration, and other systems that employ LEV/EEV/TEV/AEV controls and/or REC components. The discussion herein does not limit the type of environment in which the present invention may be applied.

Furthermore, the terms "input port" and "output port" will be referenced to conventional refrigeration systems herein, but it should be understood that these designations will be reversed for heat recovery systems that are also anticipated by the present invention. One skilled in the art will have no trouble in reversing these designations where appropriate in this disclosure to allow the claimed invention to encompass both refrigeration and heat recovery systems.

Refrigerant Coil not Limitive

While the present invention has particular application to the detection and mitigation of refrigerant leaks in HVAC evaporator coils, the present invention may equally be applied to HVAC condenser coils. Thus, the term "refrigerant coil" and it synonyms should be given a broad meaning within the scope of this disclosure and the claimed invention.

Refrigerant Not Limitive

Throughout this document the term "refrigerant" will be used in relation to the detection of any gas/fluid that may be used within a circulating loop in a HVAC system. The present invention may broadly detect a wide range of refrigerant classes in this context, including but not limited to a wide variety of halocarbons that may include traditional refrigerant classes (R11, R12, R113, R114, R115, R22, R123, R134a, R404a, R407C, R410a, etc.) as well as other newer refrigerants (R290, R32, R600, etc.) that may contain hydrocarbons such as butane and/or propane and/or natural gas (NG). Thus, the term "refrigerant" as used herein should be given broad interpretation to cover any of these refrigerant types and others that may be implemented in the future.

With respect to refrigerant types that are combustible, the present invention may be configured to sound alarms notifying occupants that they have a combustible gas leak if a refrigerant leak is detected and the system may be configured to shutoff natural gas (NG) to an indoor furnace if the refrigerant leak is detected, and the level of refrigerant leak in this instance may be reduced to be more sensitive to the detection of natural gas or other combustible refrigerant types.

Refrigerant Control Valves LEV/EEV/TEV/AEV not Limitive

The present invention will be discussed in terms of using in some circumstances refrigerant control valves (RCV) to enable/disable refrigerant flow within a HVAC refrigerant loop (HRL). The term refrigerant control valve (RCV) and its variants herein may encompass a wide variety of flow control valves, including but not limited to: linear expansion valve (LEV), electronic expansion valve (EEV), automated expansion valve, solenoid actuated valves, and other types of electrically or mechanically actuated refrigerant valves and metering devices known to those of ordinary skill in the art. Thus, the phrase refrigerant control valves (RCV) and variants should be broadly interpreted within the context of this disclosure.

LCS/LDT not Limitive

The present invention will be described in terms of a leak containment system (LCS) (otherwise referred to as a refrigerant leak containment (RLC) or refrigerant leak mitigation (RLM)) in which a leak detection tool (or alternatively as a leak detection troubleshooter) (LDT) or a refrigerant leak detector (RLD)) is used to dynamically monitor ambient refrigerant levels, determine if a refrigerant leak has occurred, pinpoint the location of the leak, and mitigate any adverse effects of the leak by containing the leak to a portion of the HVAC system in which the refrigerant flows.

Thus, the system and method described herein may be used for leak detection and/or leak mitigation and troubleshooting and in some circumstances may be implemented as a leak detection only system/method and in others as a leak detection and mitigation system/method.

Connection Fitting Type not Limitive

While the present invention will be described herein using components that utilize soldered connections, the present invention anticipates that other connection fittings may be utilized on the components with no loss of generality in the invention teachings or claim scope. Specifically, the RFV and EIV described herein may incorporate a wide variety of connection fittings, including but not limited to: soldered; brazed; flared; compression; or national pipe thread (NPT). One skilled in the art will not need additional information to make these substitutions based on specific application context as these connection fittings are standards and well known in the art.

RFV Orientation not Limitive

The refrigerant flow valve (RFV) depicted herein is configured with an input transfer port that is configured to be perpendicular to a central transfer port and associated output transfer port. The present invention anticipates that a wide variety of input/central/output port configurations may be utilized with the present invention without loss of generality in the invention teachings or claim scope. One skilled in the art will not need additional information to make these substitutions based on specific application context, as variants of these configurations are well known in the art.

Condenser Isolation Valve (CIV) not Limitive

Some preferred exemplary invention embodiments employ a condenser isolation valve (CIV) to isolate refrigerant flow from the output of the refrigerant condenser coil (RCC) to the refrigerant flow valve (RFV). In many preferred embodiments this CIV is implemented as a ball valve having soldered, brazed, flare, or pipe thread (NPT) fittings. In some preferred embodiments this CIV may be a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these CIVs are preferred in many invention embodiments, they are not limitive of the scope of CIV that may be utilized in the present invention.

Flow Isolation Valve (FIV) not Limitive

Some preferred exemplary invention embodiments employ a flow isolation valve (FIV) to isolate refrigerant flow from the output of the refrigerant flow valve (RFV) to the refrigerant evaporator coil (REC). In many preferred embodiments this FIV is implemented as a ball valve having soldered, brazed, flare, or pipe thread (NPT) fittings. In some preferred embodiments this FIV may be a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these FIVs are preferred in many invention embodiments, they are not limitive of the scope of FIV that may be utilized in the present invention.

Evaporator Isolation Valve (EIV) not Limitive

Some preferred exemplary invention embodiments employ an evaporator isolation valve (EIV) to isolate refrigerant flow from the output of the refrigerant evaporator coil (REC) to the refrigerant compressor (RFC). In many preferred embodiments this EIV is implemented as a ball valve having soldered, brazed, flare, or pipe thread (NPT) fittings. In some preferred embodiments this EIV may be a MIT- SUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these EIVs are preferred in many invention embodiments, they are not limitive of the scope of EIV that may be utilized in the present invention.

Isolation Valve Count not Limitive

While the present invention as discussed herein provides examples of system embodiments wherein a CIV, FIV, and EIV are implemented, the present invention is not limited to these particular configuration and some preferred exemplary system embodiments may have fewer than these three valves or combinations of less than these three valves.

Schrader/American Valve not Limitive

While many of the CIV/FIV/EIV used in implementing the present invention may incorporate one or more Schrader valves (also called an American valve) between the CIV/FIV/EIV refrigerant input port (RIP) and refrigerant output port (ROP) (between which is positioned the refrigerant control valve (RCV) that allows the CIV/FIV/EIV to halt refrigerant flow from the RIP to the ROP) to allow the refrigerant flow lines and/or REC to be evacuated and filled with refrigerant on one or more sides of the CIV/FIV/EIV valve structure, this is not necessarily a requirement of the CIV/FIV/EIV.

The positioning of the Schrader valve in these implementations is preferred to be between the CIV RIP and the RCC output port, the FIV ROP and the REC input port, and the EIV RIP and the REC output port. This configuration allows isolation of the RFV and/or the REC to affect repair and/or replacement of either of these HVAC system components as well as the AEV. These valves as positioned in the HVAC system allow the REC to be evacuated and filled with refrigerant without impacting the RFV or RCC. These valves as positioned in the HVAC system allow the AEV to be replaced and/or repaired without impacting the RFV, RCC, or REC.

However, some invention embodiments may place the Schrader valve at different positions within the CIV/FIV/EIV, while other embodiments may utilize two Schrader valves, one between the RIP and the RCV, and another between the ROP and the RCV. While the use of Schrader valves is preferred and these valves are well known in the art, the present invention is not limited to this particular type of valve in the implementation.

Solenoid Cutoff Valves Not Limitive

Many preferred embodiments of the present invention may incorporate electrically actuated solenoid drive refrigerant cutoff valves to isolate one or more components of the HVAC system when a refrigerant leak is detected. While many valve types may be used in this application context, several preferred invention embodiments make use of solenoid cutoff valve model SD-15/52015, available from Parker Hannifin Corporation, Sporlan Division, 206 Lange Drive, Washington, MO 63090 USA, phone 636-239-1111, fax 636-239-9130, www.sporlan.com.

These valves in some circumstances may be substituted with manually activated refrigerant cutoff valves (RCV) such as the FIV/EIV described above that are actuated by an operator in response to alarms provided by the refrigerant leak detector (RLD) described herein.

Drawings not to Scale

The drawings presented herein have been scaled in some respects to depict entire system components and their connections in a single page. As a result, the components shown may have relative sizes that differ from that depicted in the exemplary drawings. One skilled in the art will recognize that piping sizes, thread selections, and other component values will be application specific and have no bearing on the scope of the claimed invention.

Schematics Exemplary

The present invention may be taught to one of ordinary skill in the art via the use of exemplary schematics as depicted herein. One skilled in the art will recognize that these schematics represent only one possible variation of the invention as taught and that their specific connectivity, components, and values are only one possible configuration of the invention. As such, the presented schematics and their associated component values and illustrated voltage levels do not limit the scope of the claimed invention. Additionally, it should be noted that conventional power supply decoupling capacitors are omitted in the presented schematics as they are generally application specific in value and placement.

Digital Control Processor (DCP) not Limitive

The implementation of the digital control processor (DCP) described herein may take many forms, including but not limited to discrete digital logic, microcontrollers, finite state machines, and/or mixed analog-digital circuitry. While in many preferred exemplary embodiments the DCP is implemented using an 8051-class (8021, 8041, 89C microcontroller, the present invention is not limited to this particular hardware implementation.

States/Modes Not Limitive

The present invention will be herein described in terms of CCL STATES in many embodiments. These states may equivalently be described in terms of CCL MODES of operation.

Time Delays Not Limitive

The present invention may make use of a variety of DCP selected time delays during the operation of the system. The time delays presented herein are only exemplary of those found in some preferred embodiments and are not limitive of the claimed invention. A "selected time delay" will refer to any time delay found appropriate in a particular application context of the present invention.

Wireless Communication Interface (WCI) not Limitive

Some preferred invention embodiments may incorporate a wireless communication interface (WCI) allowing control and/or interrogation of the DCP from a mobile user device (MUD) or some other type of networked computer control. The WCI may take many forms, but many preferred invention embodiments utilize a BLUETOOTH® compatible interface to the DCP to accomplish this function.

Wireless Communication Protocol not Limitive

Some preferred invention embodiments utilize a wireless communication interface (WCI) to allow external communication and/or control of the DCP. In this manner the operational STATE of the CCL can be interrogated, ASI alarms enabled/inhibited, HVAC controls manually operated, and stored information regarding the details of the particular HVAC system stored/retrieved. In many preferred exemplary embodiments the WCI is implemented using a BLUETOOTH® radio frequency transceiver, and in some circumstances a Shenzhen Xintai Micro Technology Co., Ltd. Model JDY-30/JDY-31 BLUETOOTH® SPP Serial Port Transparent Transmission Module or DSD TECH model HM-10/HM-11 (www.dsdtech-global.com) that implement a BLUETOOTH® wireless transceiver using a digital serial port of the DCP. One skilled in the art will recognize that this is just one of many possible WCI implementations.

Mobile User Device (MUD) not Limitive

Some preferred invention embodiments may incorporate a mobile user device (MUD) allowing control and/or interrogation of the DCP via a WCI or other computer network. The MUD may take many forms, but many preferred invention embodiments utilize a tablet, smartphone, or other handheld device to wirelessly communicate with the DCP using a WCI. In some circumstances this MUD may utilize telephone or Internet communications to affect this DCP command/interrogation capability.

Alarm Status Indicator (ASI) not Limitive

Many preferred invention embodiments may incorporate an alarm status indicator (ASI) comprising one or more light emitting diode (LED) displays (including LED displays utilizing a digital or segmented format) and/or audible alarm indicators. These devices may take many forms, including but not limited to single LED indicators, LED multi-segment displays, and piezo-electric audible indicators. In each of these cases the activation duty cycle and frequency of operation of these displays may be altered to provide indications of alarm status values or to provide information as to the STATE in which the system is operating. The present invention makes no limitation on how these displays operate or in what combination they are combined to provide the ASI functionality.

Power Supply not Limitive

The present invention as described in the exemplary embodiments herein makes use of AC power derived from the HVAC system (AC power, typically for use with RLM implementations) or in other circumstances may use battery power (battery power, typically for use with RLD implementations). However, some implementations may utilize ETHERNET or some other wired network that supports power-over-Ethernet) (POE). In these circumstances the wireless communication interface (WCI) will encompass a wired communication network (WCN) that provides power to the system. The WCI as described herein encompasses the possibility of the use of a WCN incorporating power-over-Ethernet (POE) as a power source for the system.

In these circumstances the RLD/RLM may be connected directly to maintenance technician or facility manager computers to allow these remote computers to perform HVAC system analysis, generate reports on HVAC systems, refrigerant leak detection, and perform other functions on the RLD/RLM units.

Temperature/Humidity Sensor (THS) not Limitive

The term "temperature/humidity sensor (THS)" should be broadly construed to include temperature sensors only, humidity sensors only, and sensors capable of sensing both temperature and humidity. While many preferred invention embodiments may utilize DALLAS SEMICONDUCTOR (MAXIM) DS18B20 (or variant) devices as temperature sensors, the present invention is not limited to these particular devices. While many preferred invention embodiments may utilize GUANGZHOU ASAIR Electronic CO., LTD. Model AGS02MA/DHT20 (or variant) devices as temperature/humidity sensors, the present invention is not limited to these particular devices.

THS Placement not Limitive

While the present invention depicts the THS as being placed in thermal contact with various HVAC elements, the placement of the individual THS is not limited to the HVAC system but can include other environmental locations not specifically associated with the HVAC system. This could include air fans, air plenums, intake/exhaust grates/ports, ambient indoor/outdoor temperatures, and other locations that may be used to characterize the state of the operational HVAC system.

RGS Placement not Limitive

In some preferred invention embodiments the THS is utilized with a refrigerant gas sensor (RGS) to determine if a refrigerant gas leak (RGL) has occurred. While the RGS sensor(s) may be placed anywhere within the HVAC system air flow, many preferred invention embodiments utilize RGS sensors located within the frame of a door in order to detect RGL conditions.

Figure 3:
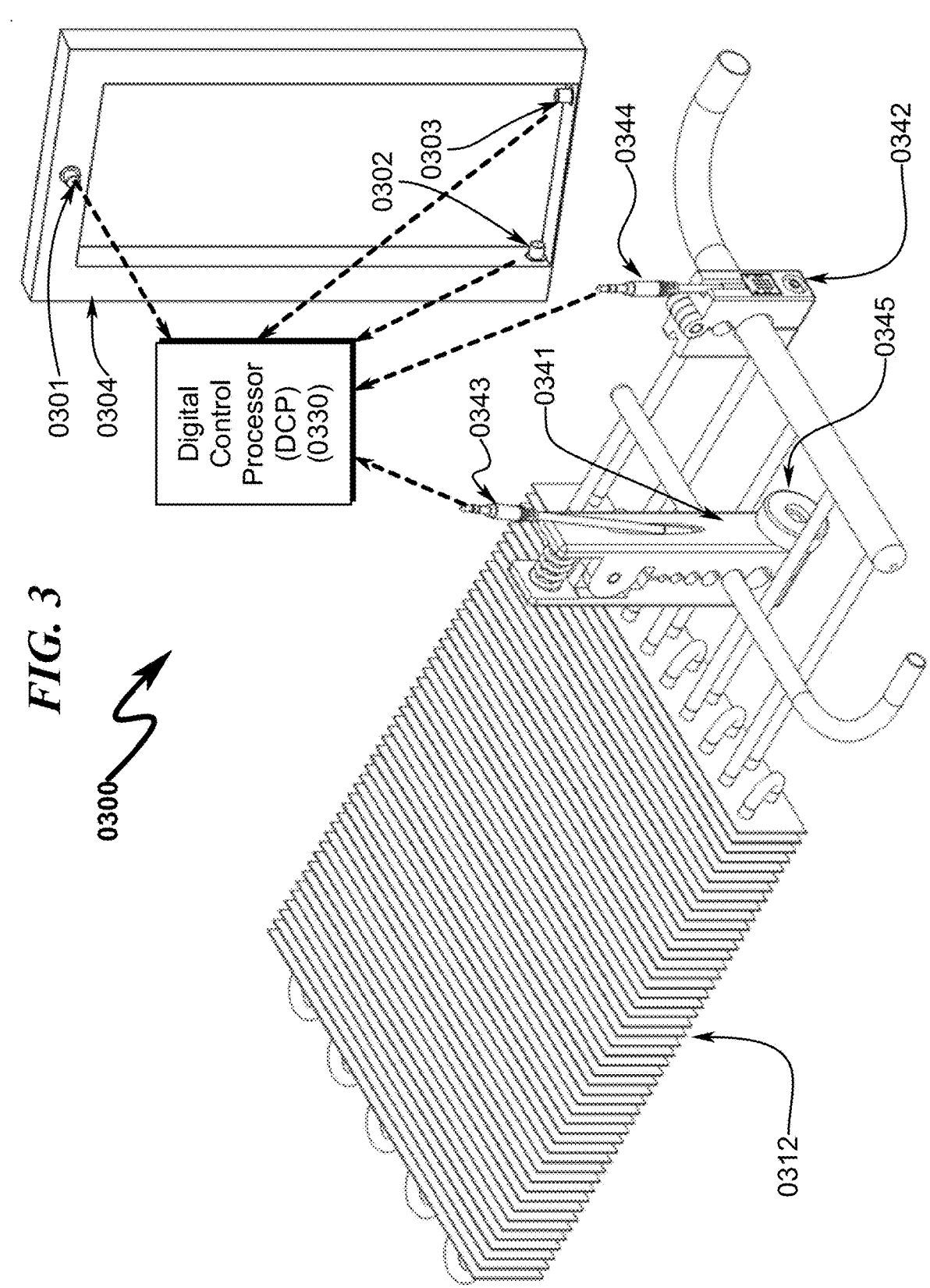
FIG. 3 illustrates a typical temperature/humidity measurement application context of the present invention as applied to a heat exchanger in a conventional HVAC system and one or more typical refrigerant gas sensors (RGS) mounted in the frame of a door.

Specifically, and without limitation, many preferred invention embodiments will place the RGS in the lower portion of the door frame proximal to the bottom edges of the door frame such that air flow that occurs under the lower edge of the door will pass by the RGS. This placement can occur at the bottom horizontal surface of the door frame as well as on the vertical surfaces of the door frame just above the bottom edge of the door frame but below the edge of door as mounted within the door frame. Since RGL conditions emit refrigerant gas that is typically heavier than ambient air, the placement of the RGS in the lower portion of the door frame will optimize the detection of the RGL in many environments such as hotel rooms and other commercial facilities. An example of this placement is generally depicted in FIG. 3 (0300).

Differential Temperature Matrix (DTM) not Limitive

In various preferred invention embodiments a differential temperature matrix (DTM) is maintained by the DCP and incorporates baseline temperature measurements at various points in the HVAC refrigerant loop as well as ambient temperature readings and/or readings directly attributable to various components in the HVAC system (condenser, compressor, evaporator) as well as input/output connections and connecting refrigerant lines to these various components.

This DCP is generally a square matrix and has a matrix order that is dependent on the particular implementation of the disclosed invention. Some embodiments may utilize a few temperature sensor readings in order to qualify/identify refrigerant leaks and therefore have a low value DTM matrix order. Other more advanced implementations will incorporate numerous THM that may be located anywhere within the HVAC system and thus this implementation will have a higher order DTM matrix order. It is envisioned that the minimum DTM matrix order will be unity (1) in the most basic invention embodiments.

Further to the above, it should be noted that while the diagonal elements of the DTM will generally record absolute temperature measurements from the various THS, the off-diagonal components of the DTM need not always be calculated or populated with differential temperature data. Thus, the DTM may be configured to measure absolute temperatures but not use these in differential temperature measurements in the DTM.

In many configurations the DTM off-diagonal elements will contain differential temperature measurements associated with differences in temperature between various on-diagonal elements of the DTM. For example, the on-diagonal DTM elements may contain absolute temperature measurements for the compressor inlet and compressor exhaust, while the off-diagonal DTM elements may contain a differential temperature between these two values as well as additional humidity information that may be used to determine the efficiency of the HVAC refrigerant cycle.

Finally, the DTM may incorporate calculated values in some of its matrix elements, such as dew point, or other values that are calculated from MTV data. This information may be utilized to determine, for example, how hard the HVAC system is working to achieve a desired temperature/humidity set point within a given controlled environment. This information can then be used to indirectly determine whether a refrigerant leak has occurred. For example, if the measured/calculated values indicate that the desired set point has not been reached, temperature values within the system have exceeded predetermined values, and the HVAC system is operating to capacity with a duty cycle exceeding a predetermined percentage, then this may indicate a refrigerant leak or other system malfunction that should be immediately addressed.

Generalized Refrigerant Gas Leak (RGL) Detection Methodology

The present invention utilizes absolute measured temperature value (MTV) and/or differential temperature value (DTV) measurements to determine a potential and/or actual refrigerant gas leak (RGL) with a given HVAC system. While there are many possible implementations of this methodology, two will be presented here as examples.

As a first example, an absolute discharge temperature on a compressor above 220 degrees Fahrenheit will generally indicate a refrigerant under-charge or refrigerant gas leak (RGL) within the HVAC system. While various HVAC systems will vary with respect to this ALARM trip value, this value is a good starting point for most HVAC systems.

As a second example, a differential between the return air temperature (RAT) and blower supplier temperature (BST) should be between 15 to 20 degrees Fahrenheit with any DTV below 10 degrees indicating a refrigerant under-charge or refrigerant gas leak (RGL) within the HVAC system.

One skilled in the art will no doubt observe that these examples may form the basis of a plurality of other MTV/DTV tests on a formulated DTM to allow the DCP to detect a variety of refrigerant leak conditions within a given HVAC system.

Temperature-Based Leak Detection (TLD) System Overview (0100)

The present invention refrigerant leak detection (RLD) system in its simplest form is generally depicted in FIG. 1 (0100) as applied to a HVAC system that comprises a HVAC refrigerant loop (HRL) (0110) that includes one or more HVAC elements (0115, 0116, 0117, 0118) and/or environmental locations in which one or more temperature/humidity sensors (THS) (0140) are located to collect temperature information by thermal contact between the THS (0140) and the HVAC element (0115, 0116, 0117, 0118) and/or environmental locations. This collected differential temperature value information (DTV) is transmitted to a digital control processor (DCP) (0130). The DCP (0130) executes instructions read from a computer readable medium (0131) which implement a finite state machine (FSM) (0132) that form a closed control loop (CCL) (0133). The DCP (0130) transforms the DTV into a differential temperature matrix (DTM) (0137) that incorporates absolute measured temperature as well as differential temperatures between the various HVAC elements (0115, 0116, 0117, 0118) and/or environmental locations.

The DTM (0137) is then compared against predetermined values for a given HVAC configuration to determine if absolute and/or differential temperatures are out of predetermined ranges, and if so, signaling an alarm status indicator (ASI) (0160) that indicates the presence of a refrigerant leak. In some preferred modes of operation, the DTM (0137) is the only data required to determine a refrigerant leak within the HVAC refrigerant loop (0110).

In some other preferred embodiments, the DTM (0137) is used in conjunction with one or more refrigerant gas sensors (RGS) (0119) such that the ASI (0160) is triggered only if the RGS (0119) indicates a refrigerant gas leak (RGL), only if the DTM (0137) indicates a RGL, or only if both the RGS (0119) and the DTM (0137) indicate a RGL. In this manner the RGS (0119) and DTM (0137) can be used to qualify/validate the results of the other sensor in some circumstances where the air surrounding the RGS (0119) may be contaminated with hydrocarbons that are not refrigerant gas but nonetheless indicate refrigerant gas on the RGS (0119) sensor. This condition can often occur in hotels and other environments where cleaning solutions are frequently used during daily housekeeping and/or cleaning operations.

Refrigerant Leak Detection (RLD) System Overview (0200)

Basic Refrigerant Leak Detection (RLD)

Figure 2:
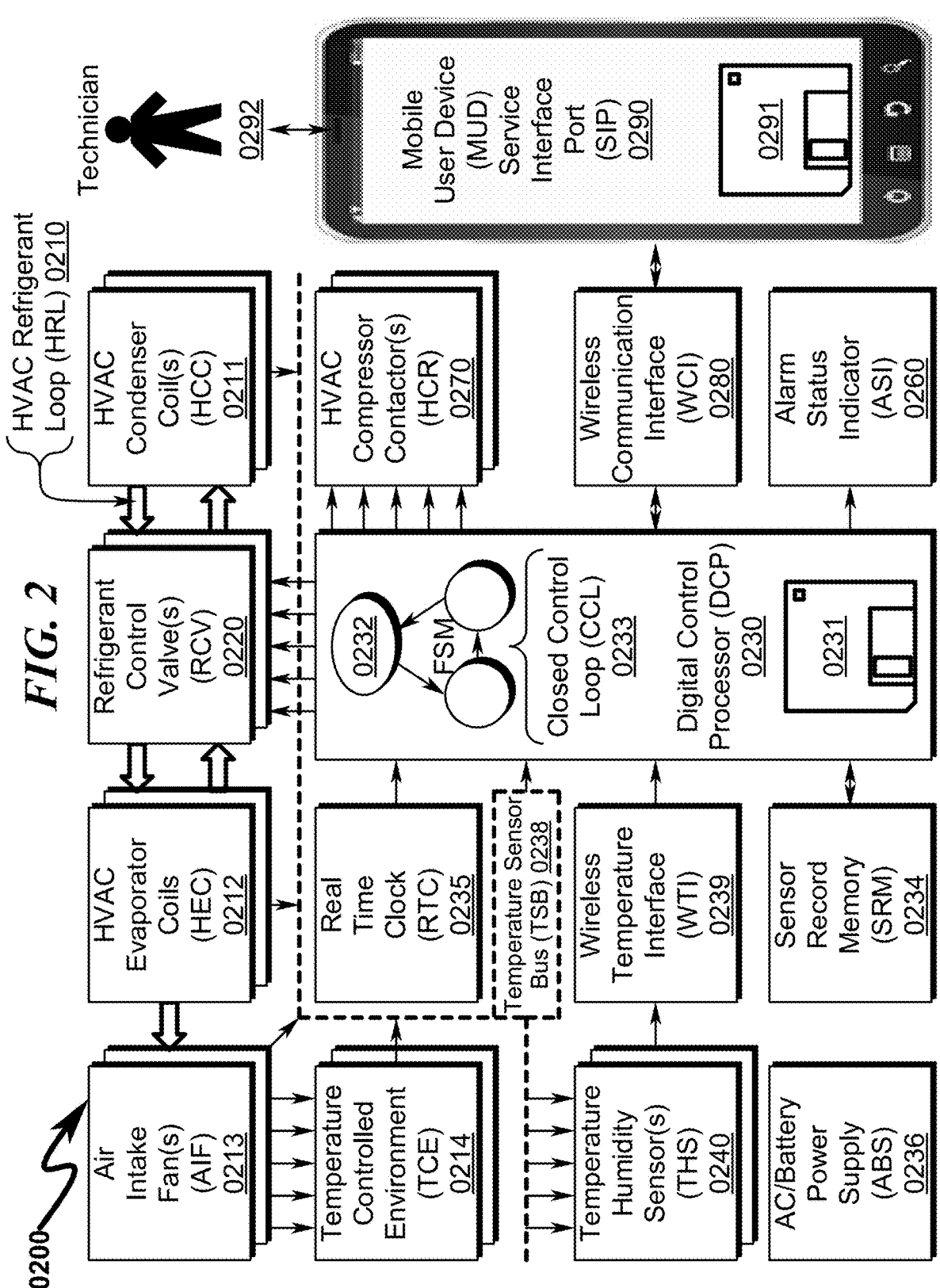
FIG. 2 illustrates a system block diagram depicting a preferred exemplary embodiment of a present invention refrigerant leak detection (RLD)/containment (RLC) system as integrated into a typical HVAC system.

The present invention refrigerant leak detection (RLD) system in its simplest form is generally depicted in FIG. 2 (0200) as applied to a HVAC system that comprises a HVAC refrigerant loop (HRL) (0210) having HVAC condenser coils (HCC) (0211) that feed HVAC evaporator coils (HEC) (0212). Within this HRL (0210) the refrigerant flow is controlled by a compressor (not show) and one or more HVAC refrigerant control valves (RCV) (0220). An air intake fan (AIF) blows air over the HEC (0212) to provide temperature stabilization of a temperature controlled environment (TCE) (0214).

The RLD consists of a digital control processor (DCP) (0230) executing machine instructions from a tangible computer readable medium (0231) that implement a finite state machine (FSM) (0232) operating a closed control loop (CCL) (0233) that continuously interrogates one or more temperature and/or humidity sensors (THS) (0240). The THS (0240) are located in thermal contact with the HCC (0211), HEC (0212), AEC (0213), TCE (0214), and/or HVAC refrigerant lines in the HRL (0210). Thermal proximity to individual lines in the HRL (0210) may be enhanced via the use of a thermal refrigerant coupler (TRC) that mechanically couples an individual THS (0240) to a particular HVAC line in the HRL (0210).

Communication from individual THS (0240) may be accomplished using a temperature sensor bus (0238) (typically a 1-WIRE serial bus such as that developed by DALLAS SEMICONDUCTOR CORPORATION) or a wireless temperature interface (WTI) (0239).

The DCP (0230) is configured via the CCL (0233) to continuously monitor the THS (0240) and log temperatures and/or humidity readings a various point in the HRL (0210). Individual readings for the THS are termed measured temperature/humidity values (MTV). In addition to these readings, the CCL (0233) is configured to determine delta readings between the various THS (0240) as delta temperature values (DTV). The DCP (0230) may be augmented with a sensor record memory (0235) to store the measured MTV/DTV values in order to provide a historical basis for determining whether a refrigerant leak has been detected in the HRL (0210).

The DCP (0230) may additionally be augmented with an AC and/or battery power supply (ABS) (0236) that supplies power to the DCP and other components of the RLD system.

Based on the MTV and DTV readings by the DCP (0230), the CCL (0233) determines if a refrigerant leak has been detected in the HRL (0210), and if so, an ALARM STATE is activated in the FSM (0232) which triggers an alarm status indicator (ASI) (0260). The ASI (0260) may optionally trigger the ALARM STATE to be transmitted thru a wireless communication interface (WCI) (0280) to a mobile user device (MUD) (0290).

Basic Refrigerant Leak Mitigation/Containment (RLC)

The basic refrigerant leak mitigation/containment (RLC) system augments the RLD system described above via the use of refrigerant control valves (RCV) (0220) and/or HVAC compressor contactors (HCR) (0270) that configured to be activated or deactivated based on any ALARM STATE that triggers the ASI (0260). In this manner, if the CCL (0233) detects a refrigerant leak by continuous inspection of the MTV/DTV, the HVAC system can be shut down and the refrigerant leak isolated by the RCV (0220), thus preventing continued loss of refrigerant in the HRL (0210).

Since the HVAC system as implemented may have a wide range of manufacturing variations resulting in a wide range of temperature characteristics, the DCP (0230) adjusts the MTV/DTV to account for these variations as well as ambient refrigerant level variations in order to achieve a reliable indication of an actual refrigerant leak in the HRL (0210). Once a reliable indication of a refrigerant leak has been detected, the DCP (0230) provides an indication of this via the use of one or more alarm status indicators (ASI) (0240) that may encompass audible and/or visual leak detection alarms.

The closed control loop (CCL) (0233) interaction between the THS (0240) and the DCP (0230) is critical to the proper operation of the overall refrigerant leak detection (RLD) system in that the MTV/DTV values obtained from the THS (0240) must be interpreted both statically and dynamically by the DCP (0230) in order to determine if a refrigerant leak has occurred. Without some form of dynamic recalibration, MTV/DTV readings would falsely indicate a refrigerant leak and render the THS useless as a true indicator of a HRL (0210) refrigerant leak.

Air Intake Fan (AIF)

As generally depicted in FIG. 2 (0200), the RLD/RLC may in some preferred embodiments be augmented with one or more air intake fans (AIF) (0213) that force ambient air surrounding one or more elements of the HVAC refrigerant loop (HRL) (0210) across the THS (0240) so as to enable better detection of a refrigerant leak in the HRL (0210) as well as force "stale" ambient air away from the THS (0240) to enable rapid recalibration and reconfiguration of the MTV/DTV and inhibit false refrigeration leak indications by the DCP (0230).

Sensor Record Memory (SRM)/Real-Time Clock (RTC)

As generally depicted in FIG. 2 (0200), the DCP (0230) may in some preferred embodiments be augmented with a sensor record memory (SRM) (0234) and/or a real-time clock (RTC) (0235) that allows the DCP (0230) to log refrigeration leak detections by the DCP (0230). This logging information may then be later communicated to an operator via the ASI (0260) or an alternative communication mechanism such as a wireless network. The SRM (0234) and/or a RTC (0235) may be implemented within the DCP (0230) or optionally incorporated as separate components in the overall system implementation.

Temperature/Humidity Sensor (THS)

As generally depicted in FIG. 2 (0200), the RLD/RLC system may in some preferred embodiments be augmented with one or more temperature/humidity sensors (THS) (0240) that allows the DCP (0230) to adjust the dynamic recalibration of the FSM (0232) by the CCL (0233) based on ambient temperature and/or humidity readings. The THS (0240) may also be used by the DCP (0230) to trigger performance alarms for the HVAC system even if no refrigerant leak is detected by the DCP (0230). In some circumstances a very slow refrigerant leak may reduce the performance of the HVAC system over time and be undetectable using conventional leak detection methodologies implemented using a refrigerant gas sensor (RGS). In these circumstances a refrigerant recharge may be in order and this condition can be determined in some circumstances by monitoring the refrigerant coil temperatures during operation of the HVAC system. Thus, one or more THS (0240) sensors may be employed to constantly check the performance of the HVAC system and log these conditions as alarms to a technician or other individual.

Wireless Communication Interface (WCI)/Mobile User Device (MUD)

As generally depicted in FIG. 2 (0200), the RLD/RLC system may in some preferred embodiments be augmented with a wireless communication interface (WCI) (0280) and/or a mobile user device (MUD) service interface port (SIP) (0290) that allows information to be transmitted to/from the DCP (0230) relating to the state of the HVAC system, detected refrigerant leaks, and other information that may be logged in the sensor record memory (SRM) (0234). This WCI (0280)/MUD (0290) may also be used in some circumstances to control operation of the HVAC system such as control refrigerant flow valves (0220) or compressor contactors (0270) using the DCP (0230).

In many preferred embodiments an AC/Battery power supply (ABS) (0236) may be incorporated into the RLD/RLC system so as to allow it to be placed local to a potentially leaking HCC (0211), HEC (0212), and/or HVAC compressor to allow logging of refrigerant leaks and reporting of same to the WCI (0280)/MUD (0290). In this manner a number of RLD/RLC systems can be deployed at a plurality of HCC (0211), HEC (0212), or HVAC compressors and then a MUD (0290) be used at a later time to scan the individual RLD/RLC systems to determine which particular HCC (0211), HEC (0212), and/or HVAC compressor is actually leaking. Since these leak conditions may be environmentally triggered and not constant, the ability to set the RLD/RLC systems in place, leave the facility, and return to obtain the SRM (0234) refrigerant leak logging information from each individual RLD/RLC system greatly simplifies the detection of refrigerant leaks in a spatially diverse and complex HRL (0210).

Refrigerant Leak Mitigation (RLM) System Overview (0200) HVAC Refrigerant Coil (HRC) Individual Shutdown The present invention refrigerant leak mitigation (RLM) system may contain any combination of RLD elements previously discussed in FIG. 2 (0200) and augments this RLD element configuration as generally depicted in FIG. 2 (0200) with one or more refrigerant control valves (RCV) (0220). The RCV (0220) are typically configured as a refrigerant flow valve (RFV) and an evaporator isolation valve (EIV) that are positioned on either side of a HVAC refrigerant coil (HEC) implemented as a refrigerant evaporator coil (HEC) (0212), but may also be configured as a first condenser isolation valve (FCI) and second condenser isolation valve (SCI) that are used to isolate the outside refrigerant condenser coil (HCC) (0211).

The RLM operation is such that when the DCP (0230) detects a refrigerant leak as signaled by the THS (0240) readings (MTV) and/or delta values (DTV), an ALARM STATE is activated within the DCP (0230) and the DCP operates the RCV (0220) to shutdown refrigerant flow to the HRC (0210). In this manner a HVAC system servicing multiple HEC (0212) can be partially shut down so as to limit the refrigerant leak to one failing HCC (0212) rather than allowing the entire HVAC refrigerant loop (0210) to be drained of refrigerant due to the leak in a particular HCC (0212). The ALARM STATE activated within the DCP (0230) will then activate appropriate alarms within the ASI (0260) and/or provide for an indication of the failing HCC (0212) via wireless communication (0280) to a mobile user device (0290) such as a tablet, smart phone, or other portable display device.

HVAC Compressor Contactor (HCR) Shutdown

The present invention refrigerant leak mitigation (RLM) system discussed in FIG. 2 (0200) may be augmented as depicted in FIG. 2 (0200) with an HVAC compressor contactor (HCR) (0270) interface to the DCP (0230) such that when the DCP (0230) ALARM STATE deactivates the HVAC refrigerant flow loop (HRL) (0210) to one or more of the HVAC refrigerant coils (HRC) (0212) via the use of one or more refrigerant control valves (RCV) (0220), the HCR (0270) are deactivated to inhibit operation of the HVAC refrigerant compressor. In this circumstance the offending HCC (0222) may be isolated and the HRL (0210) inhibited from losing refrigerant. As with the discussion of the RLM configuration of FIG. 2 (0200), the ALARM STATE activated within the DCP (0230) may then activate appropriate alarms within the ASI (0260) and/or provide for an indication of the failing HRC (0212) via wireless communication (0280) to a mobile user device (0290) such as a tablet, smart phone, or other portable display device.

Temperature/Humidity Measurement Context (0300)

The THS sensors used by the DCP within the present invention to detect refrigerant leaks may be placed in a wide variety of locations within a HVAC system. FIG. 3 (0300) illustrates a typical HVAC heat exchanger (0312) incorporating the application of a preferred embodiment of TCC/TCS thermal clamps (0341, 0342) and associated THS sensors (0343, 0344) also showing an optional TCC/TCS attachment magnet (0345) configuration. One skilled in the art will recognize from the teachings herein that this is only one of many possible methodologies to provide THS data for the DCP to determine whether a refrigerant leak has occurred.

This diagram also depicts the DCP (0330) in communication with the THS sensors (0343, 0344) and one or more typically mounted refrigerant gas sensors (RGS) (0301, 0302, 0303) that are in this particular example mounted in the frame of a door (0304). This particular application context may be used in some circumstances where detection of the refrigerant gas as in the case of hotel rooms and the like is desired.

Refrigerant Leak Detection/Mitigation Method Overview (0400)

An exemplary embodiment of a refrigerant leak detection (RLD)/refrigerant leak mitigation (RLM) method overview is generally depicted in FIG. 4 (0400) wherein some of the steps of the RLM method are omitted. In the case of a RLD system implementation, the alarms present in the method steps are designed to alert an operator or repair technician as to the presence of a refrigerant leak and the severity of the leak in question.

As generally depicted in FIG. 4 (0400), the RLD method comprises the following steps:

(1) for RLM operation, with the DCP, enabling refrigerant flow and compressor operation (0401);

(2) with the DCP, calibrating and/or stabilizing the temperature/humidity sensors (THS) (0402);

(3) with the DCP, initialize THS baseline MTV/DTV error levels within a THSwindow (0403);

(4) with the DCP, initializing the THSwindow counter=0 (0404);

(5) with the DCP, monitoring THS measured values (MTV) and delta values (DTV) within the THSwindow (0405);

(6) with the DCP, determining if any of the MTV/DTV is out of range within the THSwindow, and if not, proceeding to step (5) (0406);

(7) with the DCP, updating the MTV/DTV range error counters (0407);

(8) with the DCP, determining if the MTV/DTV counter range limit has been reached, and if not, proceeding to step (5) (0408);

(9) with the DCP, activating ASI audible/visual alarms (0409);

(10) with the DCP, transmitting an ASI condition to the WCI/MUD (0410); and

(11) for RLM operation, with the DCP, disabling refrigerant flow and compressor operation and proceeding to step (2) (0411).

One skilled in the art will recognize that these process steps are exemplary and may be rearranged, augmented, or redacted and will by necessity be adjusted based on application context and the hardware implementation of the system.

The DCP in this configuration is configured to inspect the MTV/DTV values within a backwards-looking THSwindow so as to accumulate conditions in which the individual MTV/DTV readings are out-of-bounds and signaling an error condition in the HVAC system. The accumulation of these errors rather than individual inspection allows noise and other transitory data collection errors to be ignored by the DCP and thus preclude the possibility of false error conditions being triggered by the DCP to the ASI and also prevent an erroneous or premature HVAC compressor shutdown.

Refrigerant Leak Detection/Mitigation Method Detail (0500)

Additional detail of a refrigerant leak detection (RLD)/ refrigerant leak mitigation (RLM) method is generally depicted in FIG. 5 (0500). This method encompasses many, if not all, of the steps associated with a corresponding refrigerant leak (RLD) detection method but provides additional steps in which the refrigerant control valves (RCV) are open/closed as necessary to isolate portions of the HVAC system experiencing a refrigerant leak. In the case of a RLD system implementation, the alarms present in the method steps are designed to alert an operator or repair technician as to the presence of a refrigerant leak and the severity of the leak in question.

As generally depicted in FIG. 5 (0500), the RLD/RLM method detail comprises the following steps:

(1) for RLM operation, with the DCP, enabling refrigerant flow and compressor operation (0501);

(2) with the DCP, delaying to stabilize temperature/ humidity sensor (THS) readings (0502);

(3) with the DCP, initialize window temperature value counter THSwindow=0 (0503);

(4) with the DCP, interrogate the THS to obtain K measured temperature and/or humidity values (MTV) at K discrete points along the HVAC refrigerant loop within the HVAC system to produce MTV[0 . . . K−1] measured values (0504);

(5) with the DCP, calculate K delta temperature and/or humidity values (DTV) between MTV readings (0505);

(6) with the DCP, process MTV/DTV readings and logging error conditions (0506);

(7) with the DCP, processing MTV/DTV readings and logging error conditions (0507);

(8) with the DCP, determining if THSwindow<THSwindowThreshold, and if so, proceeding to step (3), otherwise proceeding to step (2) (0508).

One skilled in the art will recognize that these process steps are exemplary and may be rearranged, augmented, or redacted and will by necessity be adjusted based on application context and the hardware implementation of the system.

MTV/DTV Processing Method Detail (0600)

Figure 6:
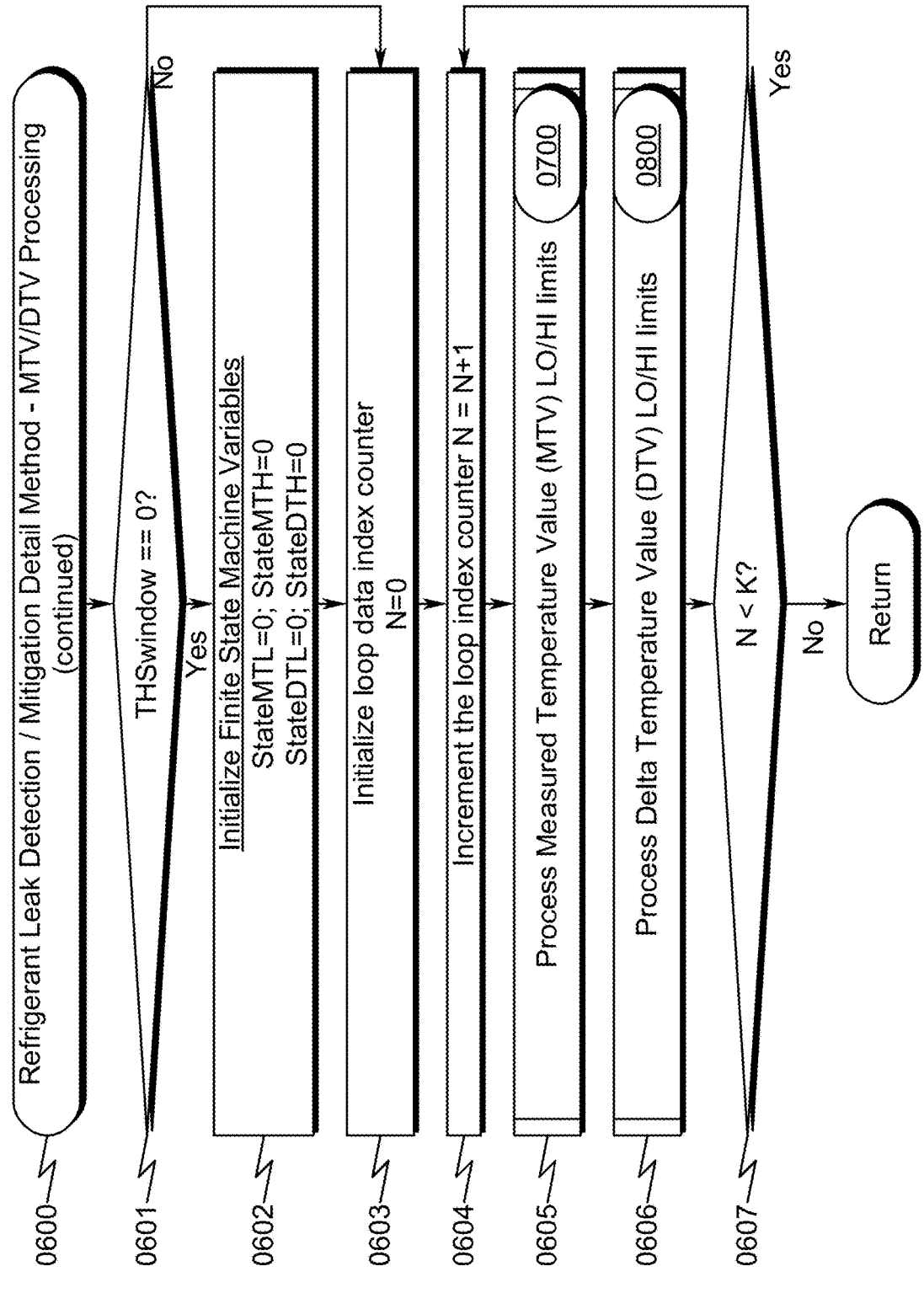
FIG. 6 illustrates a flowchart depicting a preferred invention embodiment of a refrigerant leak detection/mitigation detail method (sheet 2 of 4)

As generally depicted in FIG. 6 (0600), the MTV/DTV processing method detail comprises the following steps:

(1) with the DCP, determining if THSwindow==0, and if so, proceeding to step (3) (0601);

(2) with the DCP, initialize Finite State Machine variables (StateMTL=0; StateMTH=0; StateDTL=0; StateDTH=0) (0602);

(3) with the DCP, initialize loop data index counter N=0 (0603);

(4) with the DCP, incrementing the loop index counter N=N+1 (0604);

(5) with the DCP, processing measured temperature value (MTV) LO/HI limits (0605);

(6) with the DCP, processing delta temperature value (DTV) LO/HI limits (0606);

(7) with the DCP, determining if N<K, and if so, proceeding to step (4) (0607);

(8) returning to calling process (0608).

One skilled in the art will recognize that these process steps are exemplary and may be rearranged, augmented, or redacted and will by necessity be adjusted based on application context and the hardware implementation of the system.

MTV LO/HI Processing Method Detail (0700)

As generally depicted in FIG. 7 (0700), the MTV LO/HI processing method detail comprises the following steps:

(1) with the DCP, determining if MTV[N]<measured error LO value (MEL), and if not, proceeding to step (4) (0701);

(2) with the DCP, incrementing StateMEL=StateMEL+1 (0702);

(3) with the DCP, determining if StateMEL>AlarmMEL threshold, and if so, proceeding to step (7) (0703);

(4) with the DCP, determining if MTV[N]>measured error HI value (MEH), and if not, proceeding to step (13) (0704);

(5) with the DCP, incrementing StateMEH=StateMEH+1 (0705);

(6) with the DCP, determining if StateMEH>AlarmMEH threshold, and if not, proceeding to step (13) (0706);

(7) with the DCP, determining if StateMEL>AlarmMEL threshold, and if not, proceeding to step (9) (0707);

(8) with the DCP, triggering alarm status indicator (ASI) for refrigerant line undertemp and proceeding to step (11) (0708);

(9) with the DCP, determining if StateMEH>AlarmMEH threshold, and if not, proceeding to step (13) (0709);

(10) with the DCP, trigger alarm status indicator for refrigerant line overtemp (0710);

(11) with the DCP, transmitting ASI to mobile user device (MUD) via wireless communication interface (WCI) (0711);

(12) for RLM operation, with the DCP, shutdown HVAC Compressor Contactor (HCR) (0712); and

(13) returning to calling process (0713).

One skilled in the art will recognize that these process steps are exemplary and may be rearranged, augmented, or redacted and will by necessity be adjusted based on application context and the hardware implementation of the system.

DTV LO/HI Processing Method Detail (0800)

As generally depicted in FIG. 8 (0800), the DTV LO/HI processing method detail comprises the following steps:

(1) with the DCP, determining if DTV[N]<measured error LO value (DEL), and if not, proceeding to step (4) (0801);

(2) with the DCP, incrementing StateDEL=StateDEL+1 (0802);

(3) with the DCP, determining if StateDEL>AlarmDEL threshold, and if so, proceeding to step (7) (0803);

(4) with the DCP, determining if DTV[N]>measured error HI value (DEH), and if not, proceeding to step (13) (0804);

(5) with the DCP, incrementing StateDEH=StateDEH+1 (0805);

(6) with the DCP, determining if StateDEH>AlarmDEH threshold, and if not, proceeding to step (13) (0806);

(7) with the DCP, determining if StateDEL>AlarmDEL threshold, and if not, proceeding to step (9) (0807);

(8) with the DCP, triggering alarm status indicator (ASI) for refrigerant line undertemp and proceeding to step (11) (0808);

(9) with the DCP, determining if StateDEH>AlarmDEH threshold, and if not, proceeding to step (13) (0809);

(10) with the DCP, trigger alarm status indicator for refrigerant line overtemp (0810);

(11) with the DCP, transmitting ASI to mobile user device (MUD) via wireless communication interface (WCI) (0811);

(12) for RLM operation, with the DCP, shutdown HVAC Compressor Contactor (HCR) (0812); and

(13) returning to calling process (0813).

One skilled in the art will recognize that these process steps are exemplary and may be rearranged, augmented, or redacted and will by necessity be adjusted based on application context and the hardware implementation of the system.

Temperature Measurement Environment (TME) (0900)

Figure 9:
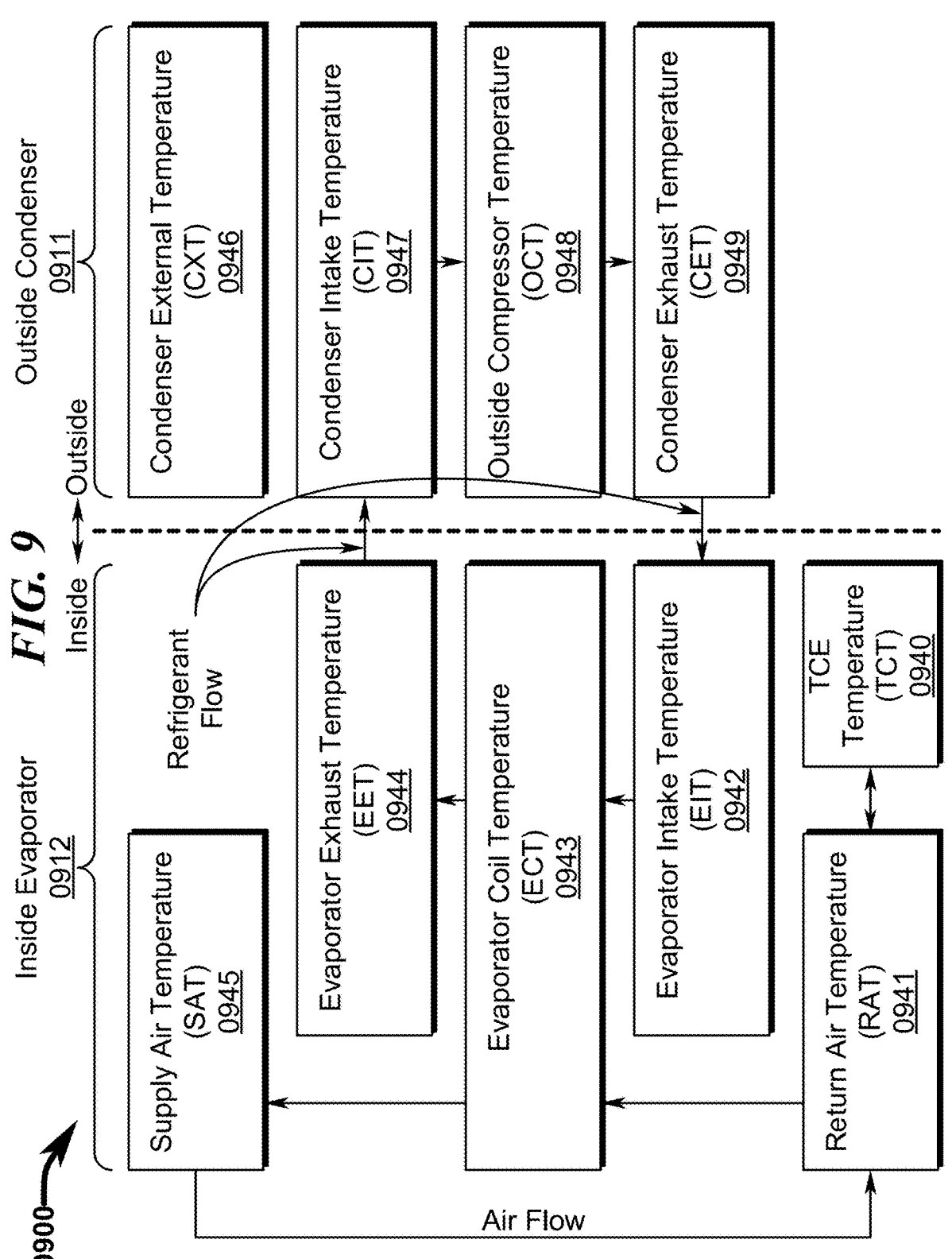
FIG. 9 illustrates a system block diagram depicting a typical HVAC temperature measurement environment (TME)

The present invention may be implemented in many forms, but a preferred exemplary embodiment is generally depicted in FIG. 9 (0900) wherein a HVAC system is depicted incorporating an outdoor condenser (0911) and inside evaporator (0912) which form a HVAC refrigerant loop (HRL). In this depicted invention embodiment, temperature sensors (THS) are depicted that monitor the temperature controlled environment (TCE) (0940), return air temperature (RAT) (0941), evaporator intake temperature (EIT) (0942), evaporator coil temperature (ECT) (0943), evaporator exhaust temperature (EET) (0944), and supply air temperature (SAT) (0945) within the inside evaporator (0912). The outside condenser (0911) portion of the HRL is monitored by THS comprising a condenser external temperature (CXT) (0946), condenser intake temperature (CIT) (0947), outside compressor temperature (OCT) (0948), and condenser exhaust temperature (CET) (0949) temperature sensors.

The TCT (0940) and CXT (0946) may be used to determine a range of acceptable operating conditions for the compressor, condenser coils, and evaporator coils. For example, if the measured CXT (0946) temperature is very high, the efficiency of the HVAC system in AC mode may be degraded.

Compressor operation may be monitored by inspecting the CXT (0946) as well as the OCT (0948) to determine if the absolute temperature values or temperature differential is outside a predetermined range that would adversely impact the operation of the compressor long-term. For example, extended operation at over-temp conditions can significantly decrease compressor reliability and should be avoided. These over-temperature conditions may indicate a loss of refrigerant or other system-wide abnormalities that require repair or maintenance.

Temperature Sensor Bus (TSB) (1000)-(1200)

Figure 10:
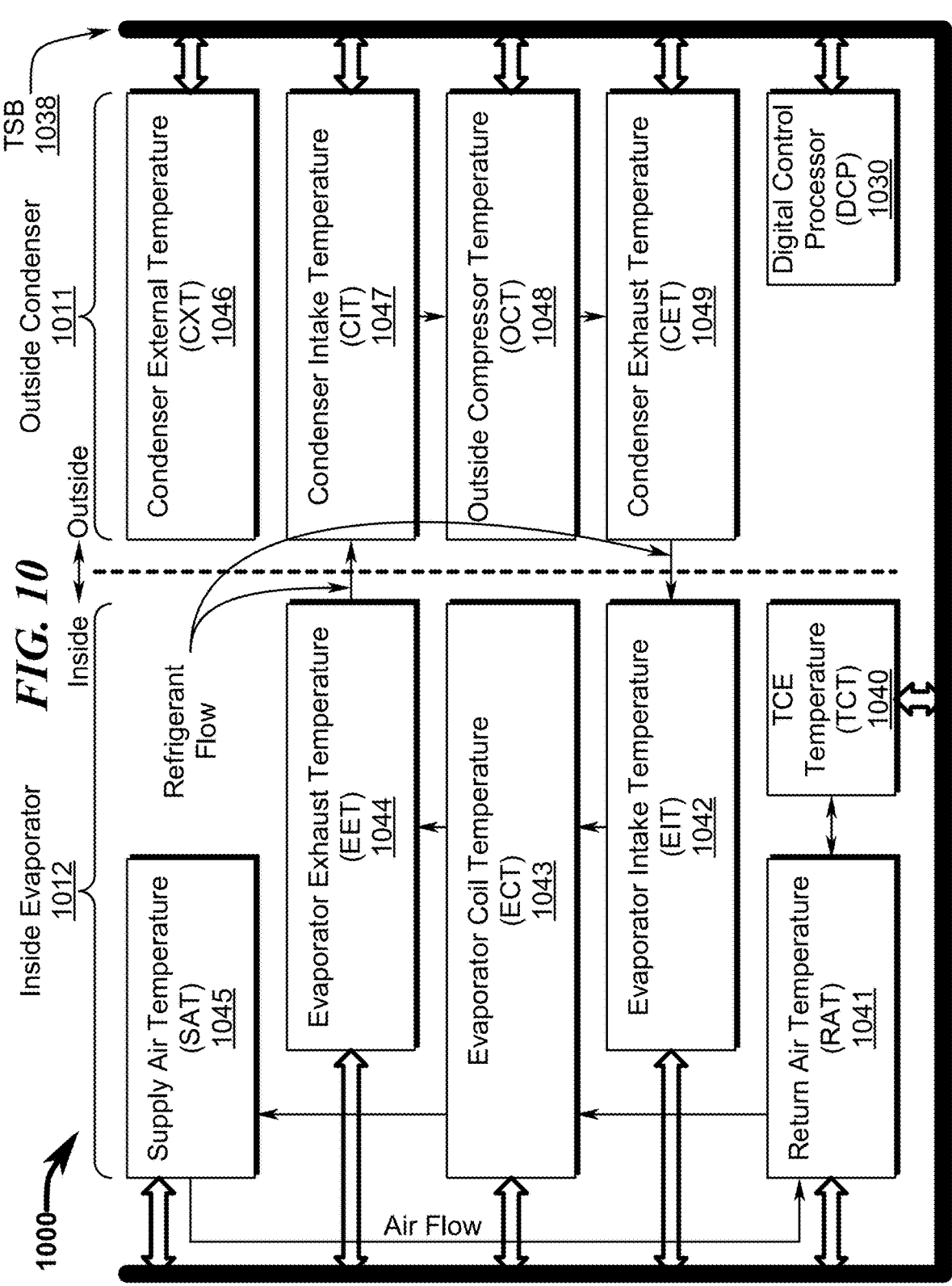
FIG. 10 illustrates an exemplary temperature sensor bus (TSB) incorporating wired temperature/humidity sensors.

As generally depicted in FIG. 10 (1000), the present invention may collect data from the various THS via the use of a temperature sensor bus (TSB) (1038) that is typically a serial 1-wire data bus that interconnects the various THS such as DALLAS SEMICONDUCTOR MODEL DS18B20 temperature sensors or other temperature/humidity sensors. The TSB (1038) may directly interface to the DCP (1030) or in some circumstances be indirectly coupled to the DCP (1030) via wired or wireless communication.

Figure 11:
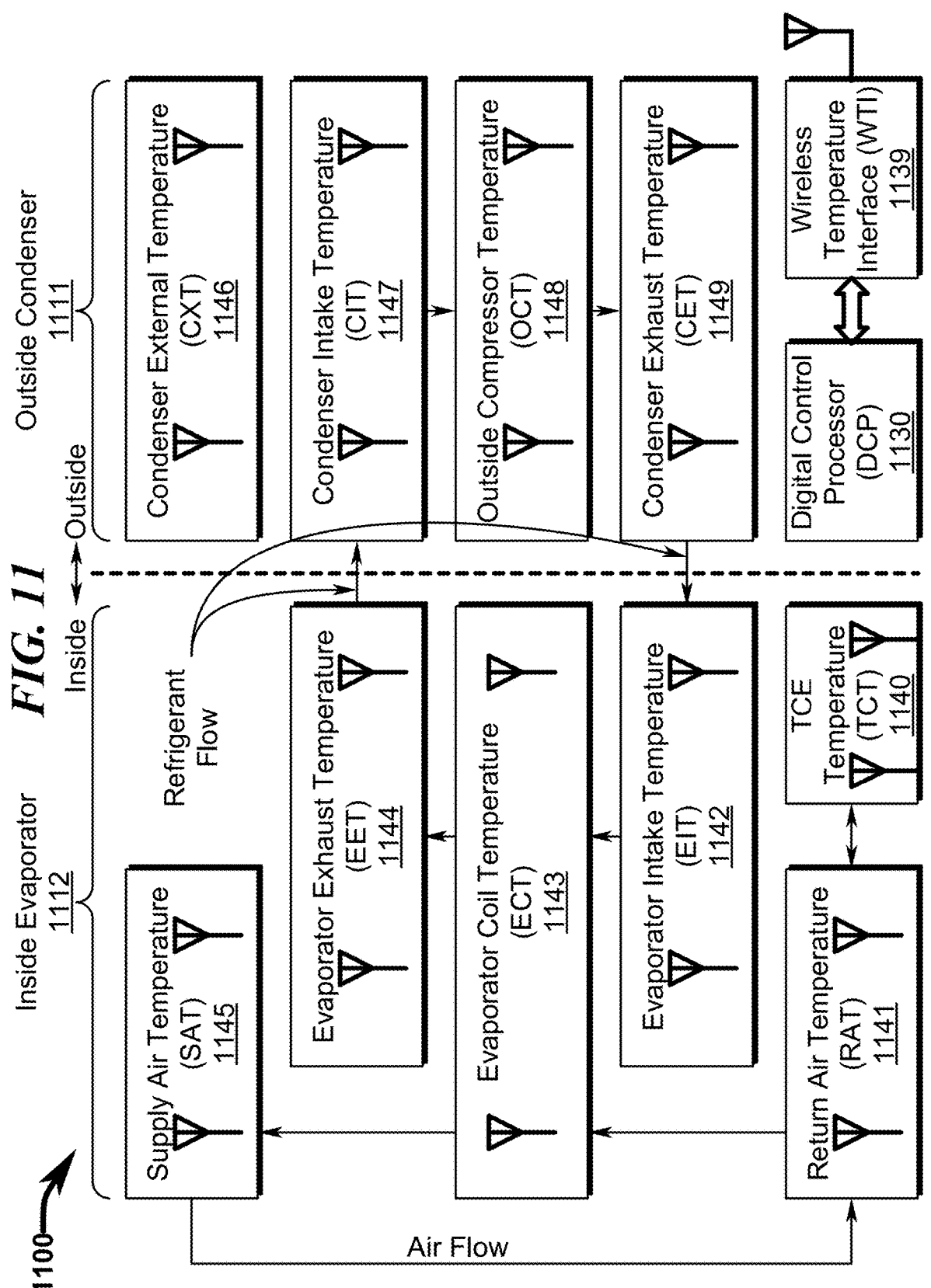
FIG. 11 illustrates an exemplary temperature sensor bus (TSB) incorporating wireless temperature/humidity sensors.

FIG. 11 (1100) depicts a preferred embodiment wherein the communication between the various THS to the DCP is accomplished using a wireless temperature interface (WTI) (1139) in which each of the THS is configured with a separate wireless transmitter. This configuration allows easy retrofit into scenarios where the different temperature measurement points are spatially diverse.

Figure 12:
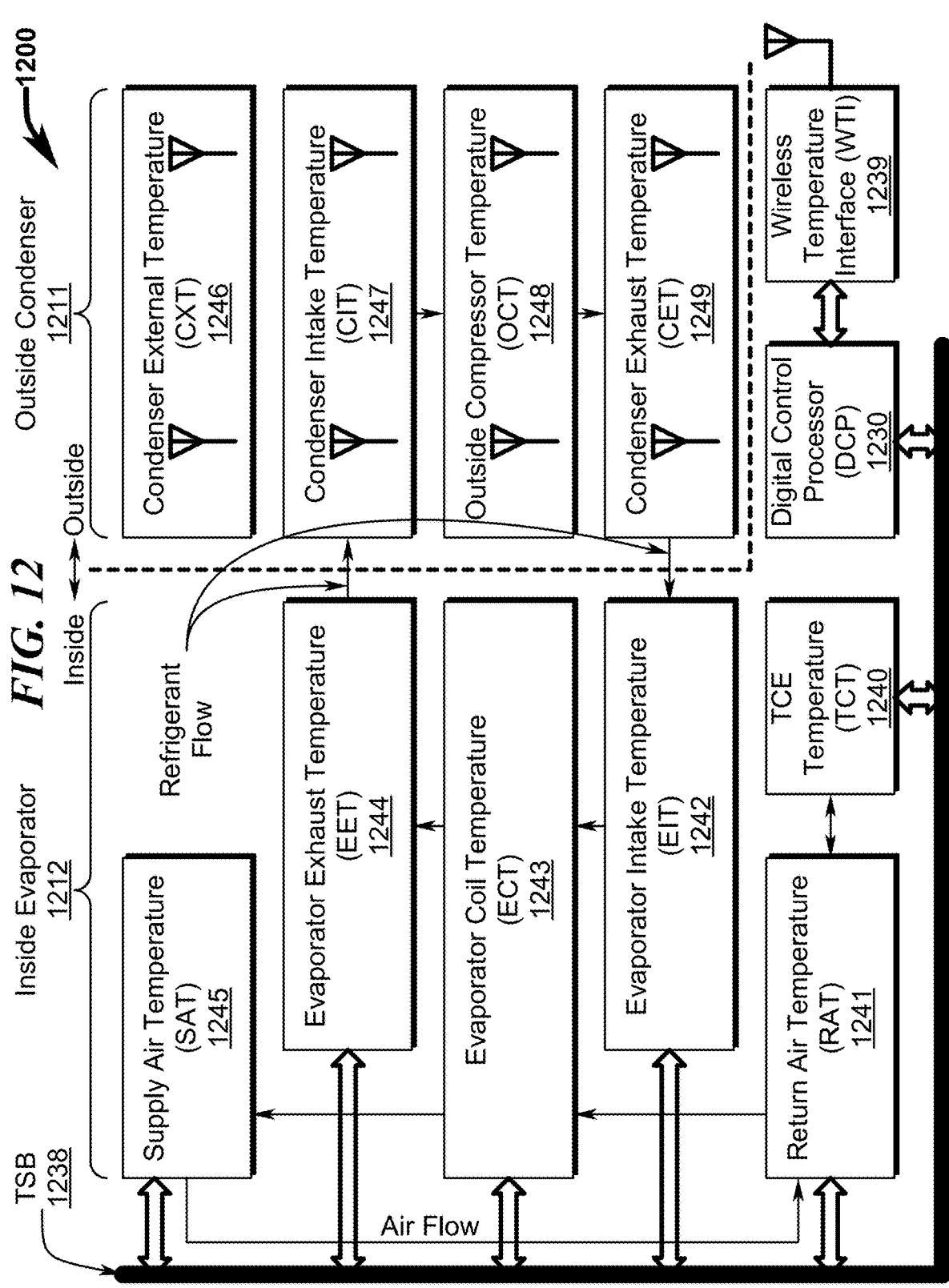
FIG. 12 illustrates an exemplary temperature sensor bus (TSB) incorporating a hybrid of wired and wireless temperature/humidity sensors.

FIG. 12 (1200) depicts another preferred embodiment wherein a hybrid communication system is configured to allow a wired serial bus (1238) to be used within the building structure but a wireless interface (1239) to be used on the outside of the building with respect to the compressor portion of the HVAC system.

The present invention anticipates that in some circumstances a hybrid communication methodology may be utilized for the THS-to-DCP communication wherein one or more of the THS is outfitted with a wireless transmitter/transceiver that communicates with the DCP. Various THS may be tied together with a 1-wire serial bus and then this bus may be interfaced with a wireless transmitter/transceiver to communicate this temperature/humidity information to the DCP. Within this context, it is anticipated that the DCP may be configured with a THS enumeration algorithm to uniquely identify each THS and associated this unique identification with a particular physical position within the overall HVAC system (such as the TCT, RAT, EIT, ECT, EET, SAT, CXT, CIT, OCT, CET, or other physical location within the HVAC system).

RGL Pre-Validation by DTM Method (1300)

The present invention may utilize the DTM to pre-validate the detection of a RGL by a RGS as depicted in FIG. 13 (1300) and described in the following manner. The DCP can be configured to collect a plurality of temperatures/humidities within the HVAC system and use this information to generate a DTM. If any portion of the DTM is outside a predetermined limit, the RGS can be activated to determine if a RGL can be detected. If the RGL is in fact detected, then the ASI can be activated and associated HVAC contactors/valves deactivated/closed to shutdown the HVAC system and thus mitigate any RGL leak.

This methodology has a significant advantage over simply monitoring the RGS continuously to determine a RGL in that the MTV data that is used to populate the DTM can be obtained using low-power THS, whereas the RGS sensors consume a considerable amount of electrical power when active. Thus, if the activation of the RGS can be pre-validated by the detection of anomalous MTV values within the DTM using low-power techniques, then the overall gas leak detection/mitigation system can be operated on battery or low power with the RGS only intermittently being activated to obtain a more certain indication that a refrigerant leak has occurred.

As generally depicted in the flowchart of FIG. 13 (1300), the RGL pre-validation by DTM method comprises the following steps:

(1) monitoring HVAC measured temperature/humidity sensor (THS) values (MTV) with a digital control processor (DCP) and generating a differential temperature matrix (DTM) from the MTV values (1301);

(2) with the DCP, determining if the DTM is out of a predetermined range, and if not, proceeding to step (1) (1302);

(3) with the DCP, activating a refrigerant gas sensor (RGS) and detecting if a refrigerant gas leak (RGL) is present (1303);

(4) with the DCP, detecting the presence of a RGL, and if a RGL is not detected, proceeding to step (1) (1304);

(5) activating an ASI alarm (1305); and (6) deactivating HVAC compressor contactors and/or closing refrigerant flow valves to mitigate refrigerant loss in the HVAC system (1306).

Figure 16:
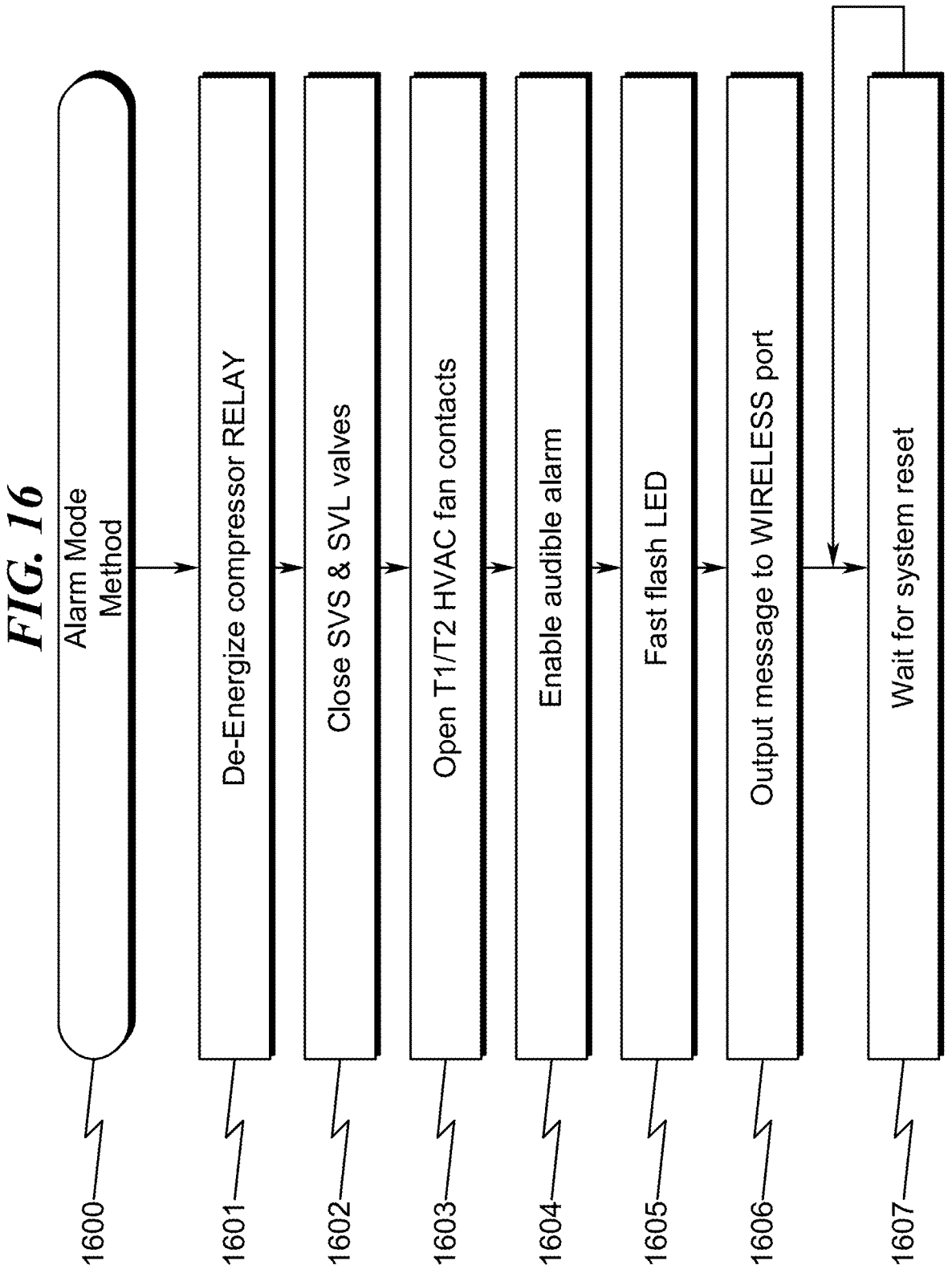
FIG. 16 illustrates a flowchart depicting an ALARM mode method useful in some preferred invention embodiments.

Steps (5) and/or (6) may be augmented by the ALARM method as depicted in FIG. 16 (1600).

RGL Post-Validation by DTM Method (1400)

The present invention may utilize the DTM to post-validate the detection of a RGL by a RGS as depicted in FIG. 14 (1400) and described in the following manner.

The RGS can be activated by the DCP to determine if a RGL can be detected. If the RGL is possibly detected by the RGS, the DCP can be configured to collect a plurality of temperatures within the HVAC system and use this information to generate a DTM. If any portion of the DTM is outside a predetermined limit, then this confirms that a RGS has in fact been detected and then the ASI can be activated and associated HVAC contactors/valves deactivated/closed to shutdown the HVAC system and thus mitigate any RGL leak.

This methodology has a significant advantage over simply monitoring the RGS continuously to determine a RGL in that while the RGS may be susceptible to spurious false-positive readings that indicate a RGL, the MTV data that is used to populate the DTM will either validate that a RGL has occurred or indicate that HVAC temperatures are within nominal ranges and the RGS readings can be ignored. Given the large variations in ambient gas emissions in commercial environments that can generate false-positive RGL alarm conditions, the ability to double-check the RGL condition using MTV obtained from THS greatly improves the credibility of any RGS indications of a RGL.

As generally depicted in the flowchart of FIG. 14 (1400), the RGL post-validation by DTM method comprises the following steps:

(1) with a digital control processor (DCP), activating a refrigerant gas sensor (RGS) and detecting if a refrigerant gas leak (RGL) is present (1401);

(2) with the DCP, detecting the presence of a RGL, and if a RGL is not detected, proceeding to step (1) (1402);

(3) monitoring HVAC temperature/humidity sensor (THS) values (MTV) with a DCP and generating a differential temperature matrix (DTM) from the MTV values (1403);

(4) with the DCP, determining if the DTM is out of a predetermined range, and if not, proceeding to step (1) (1404);

(5) activating an ASI alarm (1405); and (6) deactivating HVAC compressor contactors and/or closing refrigerant flow valves to mitigate refrigerant loss in the HVAC system (1406).

Steps (5) and/or (6) may be augmented by the ALARM method as depicted in FIG. 16 (1600).

RGL Dual-Validation by DTM Method (1500)

The present invention may utilize the DTM to dual-validate the detection of a RGL by a RGS as depicted in FIG. 15 (1500) and described in the following manner.

The RGS can be activated by the DCP to determine if a RGL can be detected. If the RGL is possibly detected by the RGS, an ALARM condition may be triggered. If the RGL is not detected by the RGS, then the DCP can be configured to collect a plurality of temperatures within the HVAC system and use this information to generate a DTM. If any portion of the DTM is outside a predetermined limit, then indicates that a RGS has occurred and then the ASI can be activated and associated HVAC contactors/valves deactivated/closed to shutdown the HVAC system and thus mitigate any RGL leak.

This methodology improves over the use of a single RGS in the detection of a refrigerant leak because the RGL could be a very slow leak that is not detected by the RGS and as such depending only on the RGS as the leak detection mechanism may fail in some situations. By utilizing the DTM as an additional check for RGL status, this prevents false-negative readings for the RGS that would otherwise be ignored by the detection system.

As generally depicted in the flowchart of FIG. 15 (1500), the RGL dual-validation by DTM method comprises the following steps:

(1) with a digital control processor (DCP), activating a refrigerant gas sensor (RGS) and detecting if a refrigerant gas leak (RGL) is present (1501);

(2) with the DCP, detecting the presence of a RGL, and if a RGL is detected, proceeding to step (5) (1502);

(3) monitoring HVAC temperature/humidity sensor (THS) values (MTV) with a DCP and generating a differential temperature matrix (DTM) from the MTV values (1503);

(4) with the DCP, determining if the DTM is out of a predetermined range, and if not, proceeding to step (1) (1504);

(5) activating an ASI alarm (1505); and (6) deactivating HVAC compressor contactors and/or closing refrigerant flow valves to mitigate refrigerant loss in the HVAC system (1506).

Steps (5) and/or (6) may be augmented by the ALARM method as depicted in FIG. 16 (1600). Note that the ordering of these method steps may be reversed so that the DTM is generated and tested before the RGS with no loss of generality in the overall functioning of the system.

Alarm Mode Detail (1600)

As generally depicted in FIG. 16 (1600), a detected refrigerant leak may activate an ALARM mode having several ancillary functions. Generally speaking, this ALARM mode may include one or more of the following steps:

(1) de-energizing a compressor RELAY (1601);

(2) closing SVS & SVL valves (1602);

(3) opening T1/T2 HVAC fan contacts (1603);

(4) enabling an audible alarm (1604);

(5) fast flashing a LED indicator (1605);

(6) outputting a message to WIRELESS communication port (1606); and/or (7) waiting in a loop for a hardware system reset (1607). These steps may be augmented and/or omitted and rearranged as needed based on system application context

THS Thermal Contact Exemplary Embodiments (1700)-(6400)

While the present invention anticipates a wide variety of methodologies by which thermal contact between a HVAC system component and a THS may be affected, the present invention anticipates that several novel methodologies disclosed herein may be optimal for many system configurations. While there do exist a variety of prior art thermal "clamps" that incorporate thermistors and the like for temperature measurement in situations where plumbing pipe and other fixtures are to be measured for temperature, most of these prior-art configurations are not suitable in situations where the THS is to be permanently or semi-permanently installed. Additionally, these prior art configurations generally exhibit high thermal resistance between the pipe to be measured and the thermal sensor.

Figure 17:
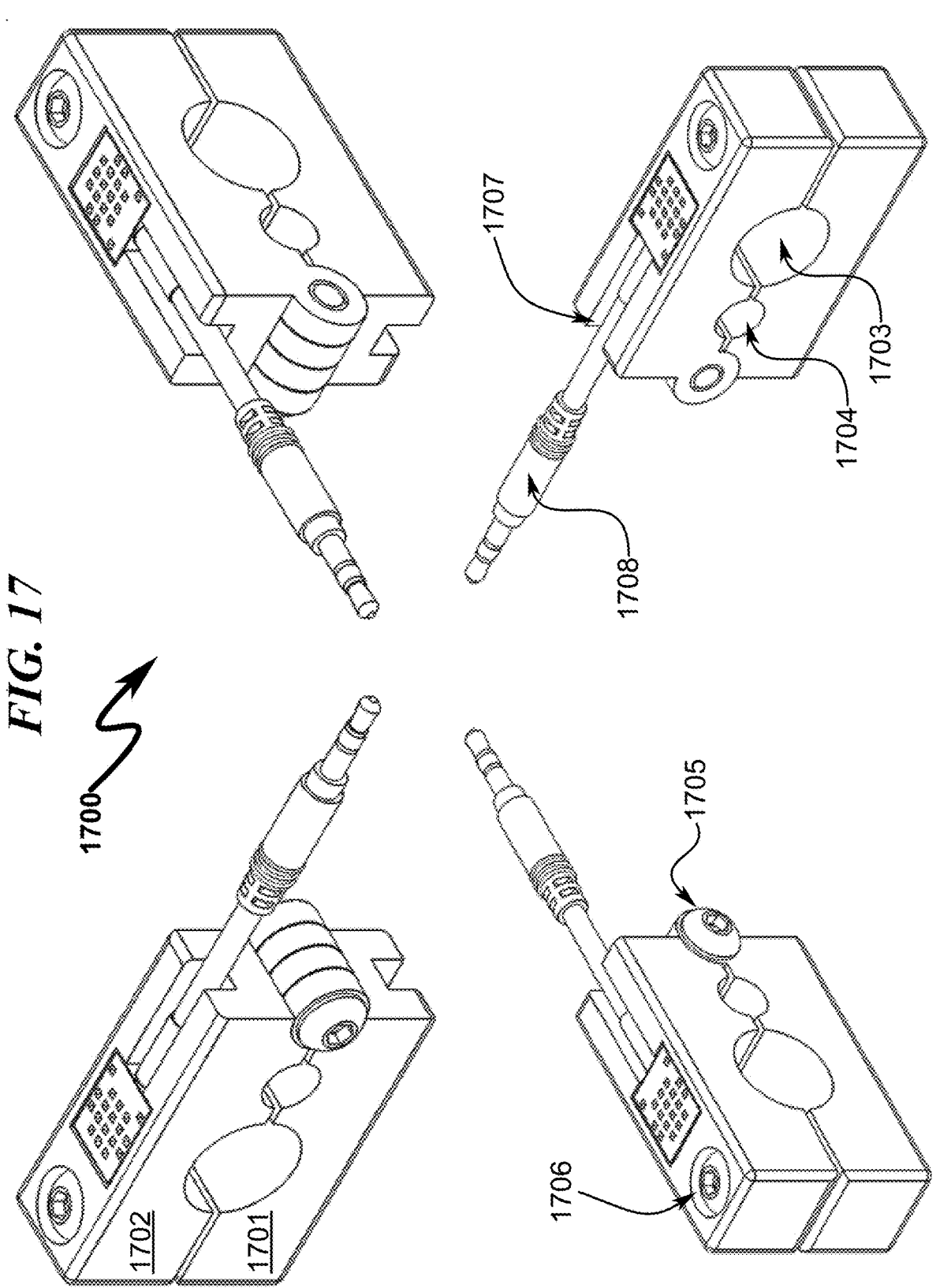
FIG. 17 illustrates various top perspective views of a preferred exemplary THS thermal contact clamp (TCC) incorporating a typical temperature/humidity sensor.
Figure 18:
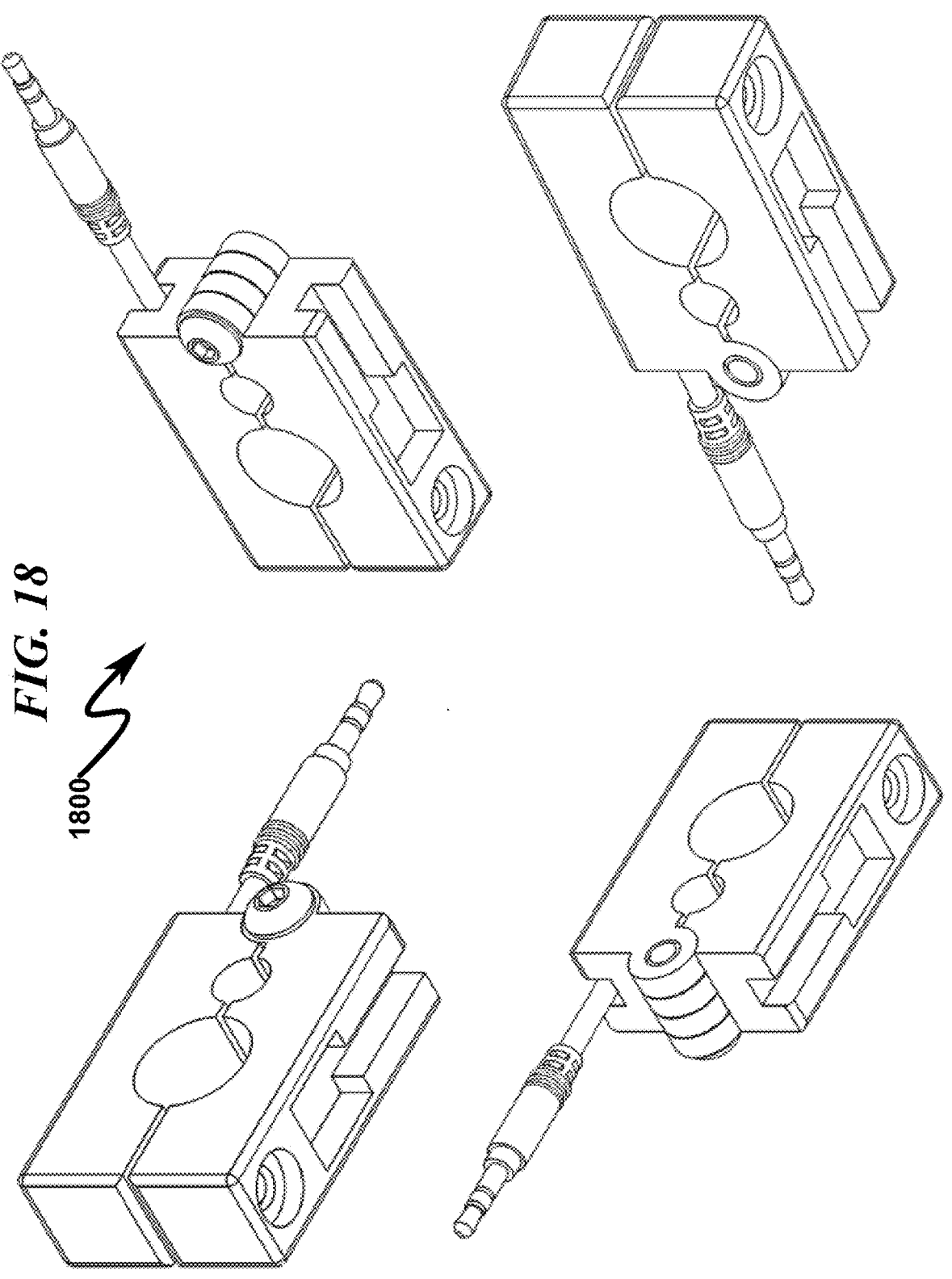
FIG. 18 illustrates various bottom perspective views of a preferred exemplary THS thermal contact clamp (TCC) incorporating a typical temperature/humidity sensor.
Figure 24:
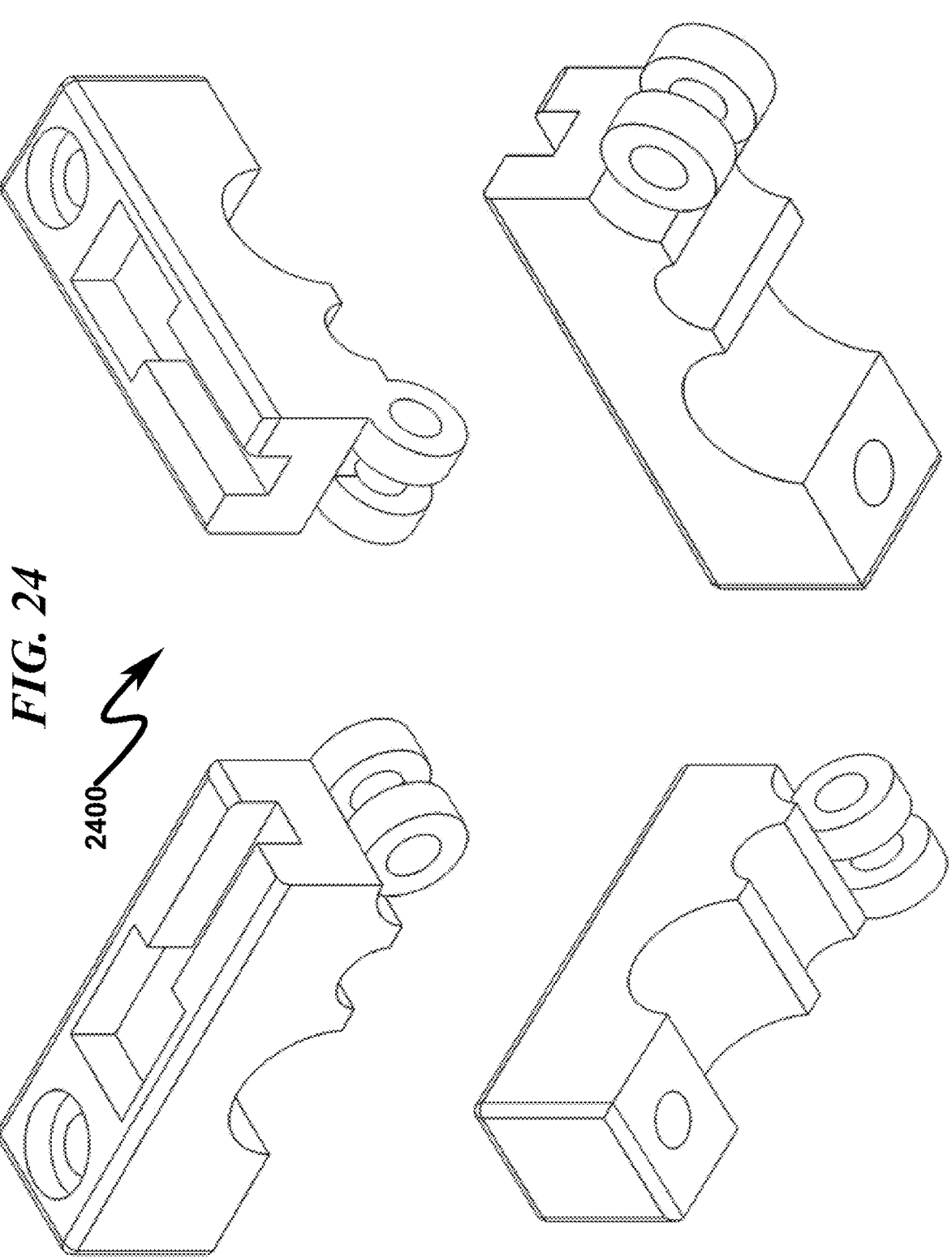
FIG. 24 illustrates various perspective views of a preferred exemplary THS thermal contact clamp (TCC) configured to incorporate a typical temperature/humidity sensor (single piece of symmetric assembly)
Figure 25:
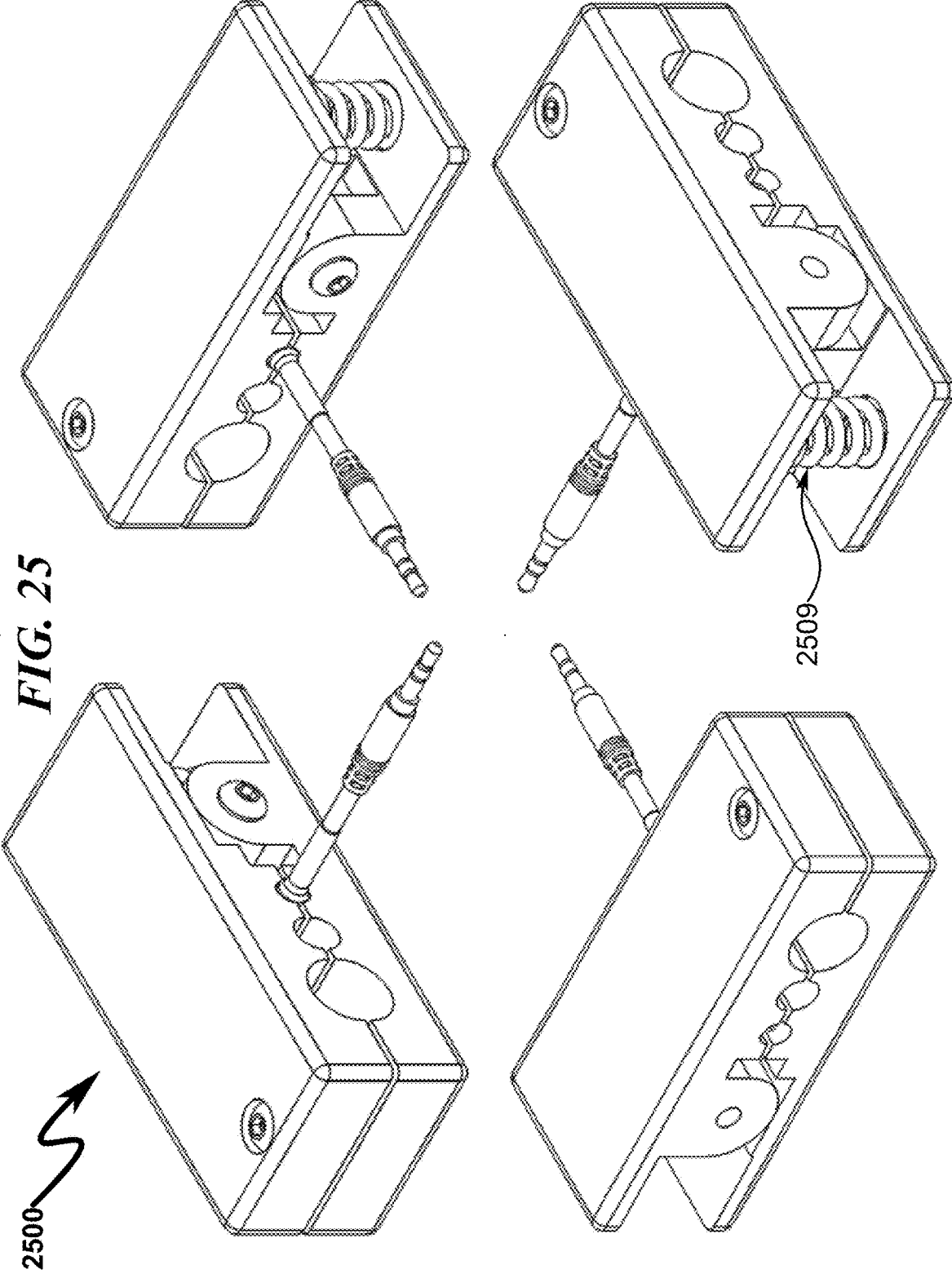
FIG. 25 illustrates various top perspective views of a preferred exemplary THS spring-loaded thermal contact clamp (TCS) incorporating a typical temperature sensor.
Figure 26:
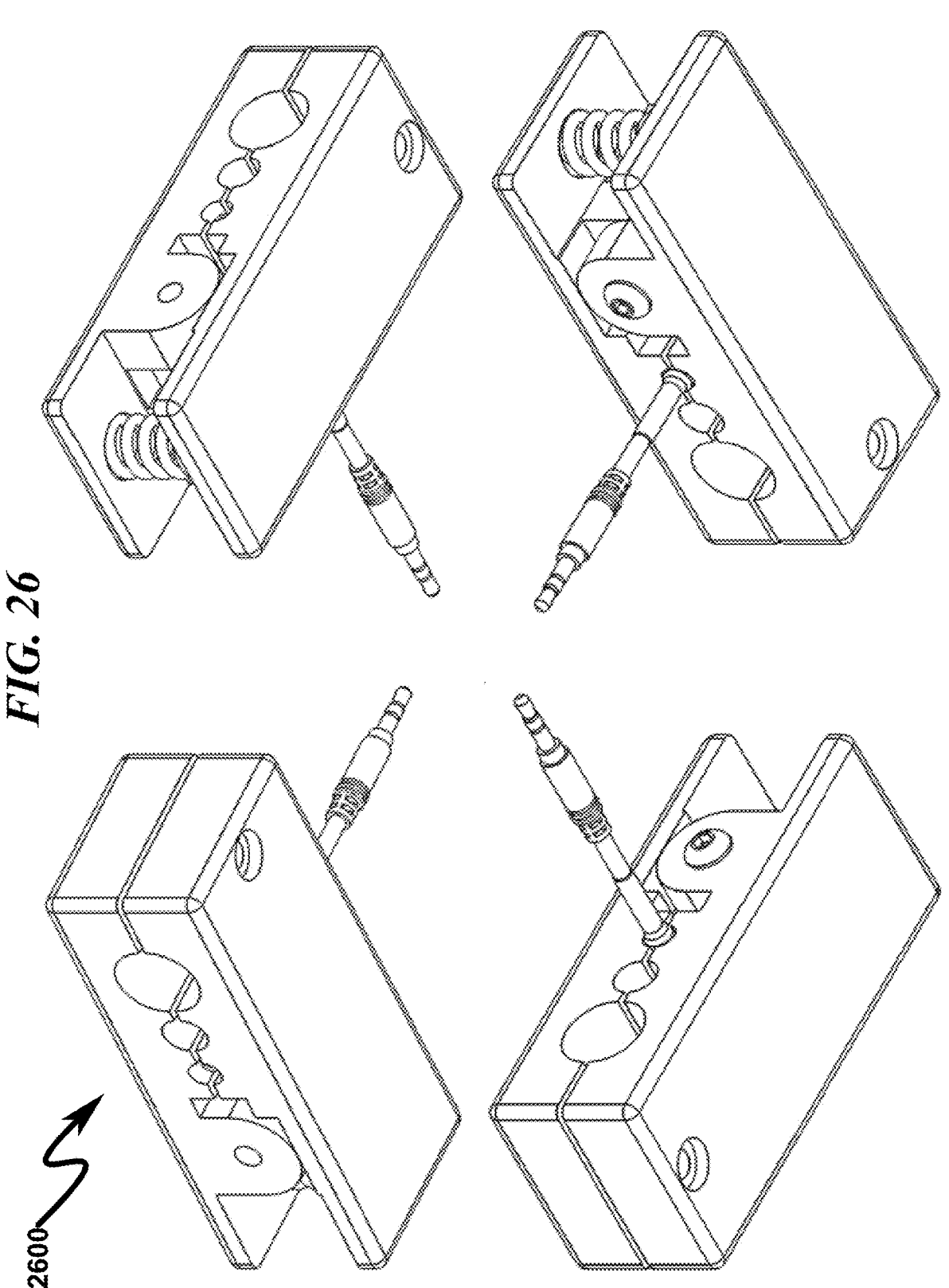
FIG. 26 illustrates various bottom perspective views of a preferred exemplary THS spring-loaded thermal contact clamp (TCS) incorporating a typical temperature sensor.
Figure 32:
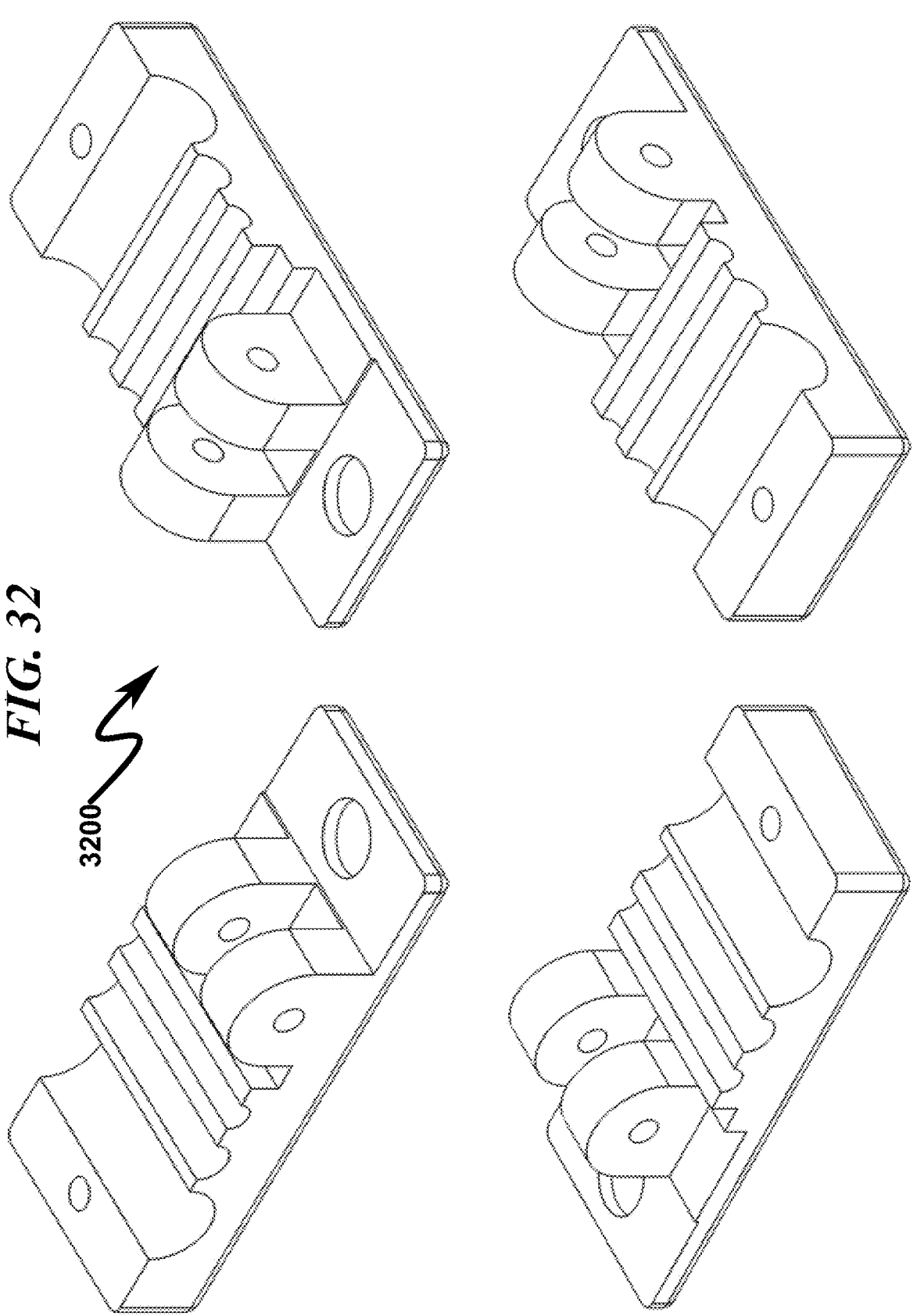
FIG. 32 illustrates various perspective views of a preferred exemplary THS spring-loaded thermal contact clamp (TCS) incorporating a typical temperature sensor (single piece of symmetric assembly)
Figure 33:
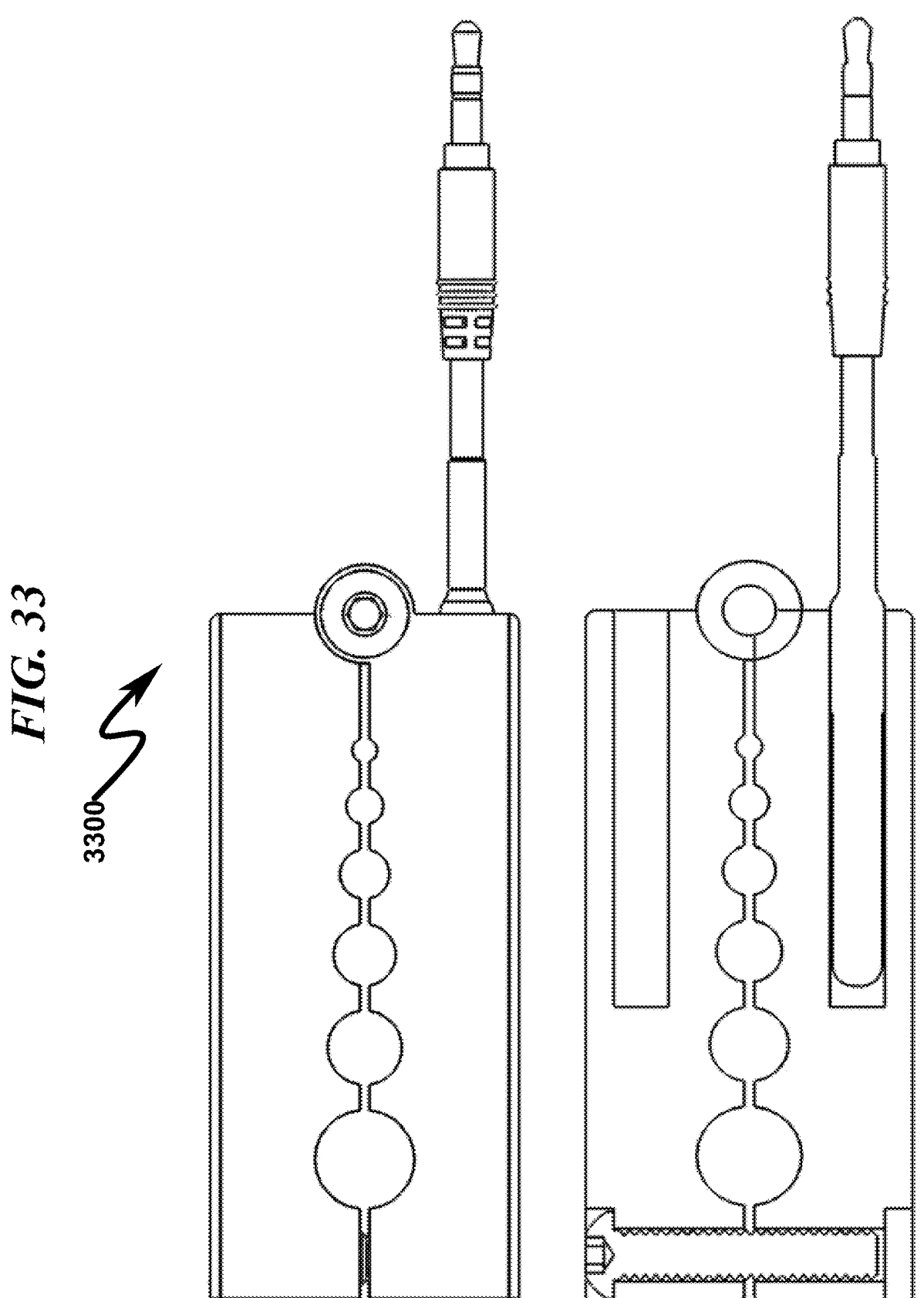
FIG. 33 illustrates front and front section views of a preferred exemplary THS thermal contact clamp (TCC) incorporating a typical temperature sensor.
Figure 34:
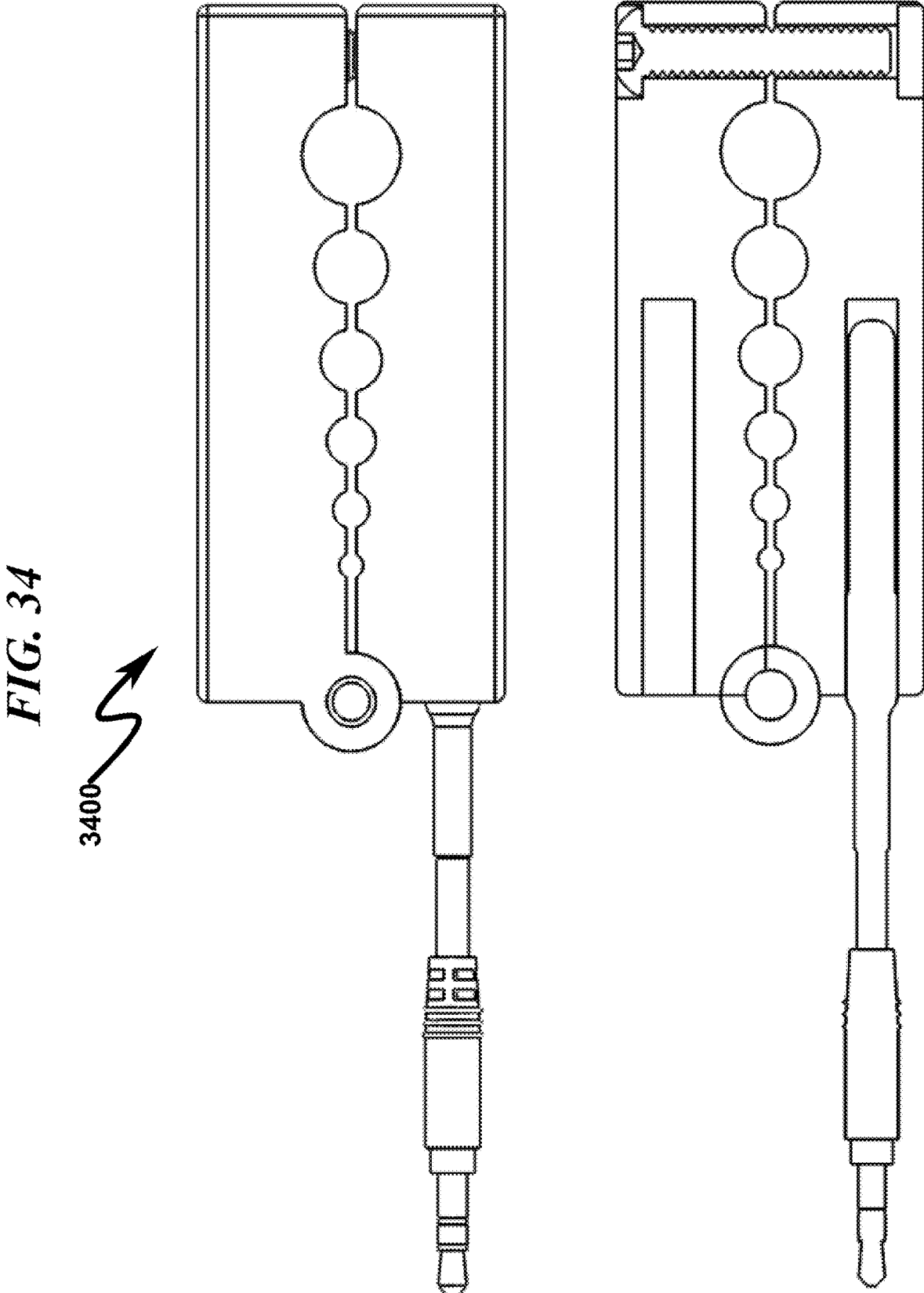
FIG. 34 illustrates rear and rear section views of a preferred exemplary THS thermal contact clamp (TCC) incorporating a typical temperature sensor.
Figure 36:
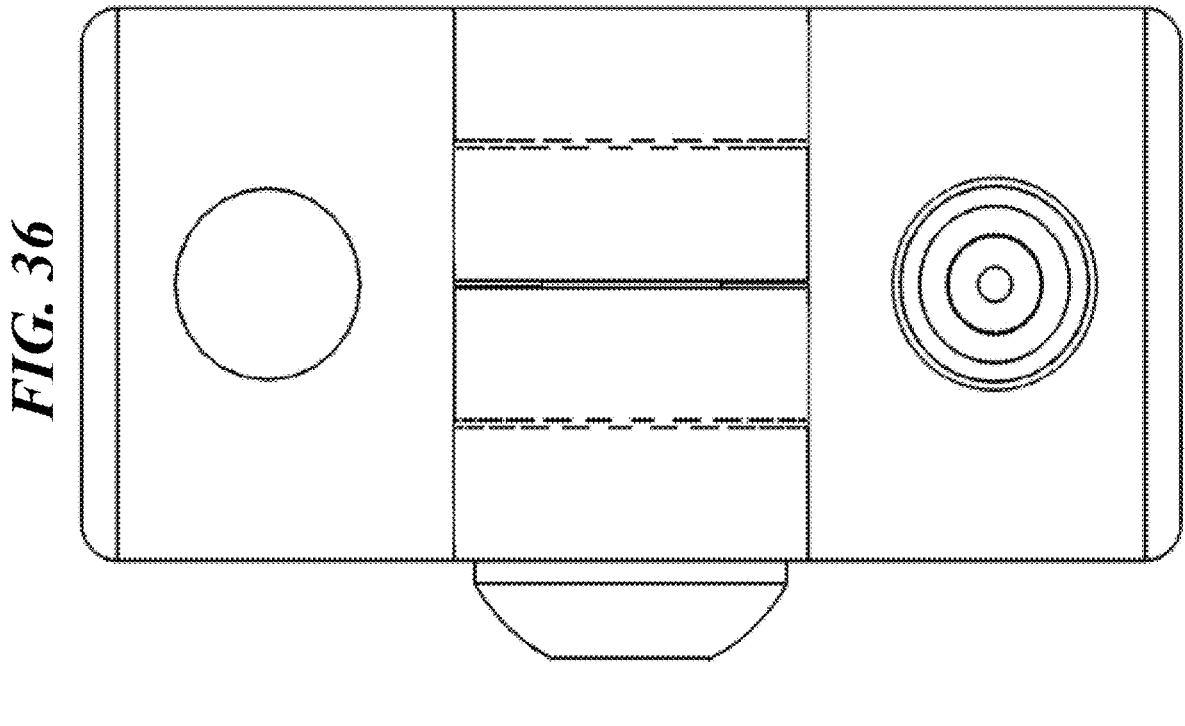
FIG. 36 illustrates a right side view of a preferred exemplary THS thermal contact clamp (TCC) incorporating a typical temperature sensor.
Figure 40:
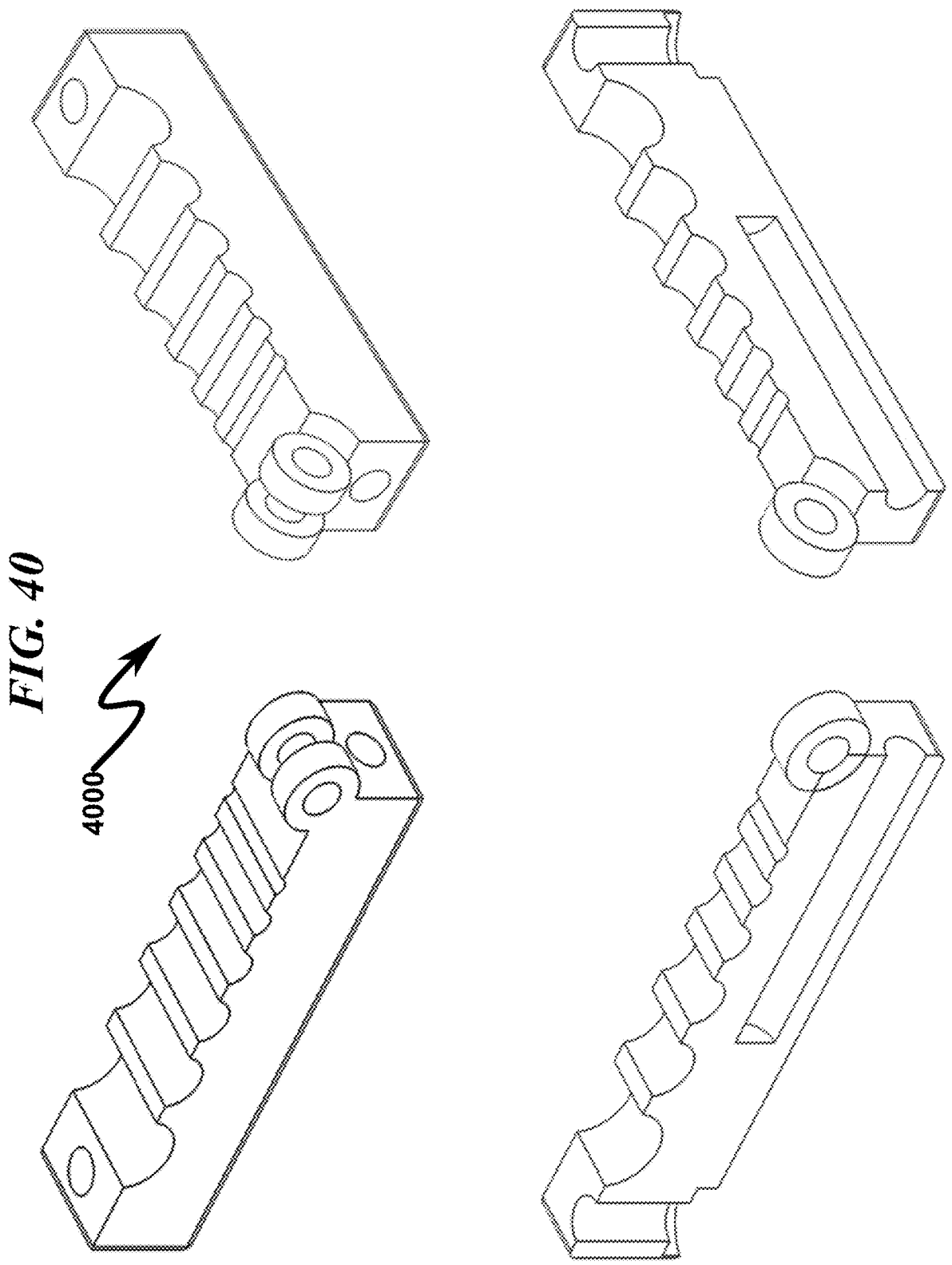
FIG. 40 illustrates various perspective section views of a preferred exemplary THS thermal contact clamp (TCC) in isolation depicting mating surfaces and general construction (one piece of symmetric assembly)
Figure 41:
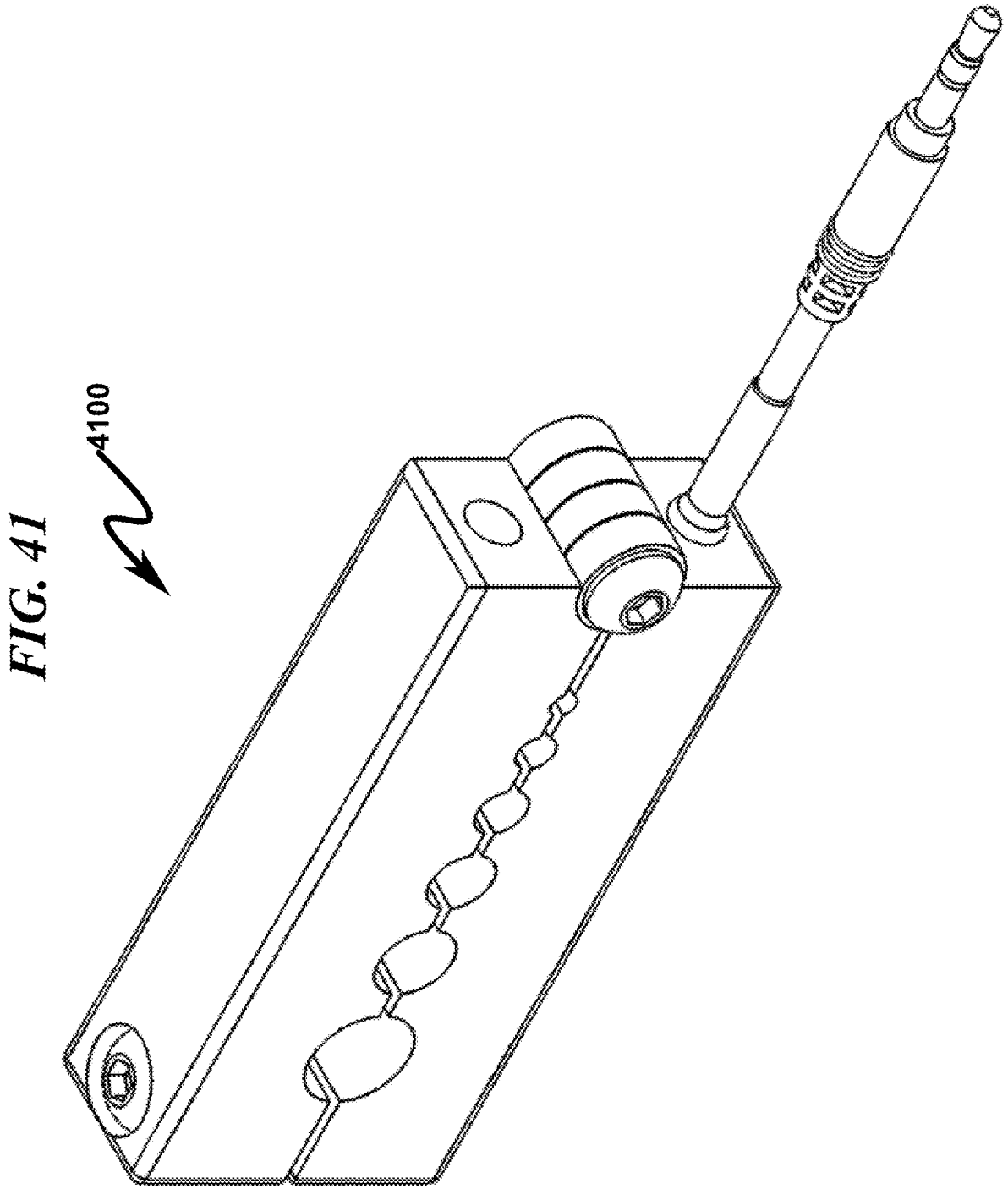
FIG. 41 illustrates a top right front perspective view of a preferred exemplary THS thermal contact clamp (TCC) incorporating a typical temperature sensor.
Figure 42:
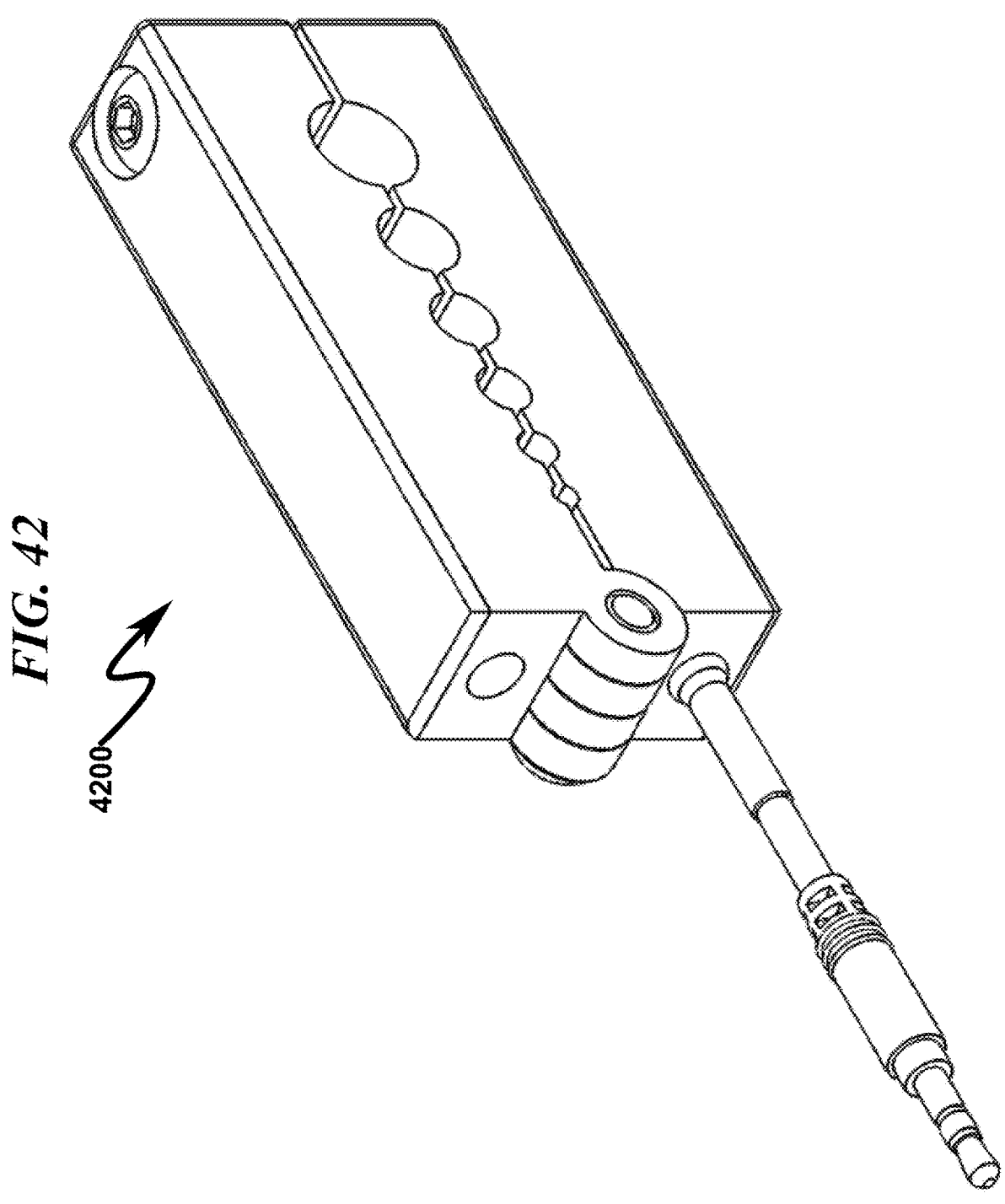
FIG. 42 illustrates a top right rear perspective view of a preferred exemplary THS thermal contact clamp (TCC) incorporating a typical temperature sensor.
Figure 43:
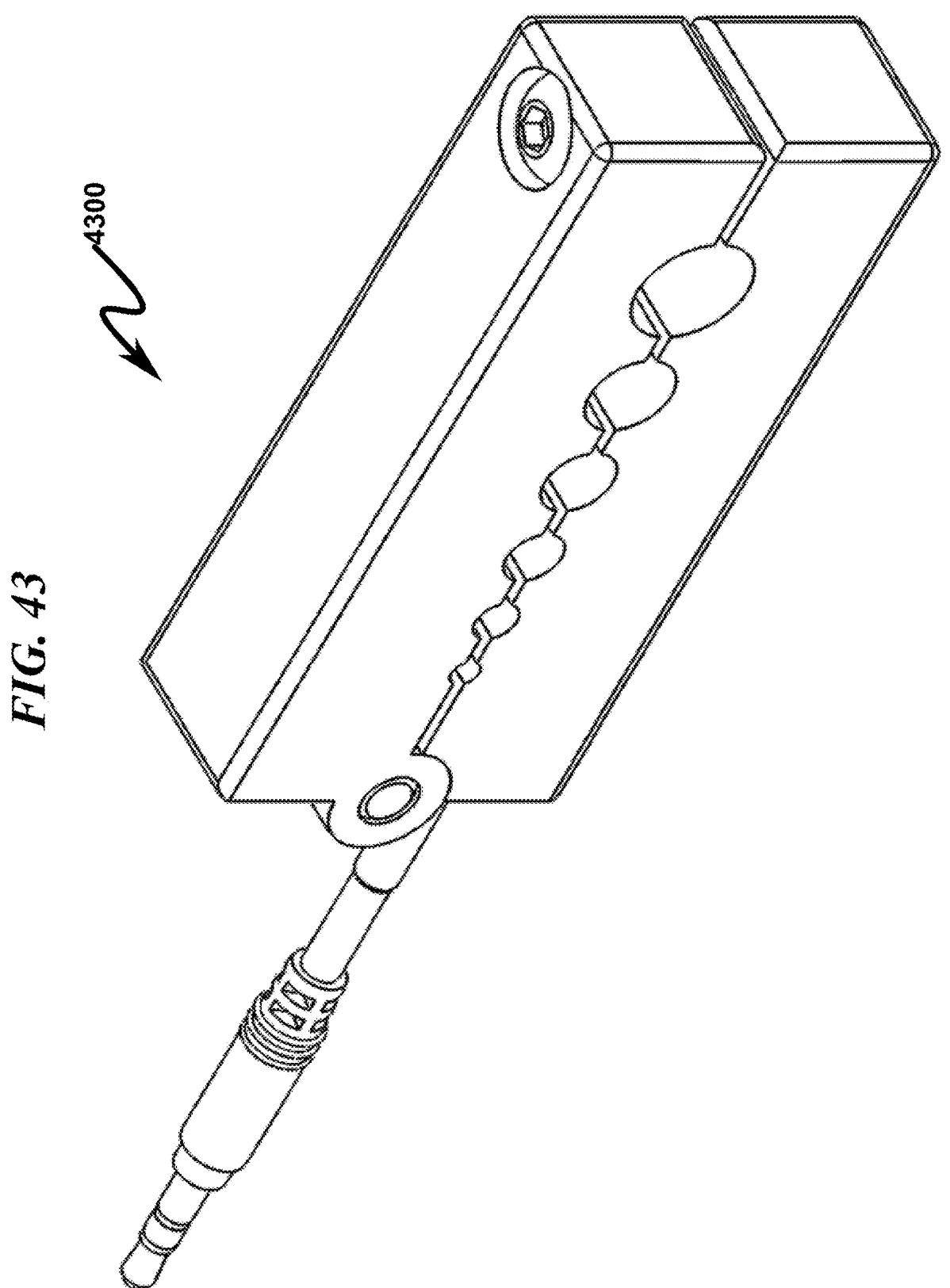
FIG. 43 illustrates a top left rear perspective view of a preferred exemplary THS thermal contact clamp (TCC) incorporating a typical temperature sensor.
Figure 44:
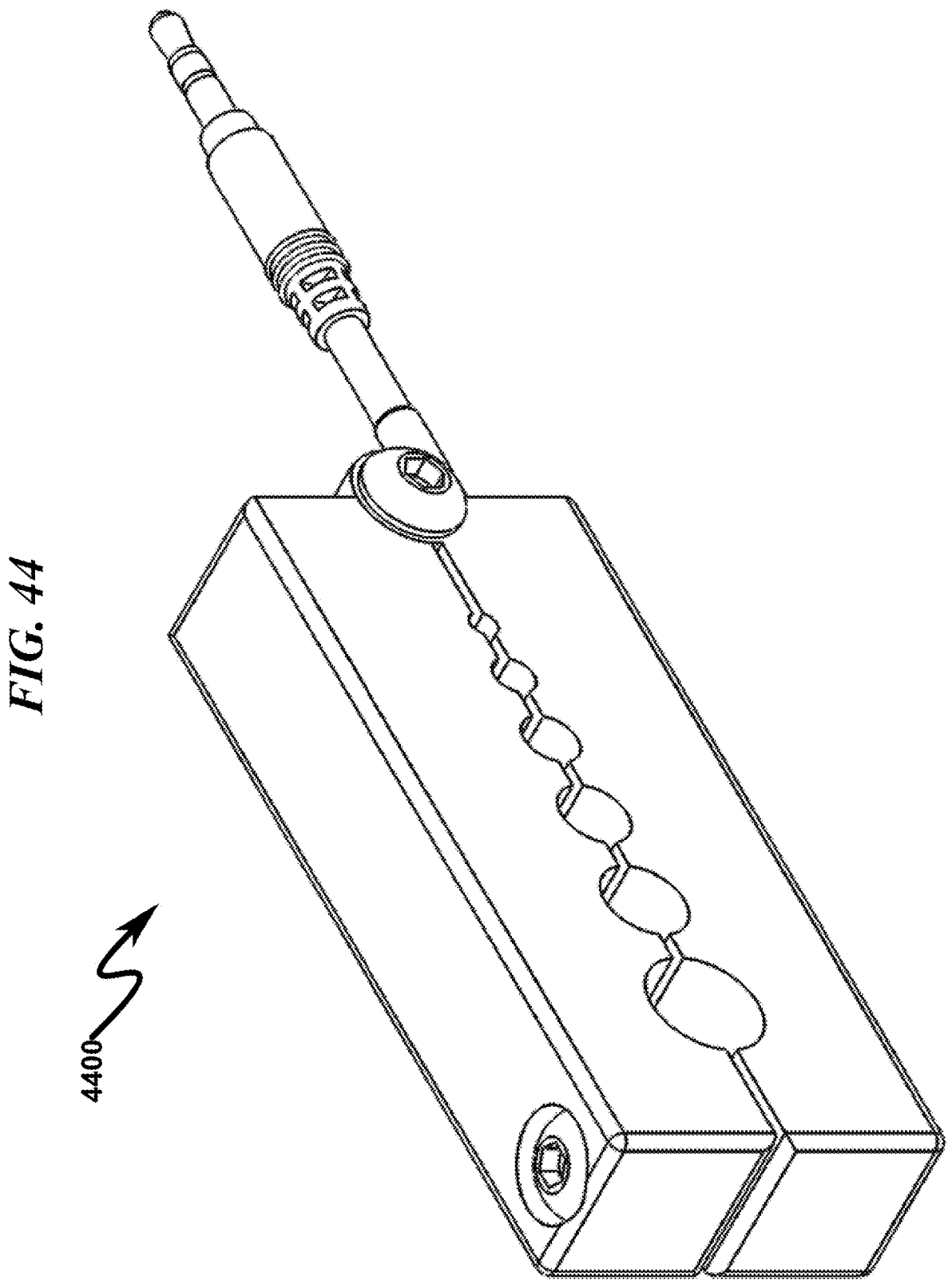
FIG. 44 illustrates a top left front perspective view of a preferred exemplary THS thermal contact clamp (TCC) incorporating a typical temperature sensor.
Figure 45:
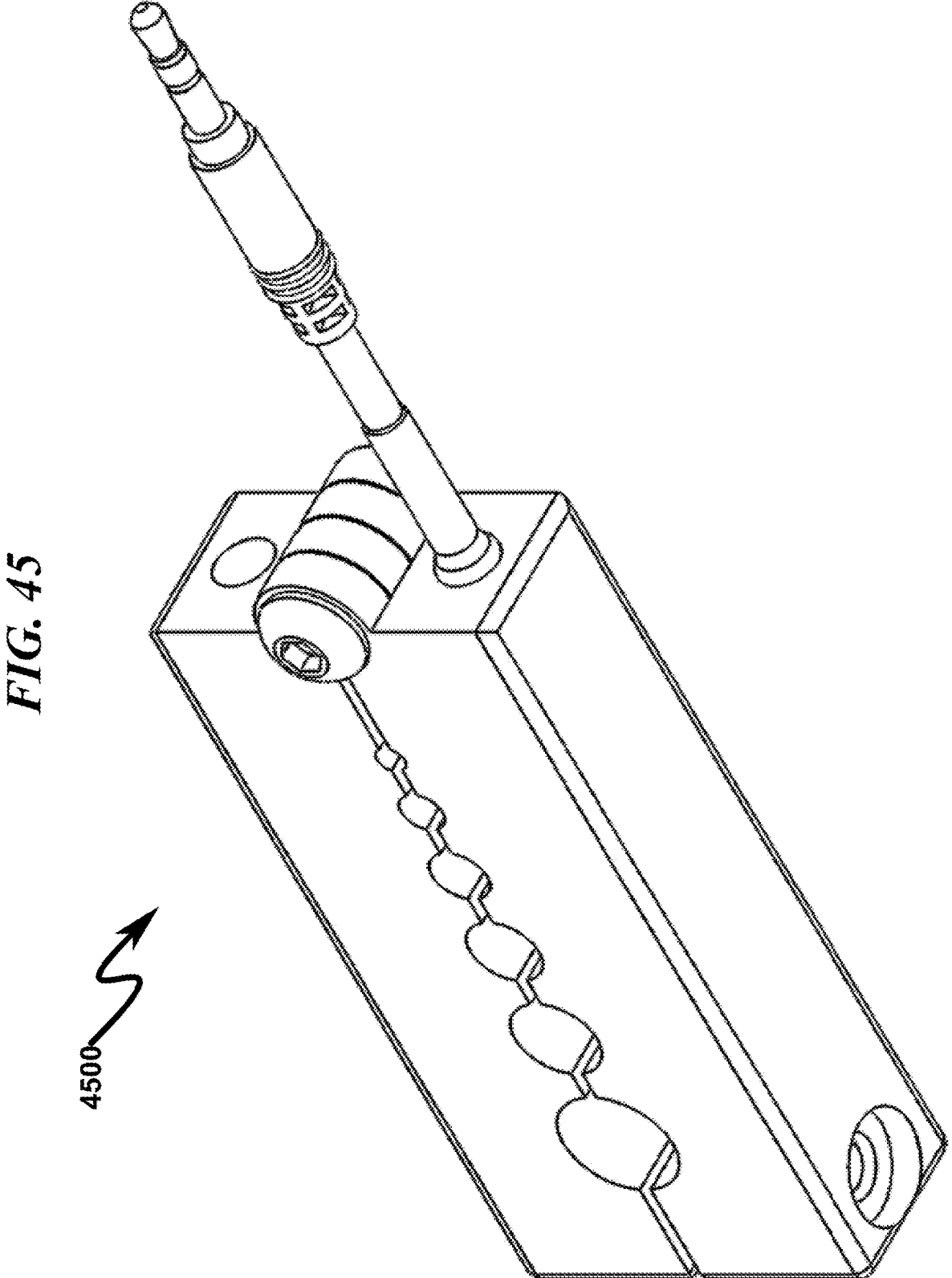
FIG. 45 illustrates a bottom right front perspective view of a preferred exemplary THS thermal contact clamp (TCC) incorporating a typical temperature sensor.
Figure 46:
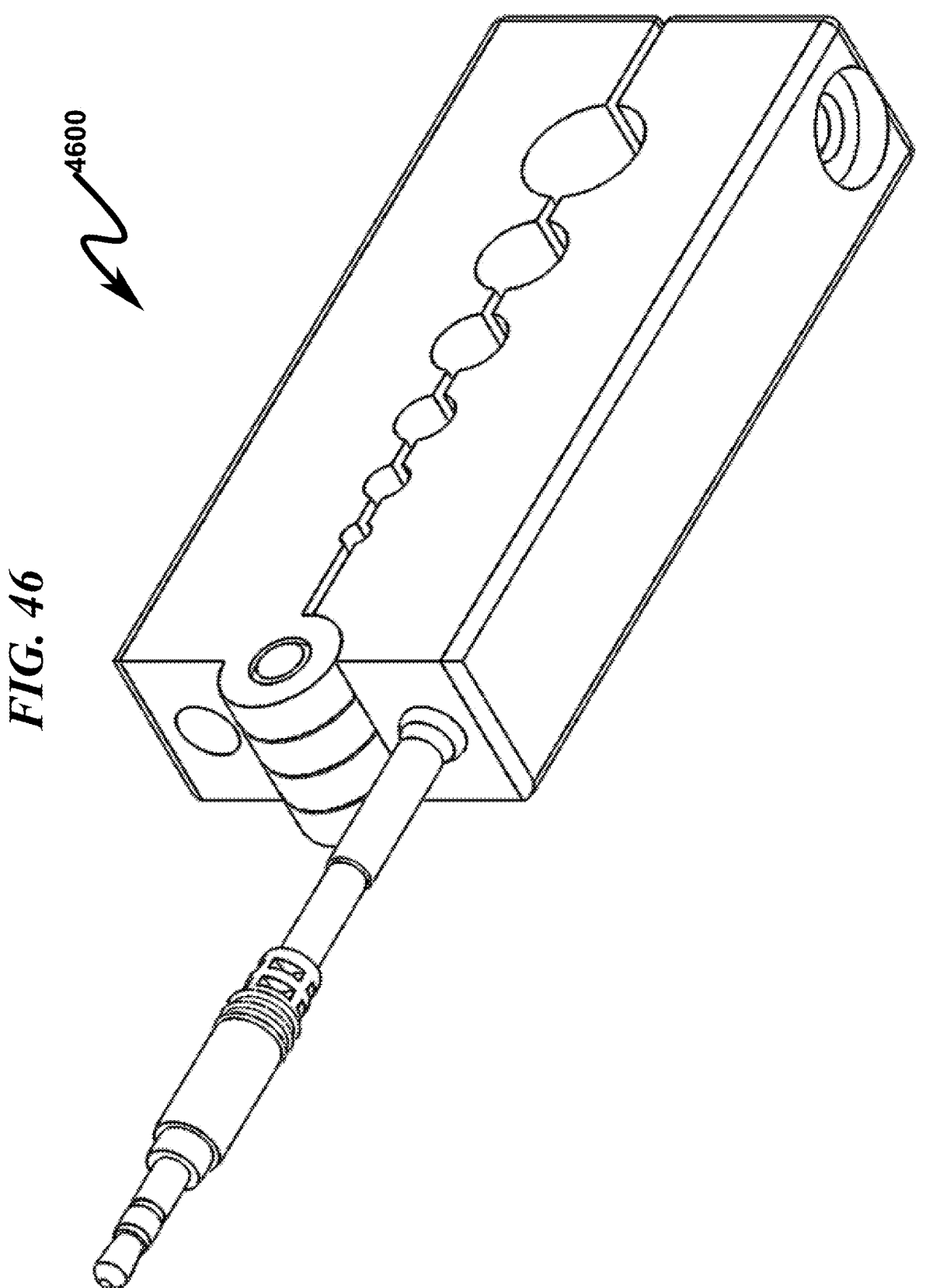
FIG. 46 illustrates a bottom right rear perspective view of a preferred exemplary THS thermal contact clamp (TCC) incorporating a typical temperature sensor.
Figure 47:
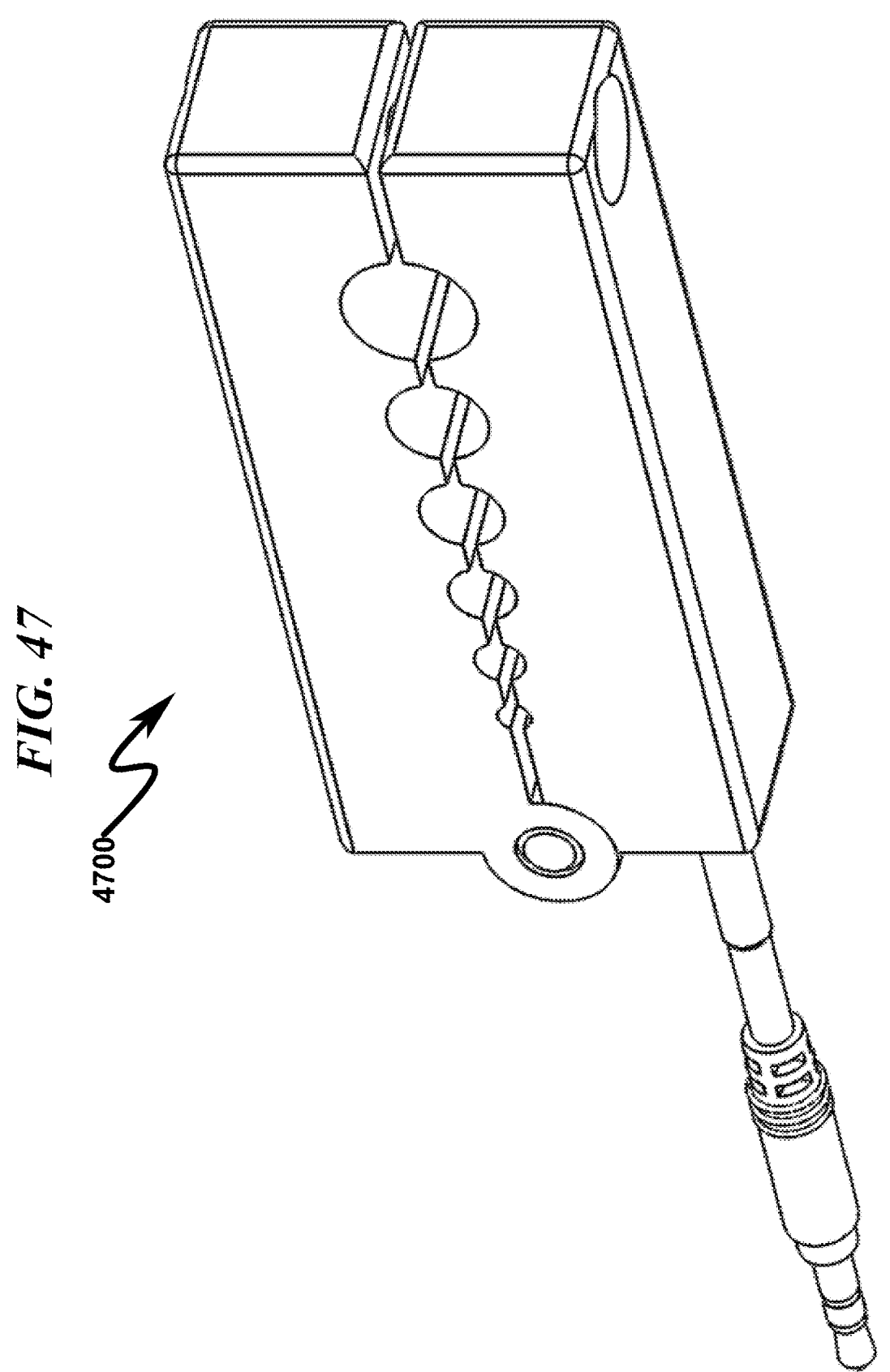
FIG. 47 illustrates a bottom left rear perspective view of a preferred exemplary THS thermal contact clamp (TCC) incorporating a typical temperature sensor.
Figure 48:
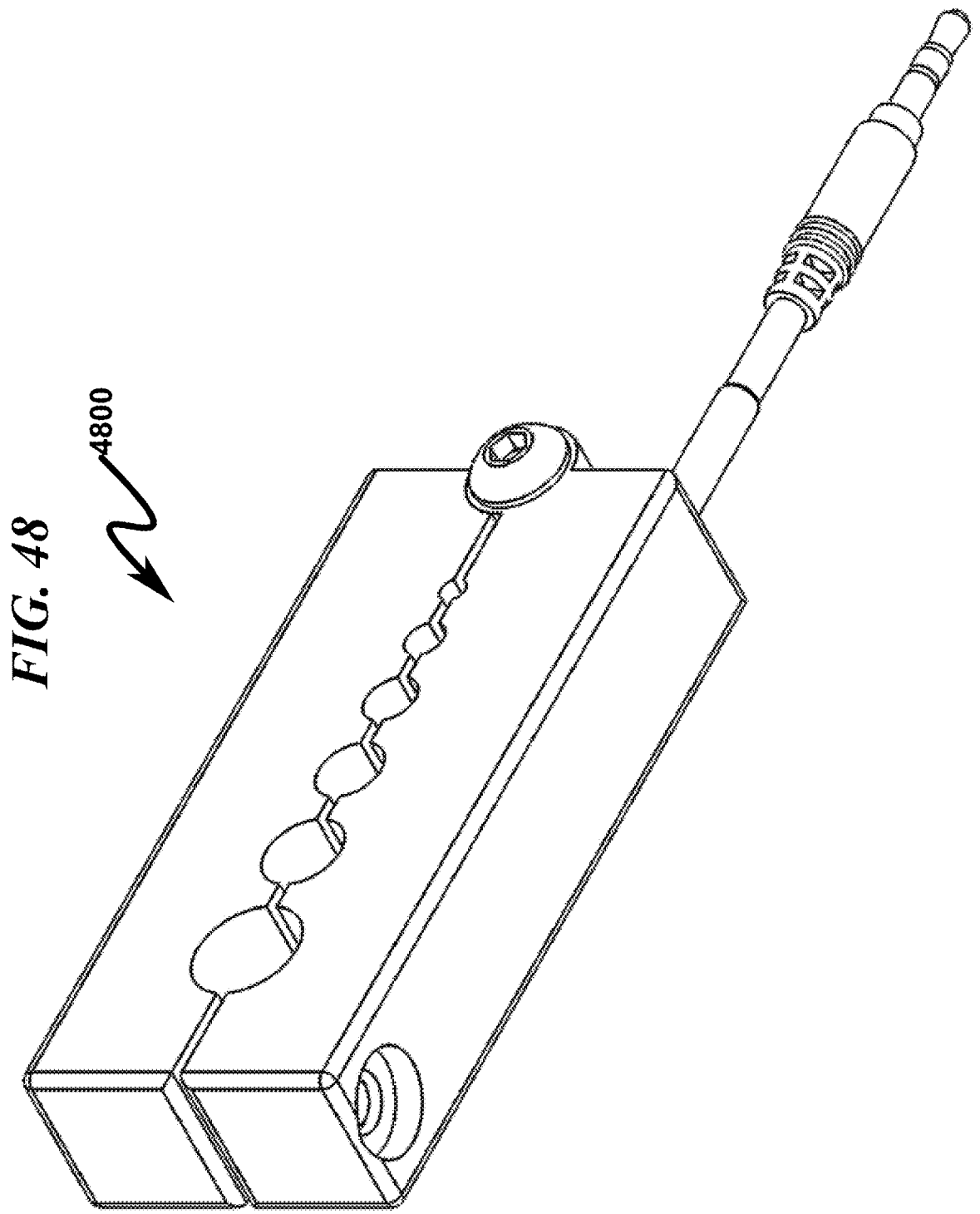
FIG. 48 illustrates a bottom left front perspective view of a preferred exemplary THS thermal contact clamp (TCC) incorporating a typical temperature sensor.
Figure 49:
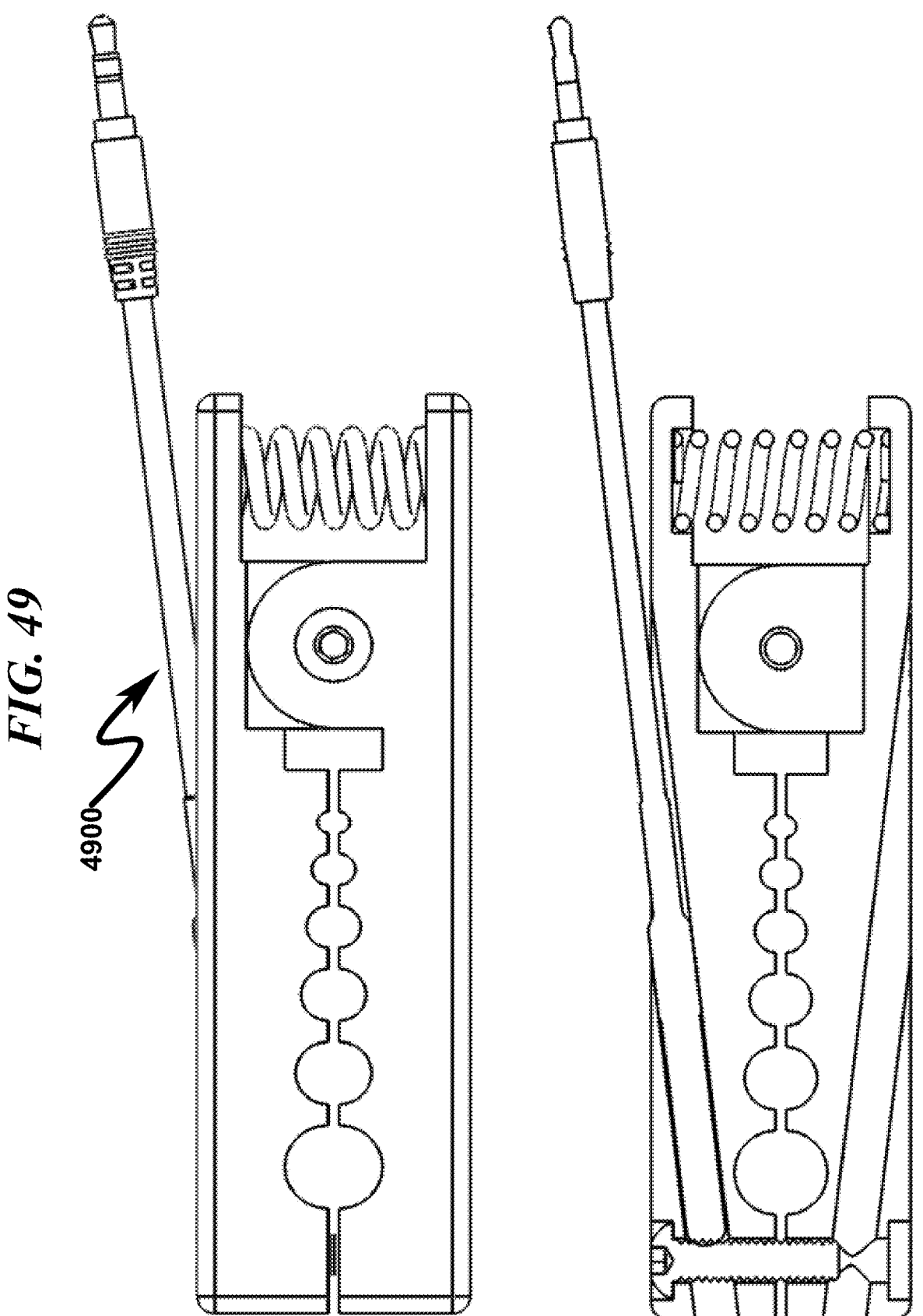
FIG. 49 illustrates front and front section views of a preferred exemplary THS spring-loaded thermal contact clamp (TCS) incorporating a typical temperature sensor.
Figure 50:
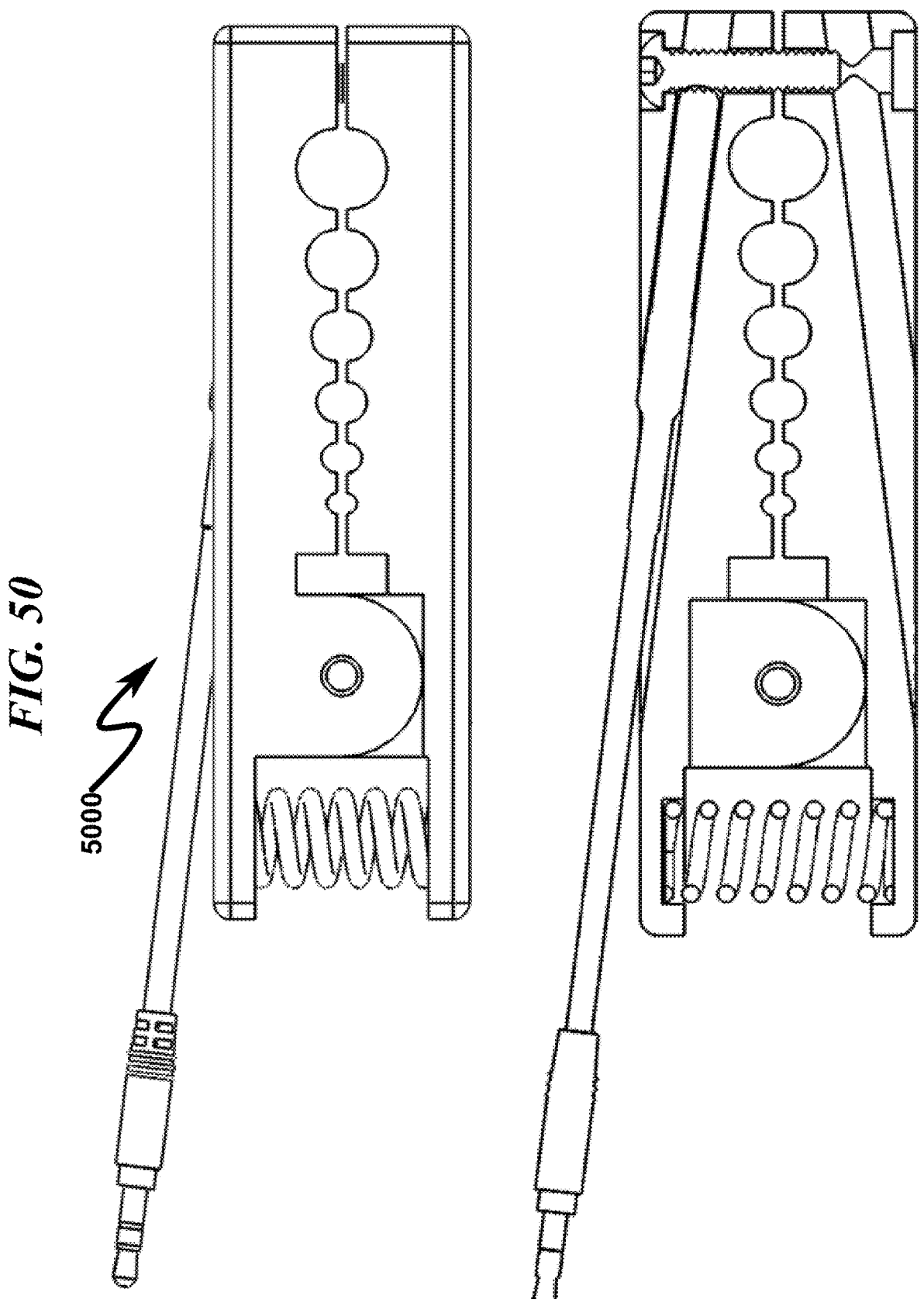
FIG. 50 illustrates rear and rear section views of a preferred exemplary THS spring-loaded thermal contact clamp (TCS) incorporating a typical temperature sensor.
Figure 53:
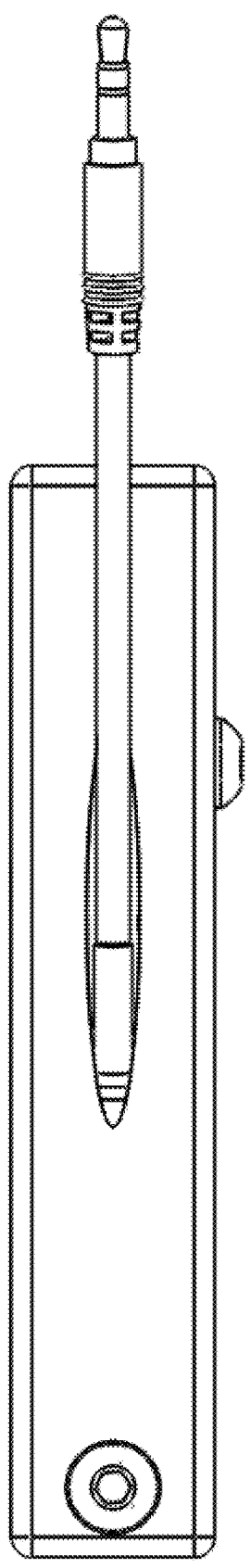
FIG. 53 illustrates a top view of a preferred exemplary THS spring-loaded thermal contact clamp (TCS) incorporating a typical temperature sensor.
Figure 54:
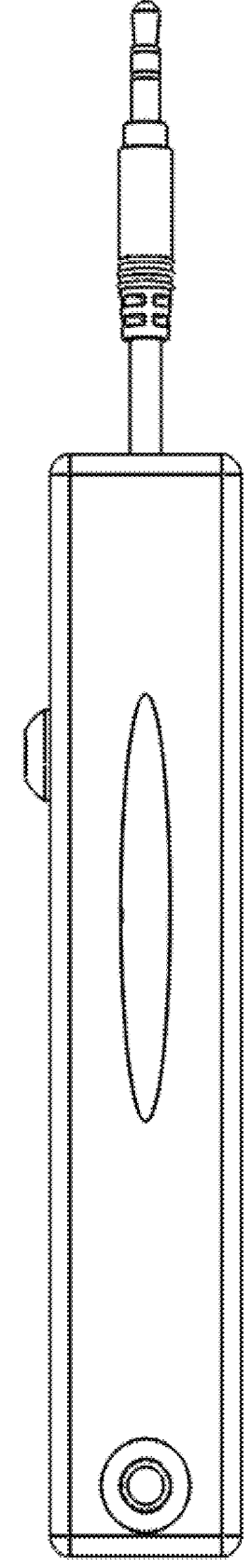
FIG. 54 illustrates a bottom view of a preferred exemplary THS spring-loaded thermal contact clamp (TCS) incorporating a typical temperature sensor.
Figure 56:
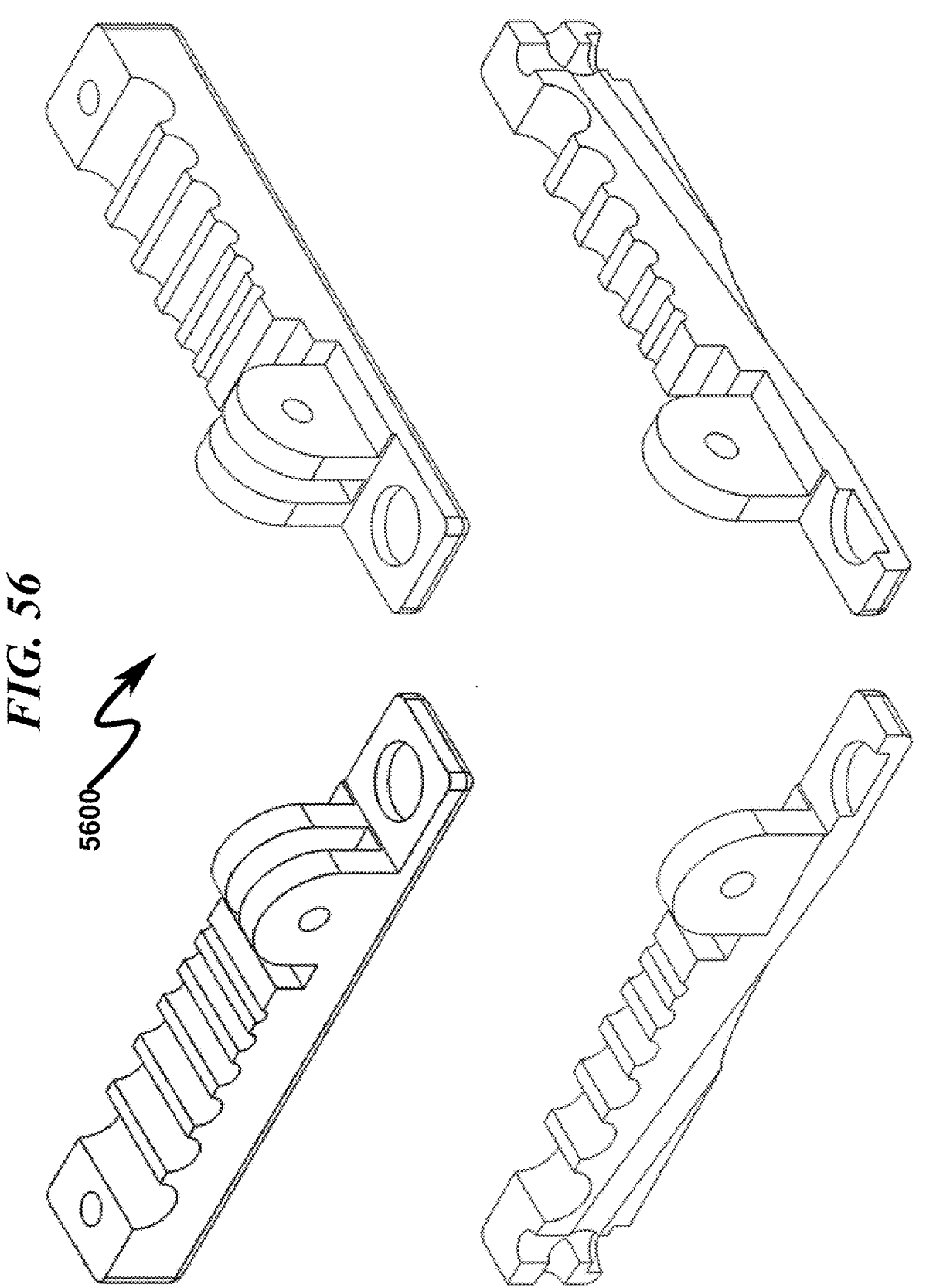
FIG. 56 illustrates various perspective section views of a preferred exemplary THS spring-loaded thermal contact clamp (TCS) in isolation depicting mating surfaces and general construction (one piece of symmetric assembly)
Figure 57:
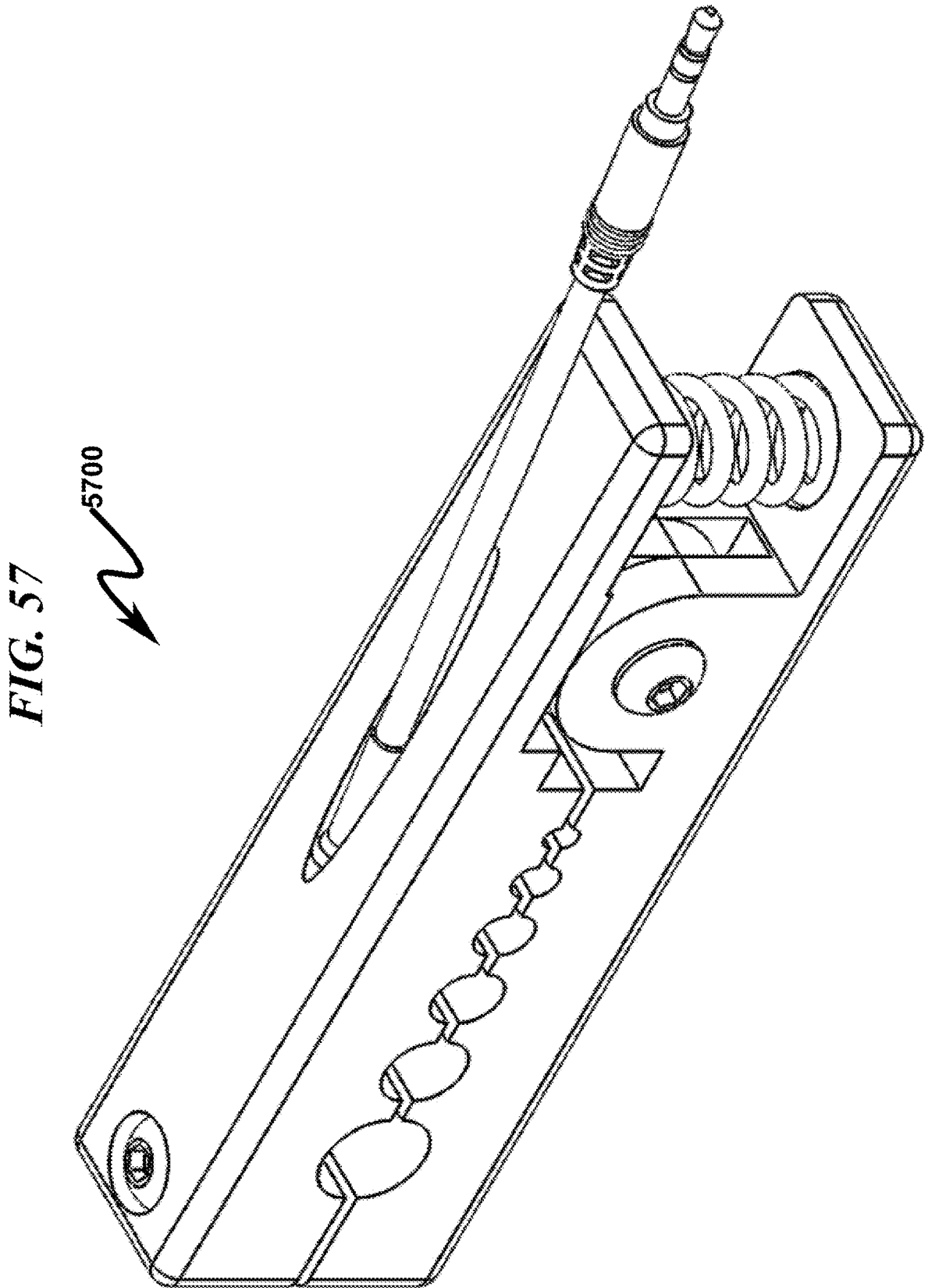
FIG. 57 illustrates a top right front perspective view of a preferred exemplary THS spring-loaded thermal contact clamp (TCS) incorporating a typical temperature sensor.
Figure 58:
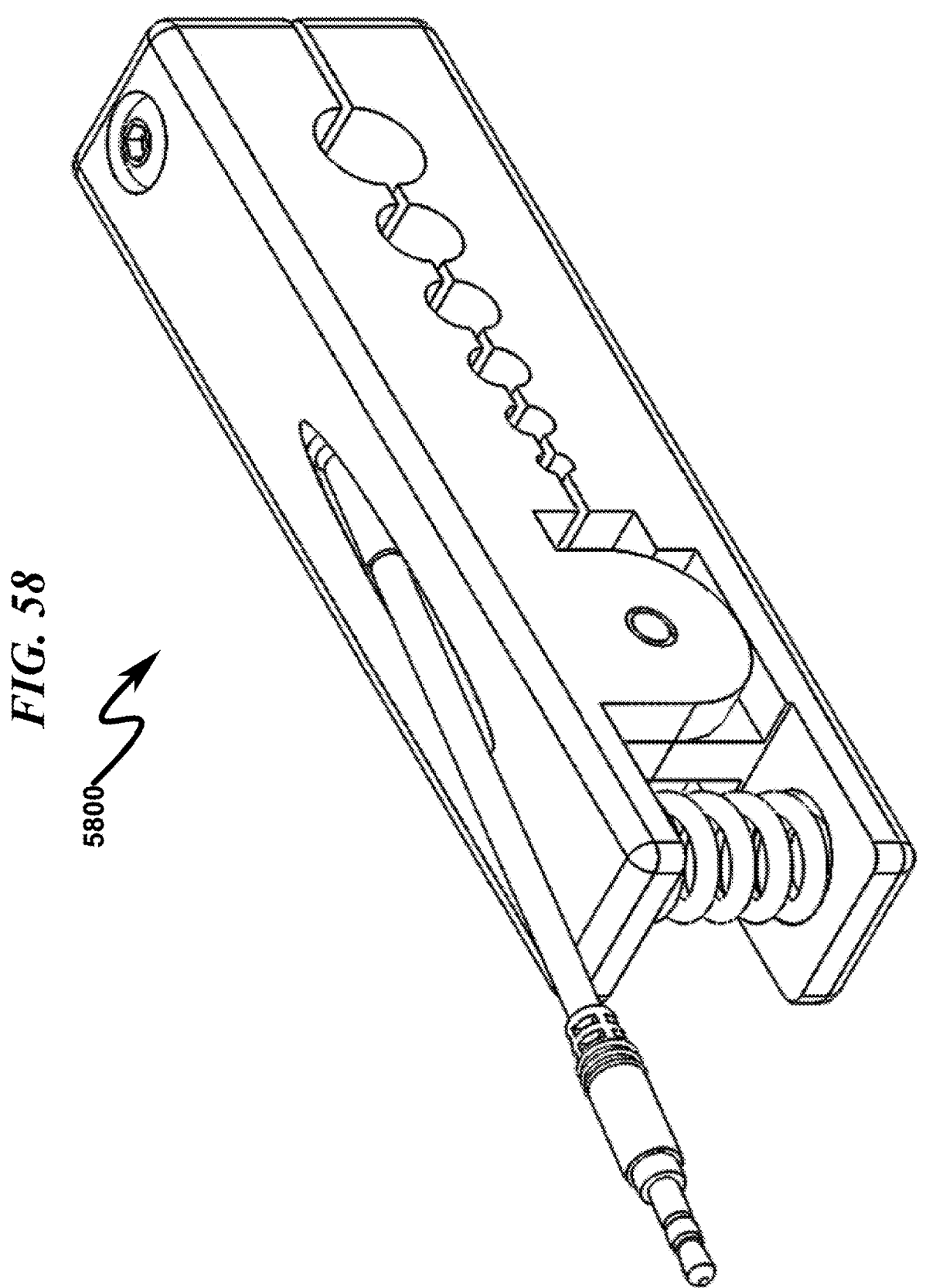
FIG. 58 illustrates a top right rear perspective view of a preferred exemplary THS spring-loaded thermal contact clamp (TCS) incorporating a typical temperature sensor.
Figure 59:
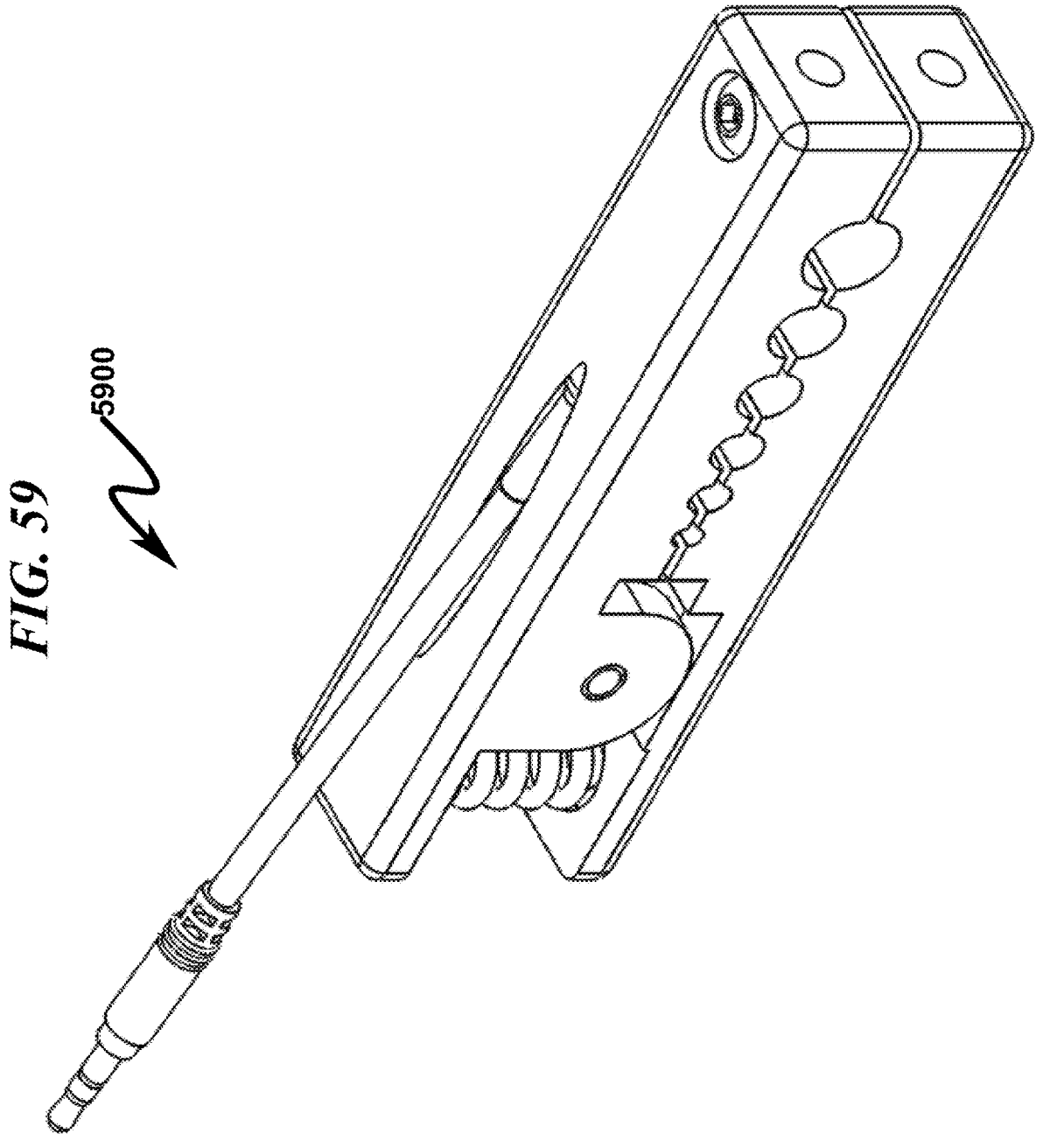
FIG. 59 illustrates a top left rear perspective view of a preferred exemplary THS spring-loaded thermal contact clamp (TCS) incorporating a typical temperature sensor.
Figure 60:
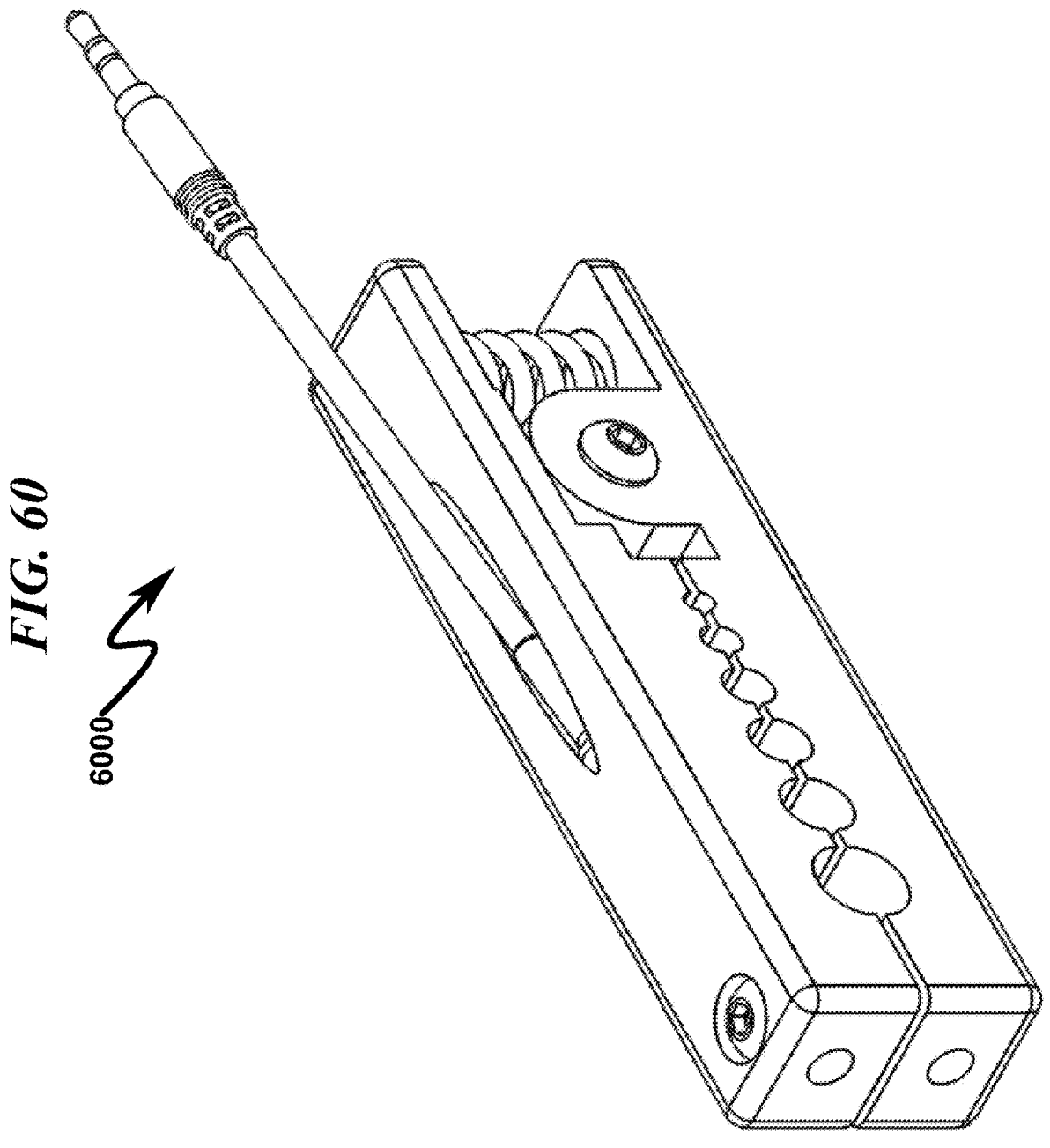
FIG. 60 illustrates a top left front perspective view of a preferred exemplary THS spring-loaded thermal contact clamp (TCS) incorporating a typical temperature sensor.
Figure 61:
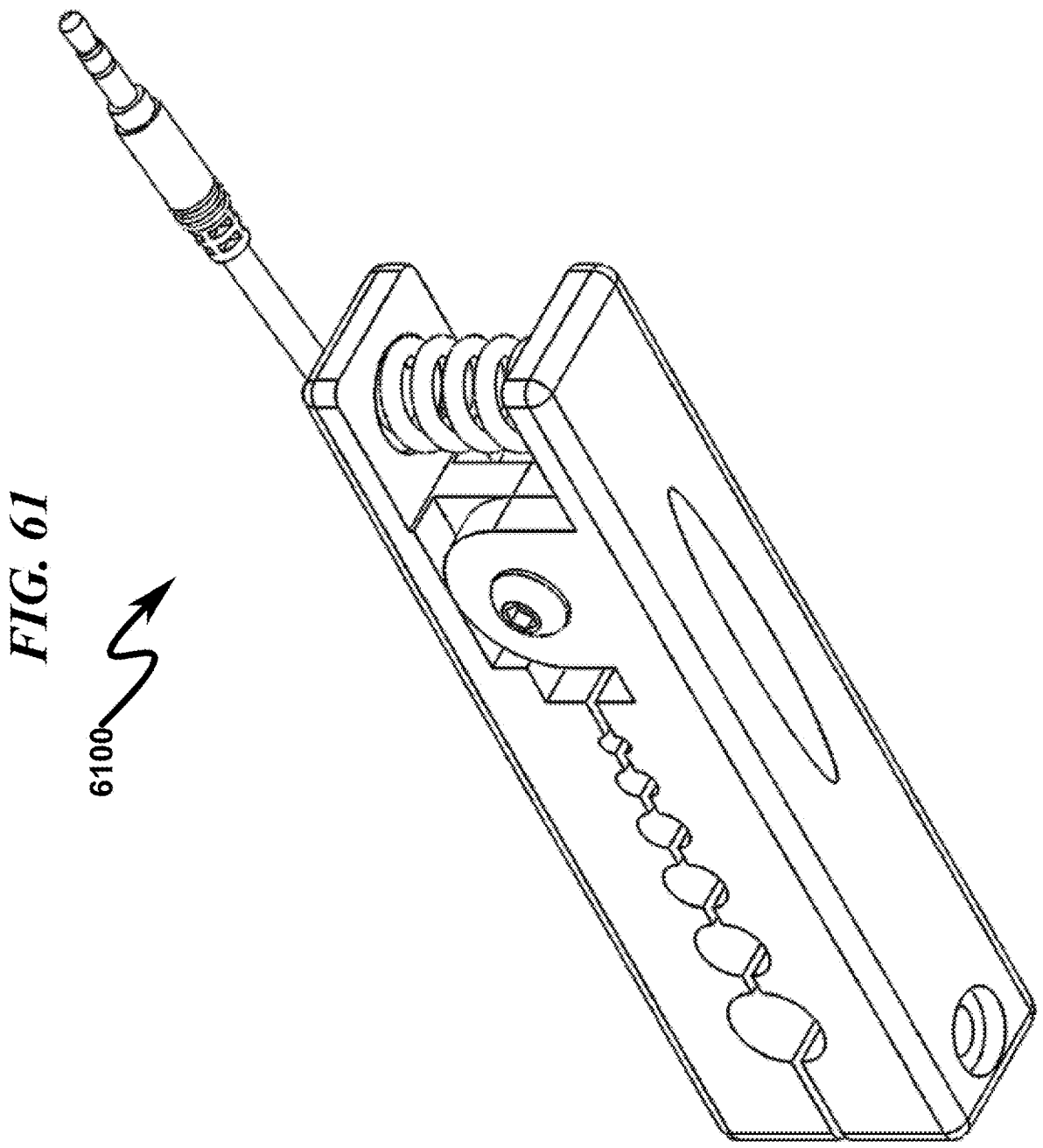
FIG. 61 illustrates a bottom right front perspective view of a preferred exemplary THS spring-loaded thermal contact clamp (TCS) incorporating a typical temperature sensor.
Figure 62:
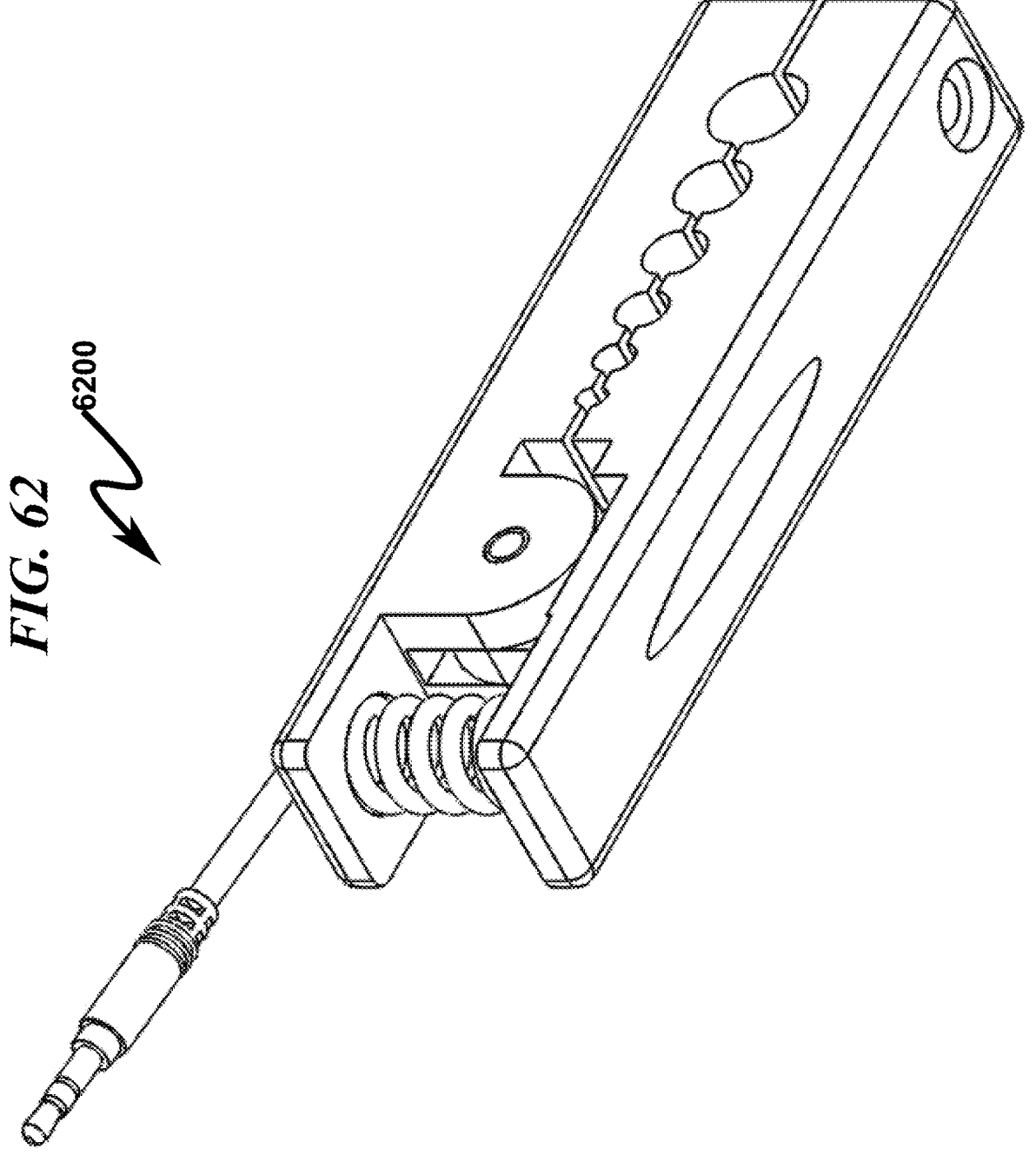
FIG. 62 illustrates a bottom right rear perspective view of a preferred exemplary THS spring-loaded thermal contact clamp (TCS) incorporating a typical temperature sensor.
Figure 63:
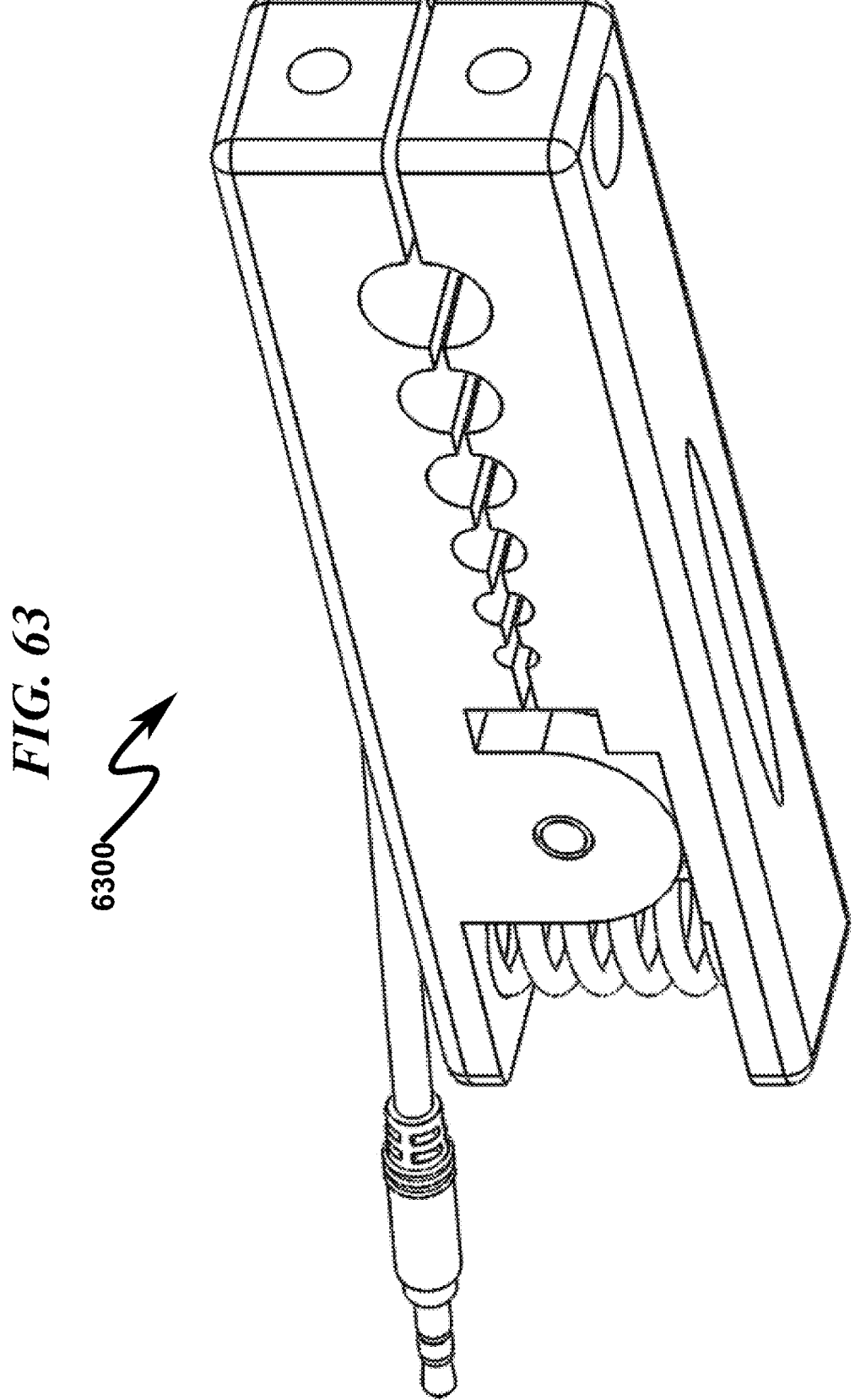
FIG. 63 illustrates a bottom left rear perspective view of a preferred exemplary THS spring-loaded thermal contact clamp (TCS) incorporating a typical temperature sensor.
Figure 64:
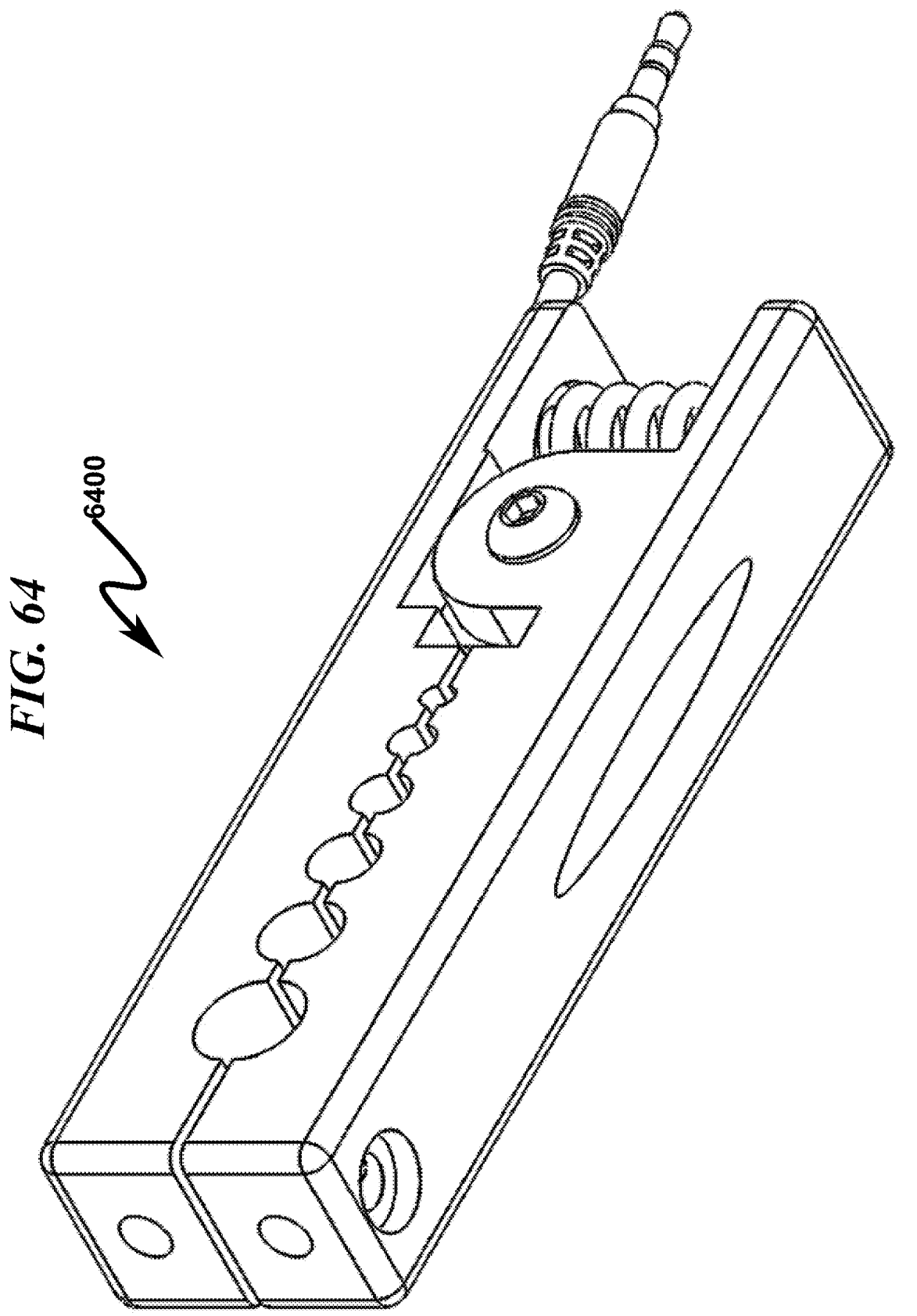
FIG. 64 illustrates a bottom left front perspective view of a preferred exemplary THS spring-loaded thermal contact clamp (TCS) incorporating a typical temperature sensor.

Several solutions to this problem are generally depicted in the thermal contact clamp (TCC) of FIG. 17 (1700)-FIG. 24 (2400) and FIG. 33 (3300)-FIG. 48 (4800) as well as the spring-loaded thermal contact clamp (TCS) of FIG. 25 (2500)-FIG. 32 (3200) and FIG. 49 (4900)-FIG. 64 (6400). The systems as depicted are generally constructed of aluminum or some other material having a high thermal conductivity coefficient and as depicted can be constructed using a symmetric construction using a single stock item that reduces the need for two-piece inventory as required by conventional thermal measurement systems. This symmetry detail is generally depicted in FIG. 24 (2400), FIG. 32 (3200), FIG. 40 (4000), and FIG. 56 (5600).

As generally depicted in FIG. 17 (1700) (and generally applied to other TCC/TCS drawings depicted), the clamping system comprises two symmetrical pipe capture pieces (1701, 1702) incorporating one or more pipe mating cavities (1703, 1704) that make thermal contact with HVAC piping and the like. The pipe capture pieces (1701, 1702) articulate around an axle (1705) and may be secured using a fixing fastener (1706). A cavity (1701) within one of the pipe capture pieces (1701, 1702) is constructed to accommodate the profile of a selected THS sensor (1708). While many THS sensors are anticipated by the present invention, the drawings depict a typical temperature/humidity sensor in FIG. 17 (1700)-FIG. 24 (2400) and a typical temperature sensor in the remaining drawings. The TCC may be optionally spring-loaded (TCS) as generally depicted in FIG. 25 (2500) (and in related drawings) with the addition of one or more springs (2509) to provide clamping action in for temporary installations or as an aid during permanent installation of the TCS and/or to address vibration issues in the HVAC refrigerant piping. As depicted in the drawings, the number of pipe mating cavities (1703, 1704) will vary based on the application context for the system.

Figure 19:
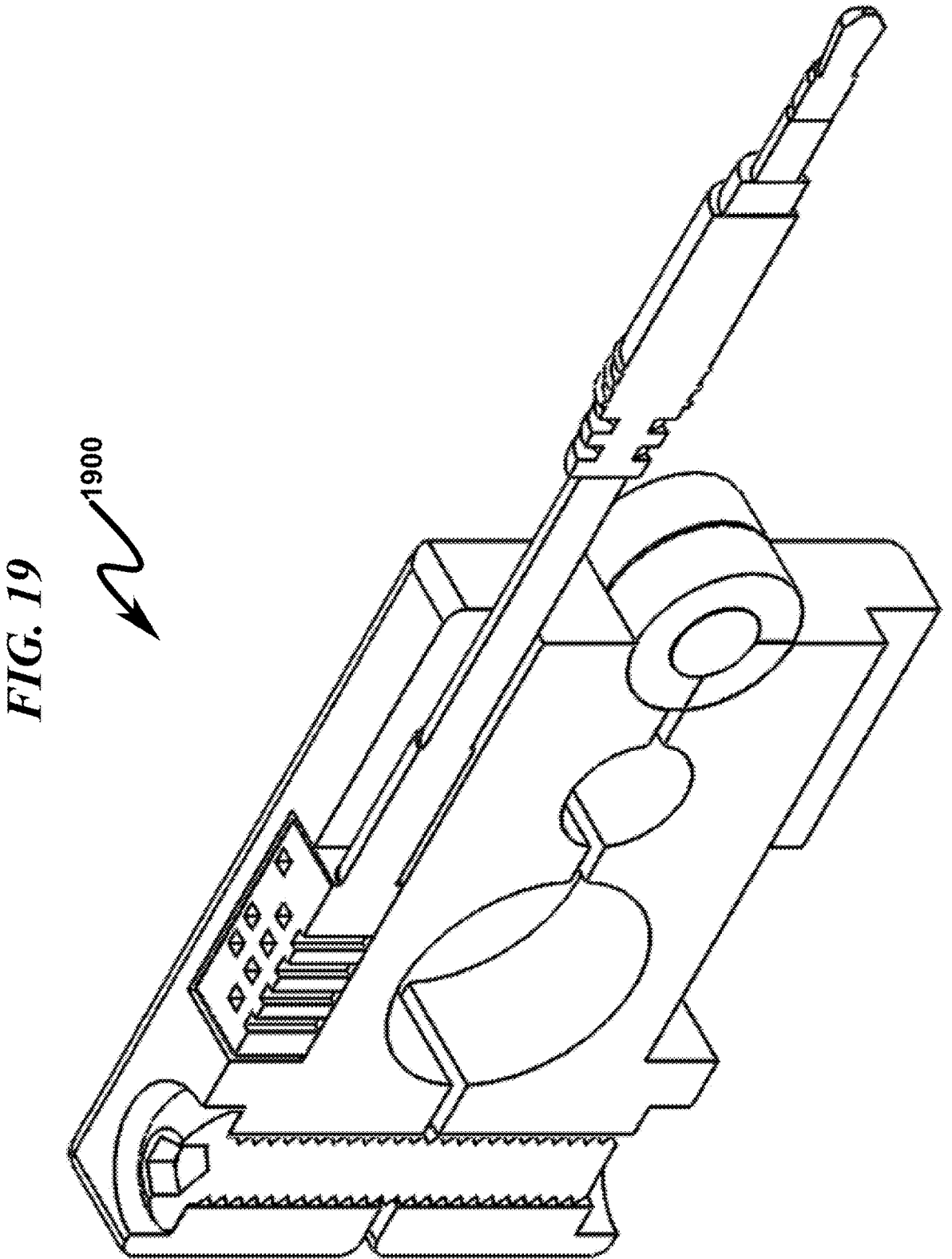
FIG. 19 illustrates a top right front section perspective view of a preferred exemplary THS thermal contact clamp (TCC) incorporating a typical temperature/humidity sensor.
Figure 20:
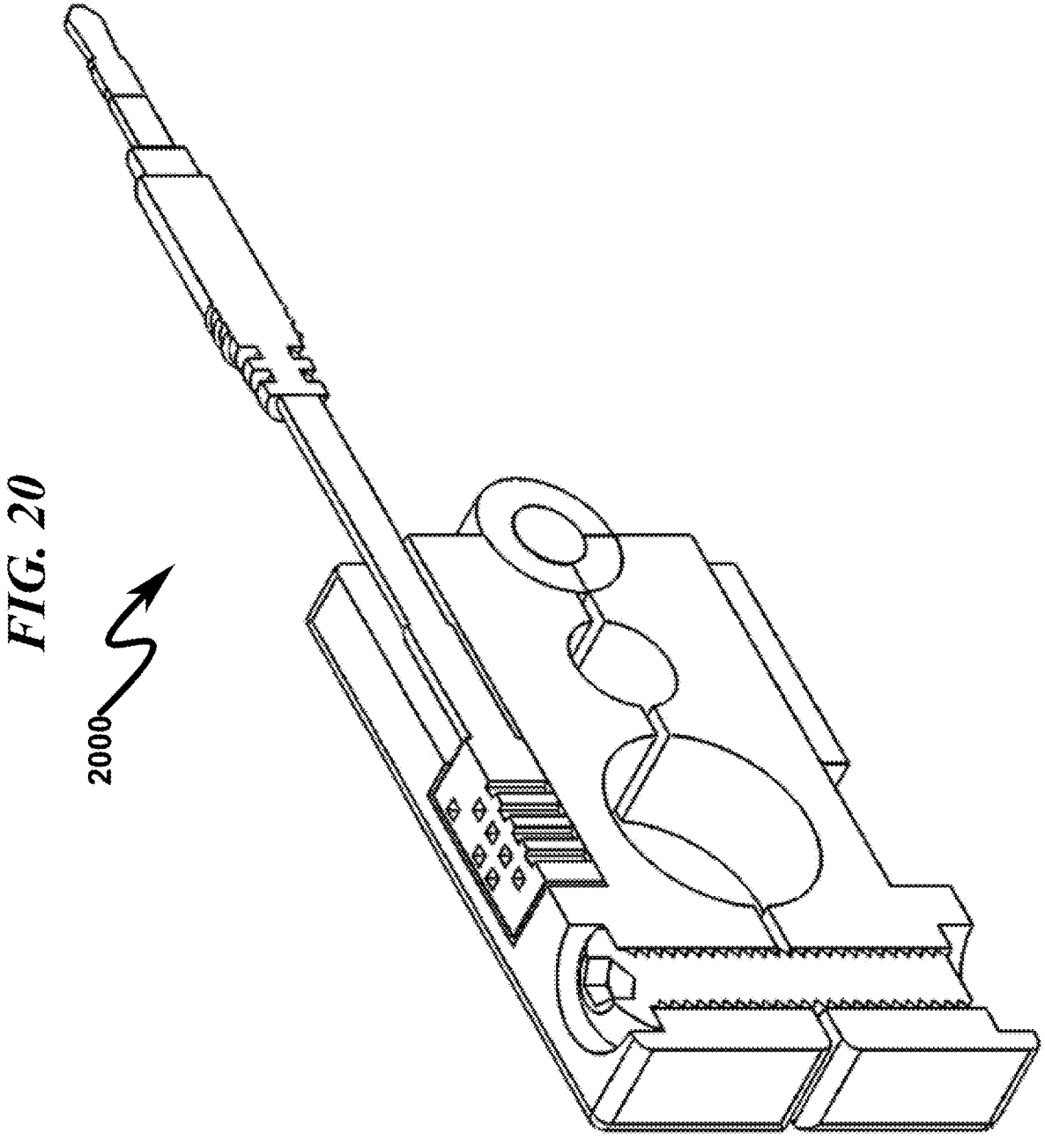
FIG. 20 illustrates a top left front section perspective view of a preferred exemplary THS thermal contact clamp (TCC) incorporating a typical temperature/humidity sensor.
Figure 21:
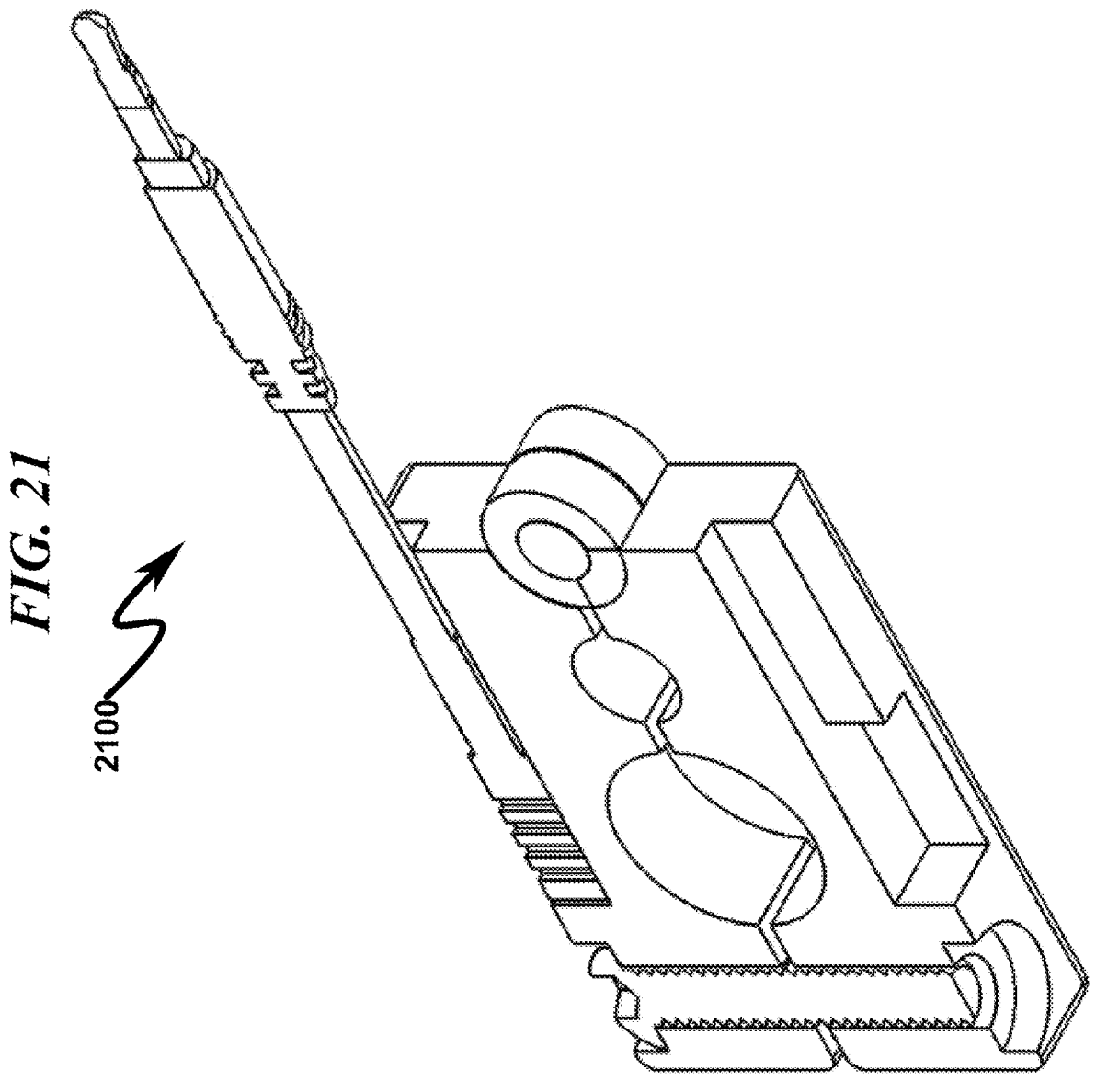
FIG. 21 illustrates a bottom right front section perspective view of a preferred exemplary THS thermal contact clamp (TCC) incorporating a typical temperature/humidity sensor.
Figure 22:
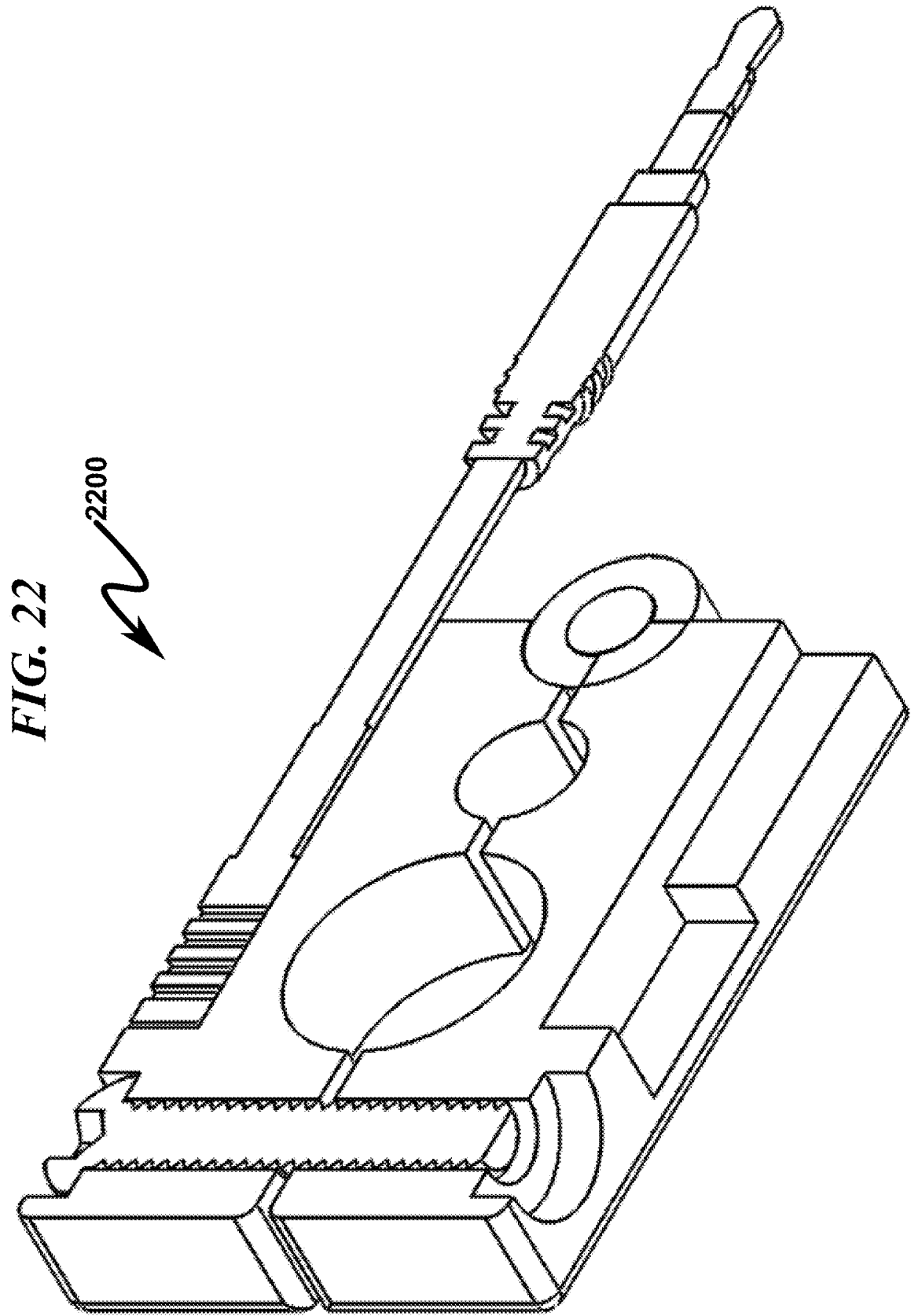
FIG. 22 illustrates a bottom left front section perspective view of a preferred exemplary THS thermal contact clamp (TCC) incorporating a typical temperature/humidity sensor.
Figure 23:
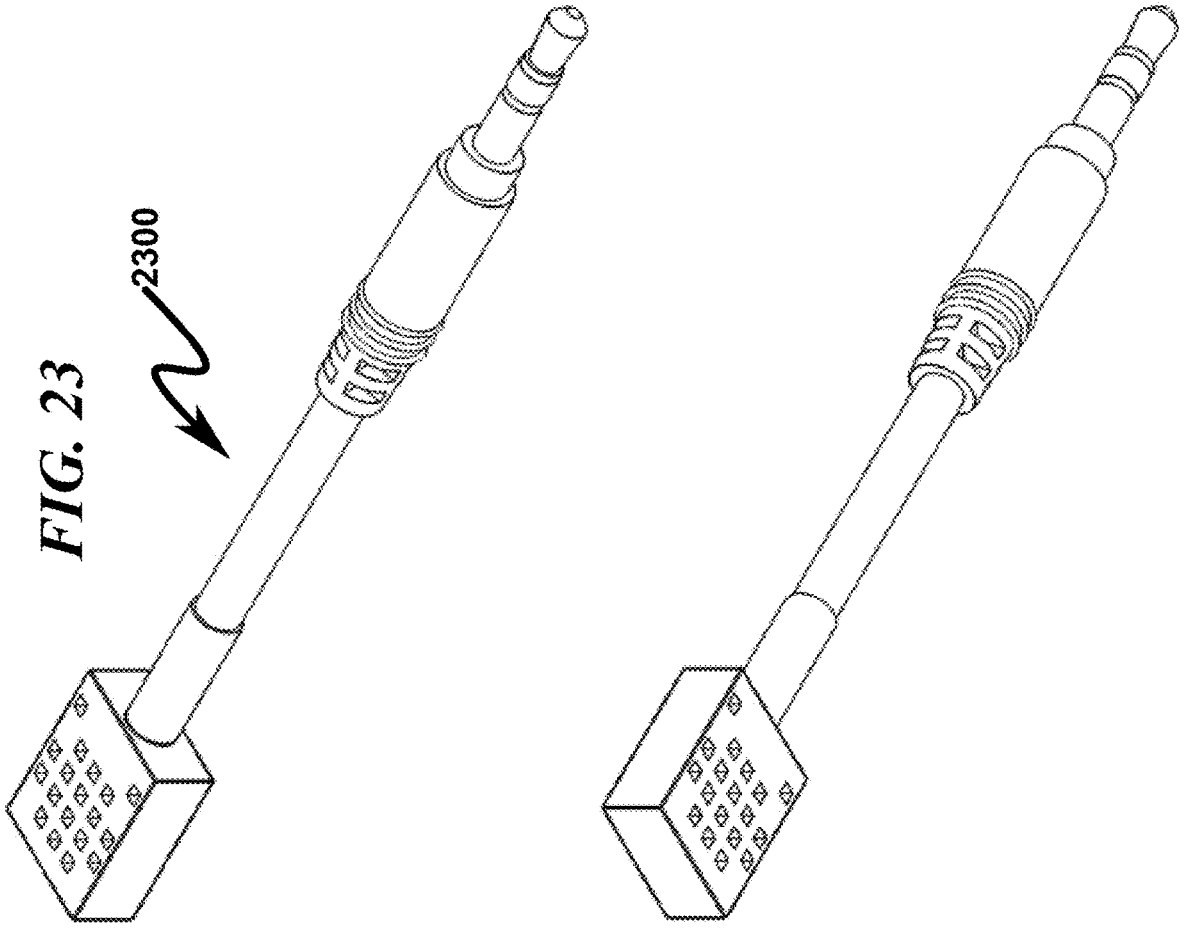
FIG. 23 illustrates various perspective views of a typical temperature/humidity sensor in isolation.
Figure 27:
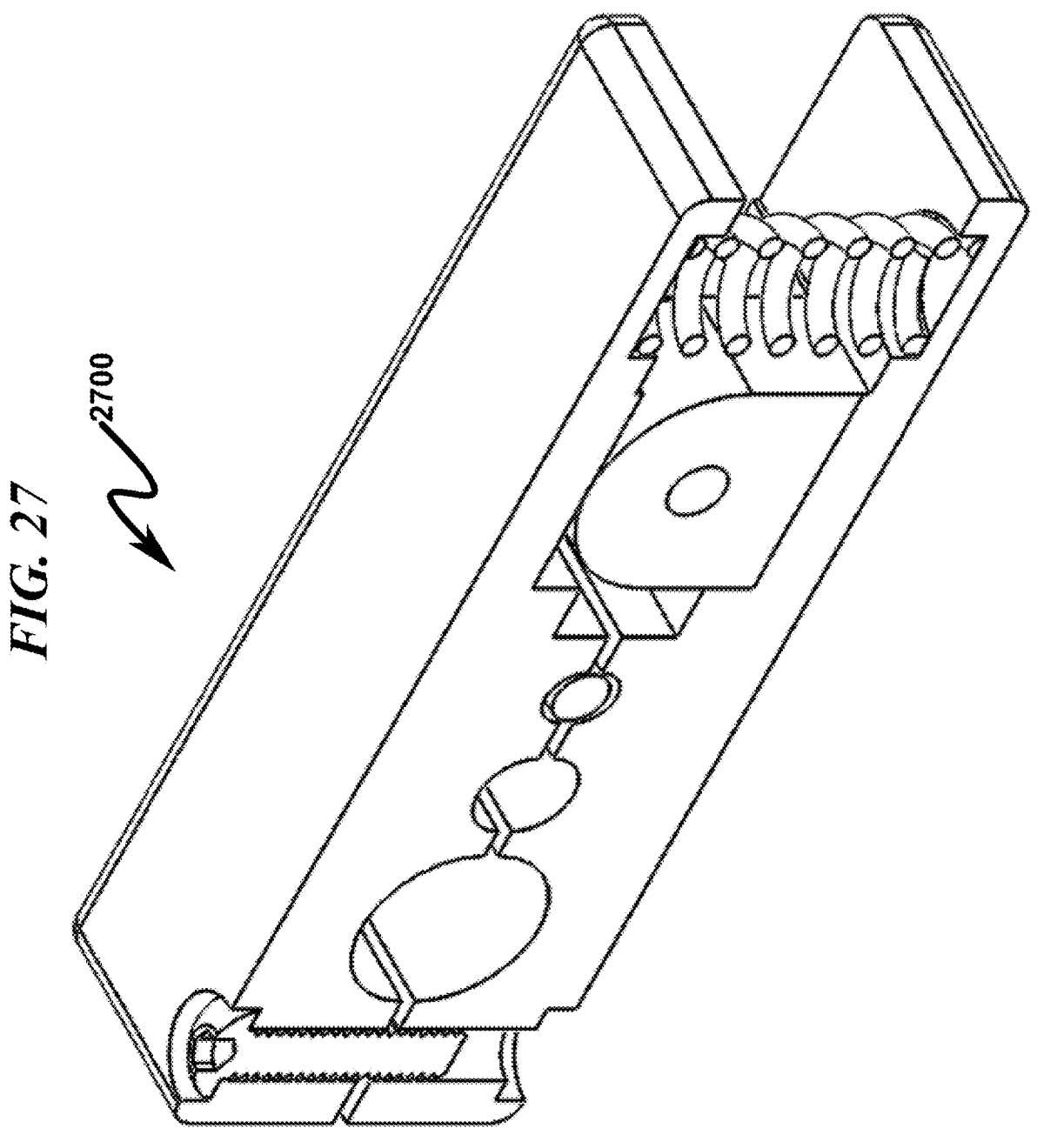
FIG. 27 illustrates a top right front section perspective view of a preferred exemplary THS spring-loaded thermal contact clamp (TCS) incorporating a typical temperature sensor.
Figure 28:
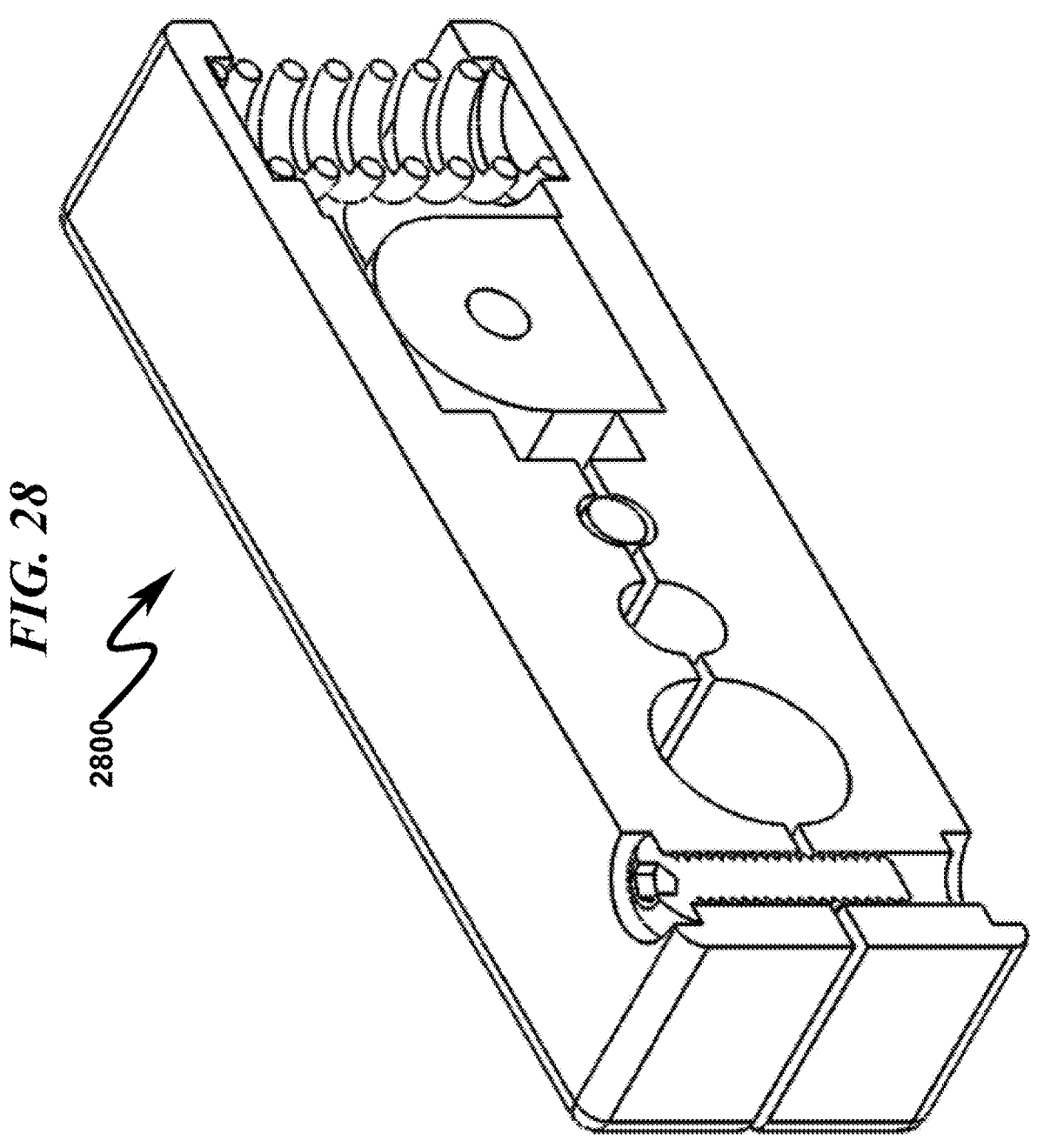
FIG. 28 illustrates a top left front section perspective view of a preferred exemplary THS spring-loaded thermal contact clamp (TCS) incorporating a typical temperature sensor.
Figure 29:
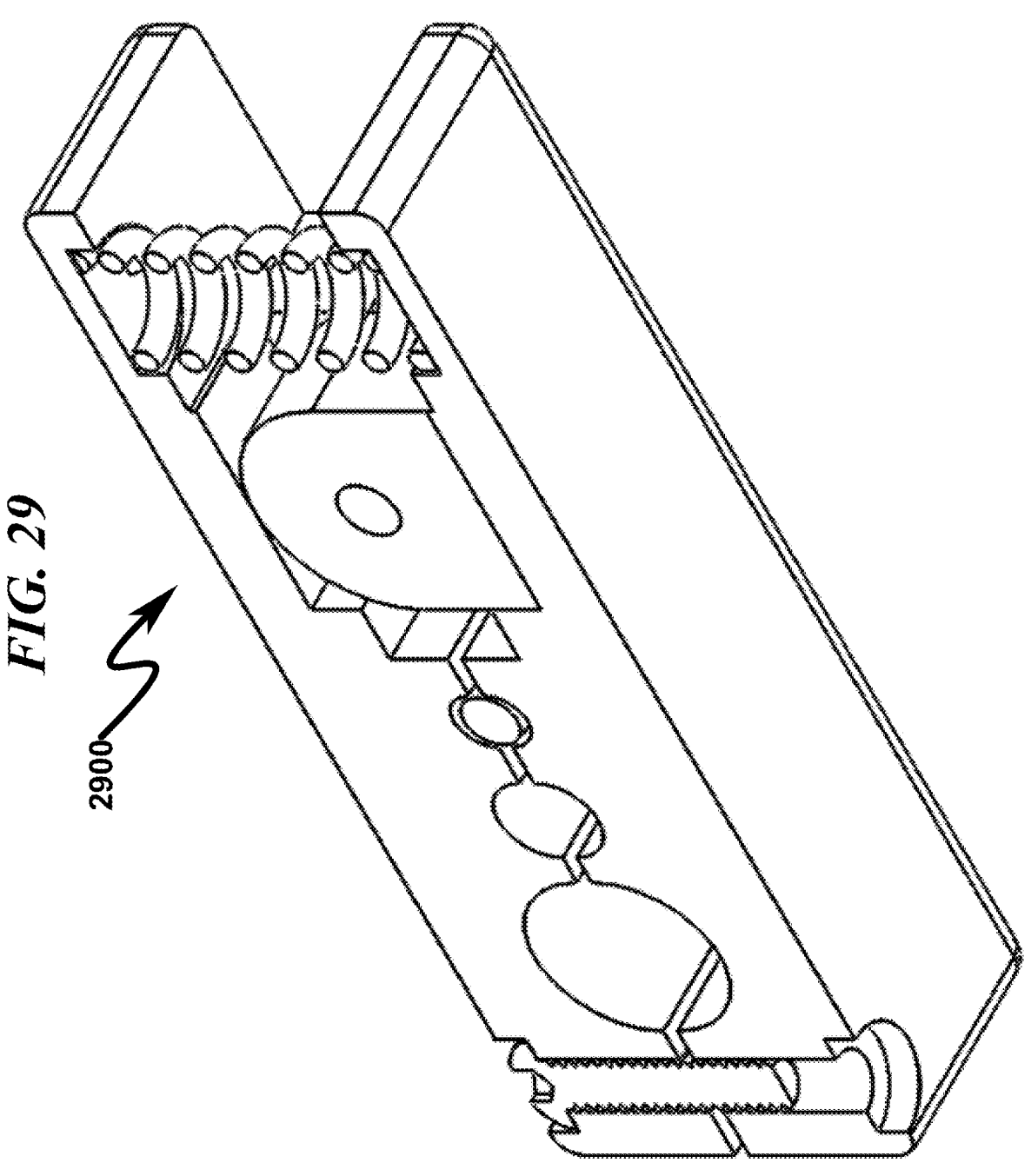
FIG. 29 illustrates a bottom right front section perspective view of a preferred exemplary THS spring-loaded thermal contact clamp (TCS) incorporating a typical temperature sensor.

Each of these clamping systems has several advantages over the prior art. Specifically, each of the systems depicted can address a number of different HVAC plumbing pipe sizes while simultaneously providing for maximum thermal contact area around the pipe to be thermally inspected with the THS. Detail of this enhanced thermal contact between the HVAC pipe and THS is generally depicted in the section views of FIG. 19 (1900)-FIG. 22 (2200), FIG. 27 (2700)-

Figure 30:
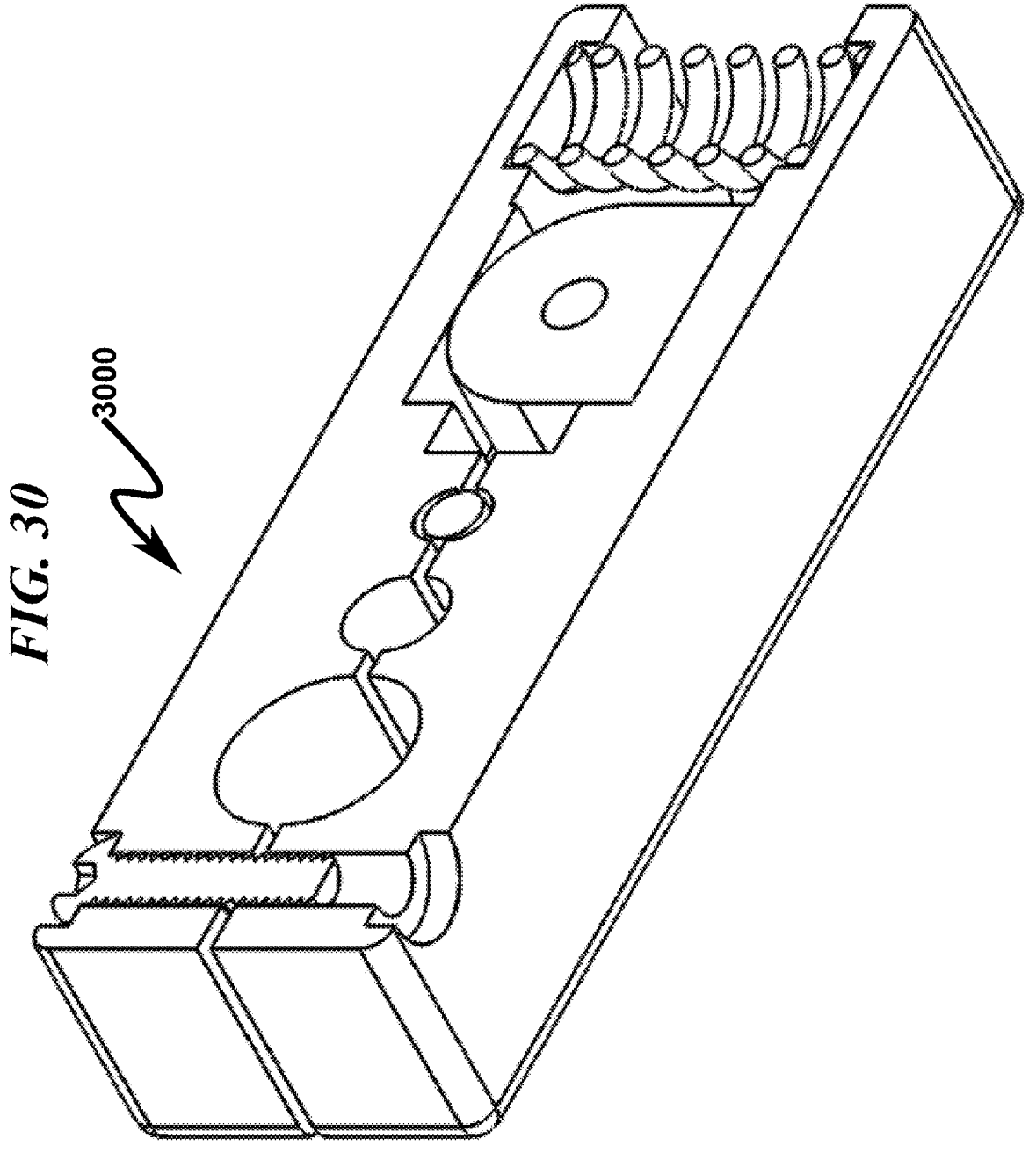
FIG. 30 illustrates a bottom left front section perspective view of a preferred exemplary THS spring-loaded thermal contact clamp (TCS) incorporating a typical temperature sensor.
Figure 31:
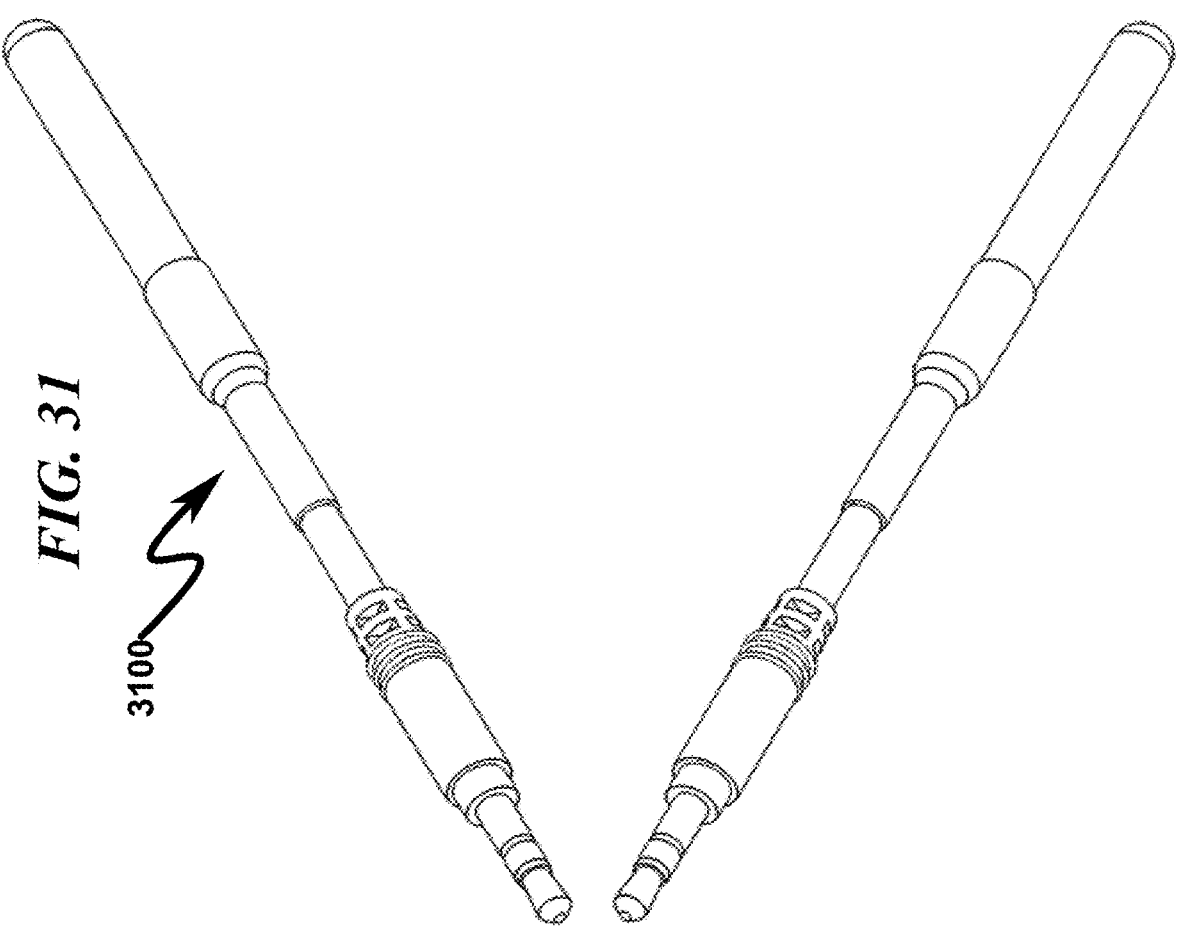
FIG. 31 illustrates various perspective views of a typical temperature sensor in isolation.
Figure 39:
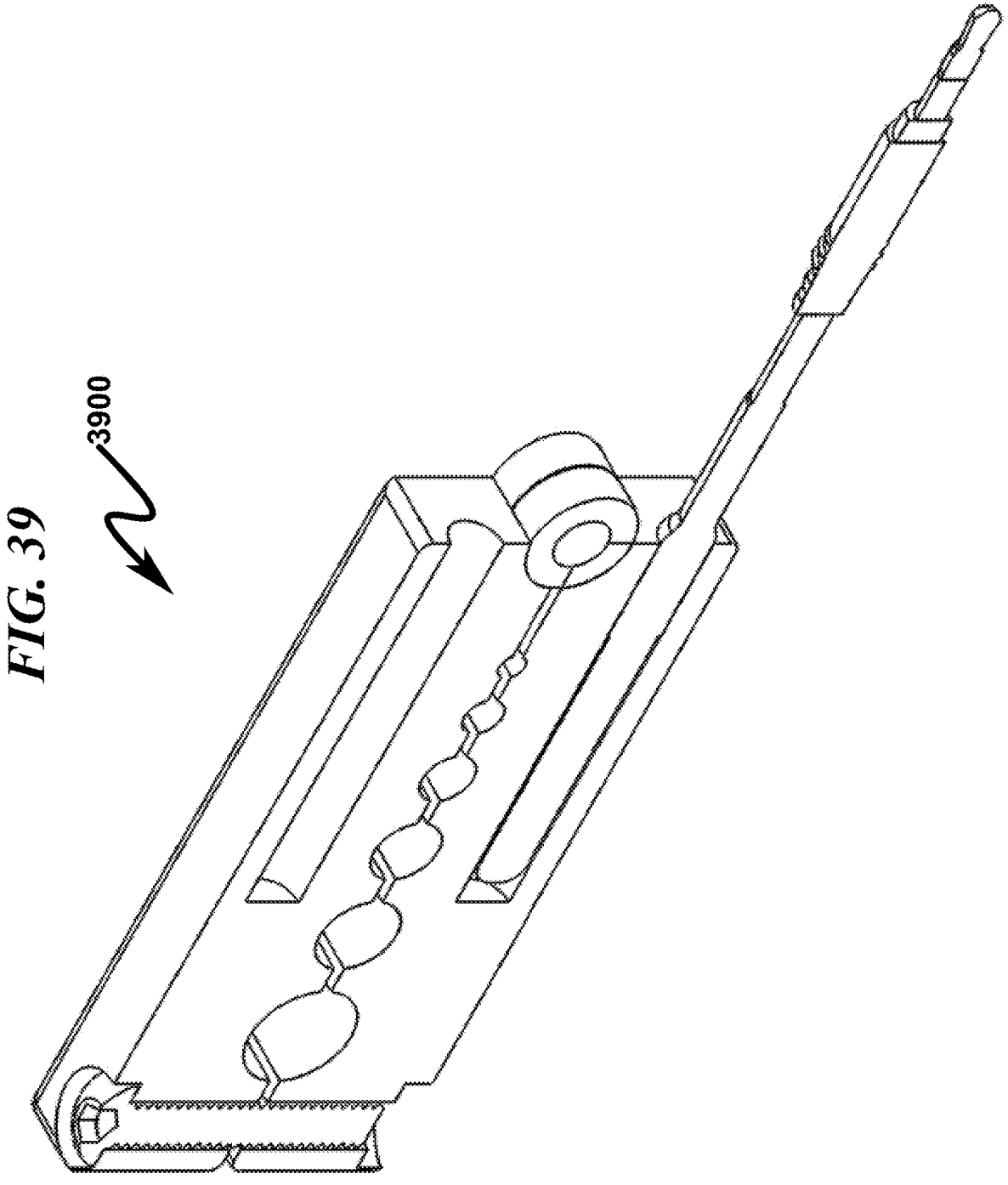
FIG. 39 illustrates a top right front perspective section view of a preferred exemplary THS thermal contact clamp (TCC)
Figure 55:
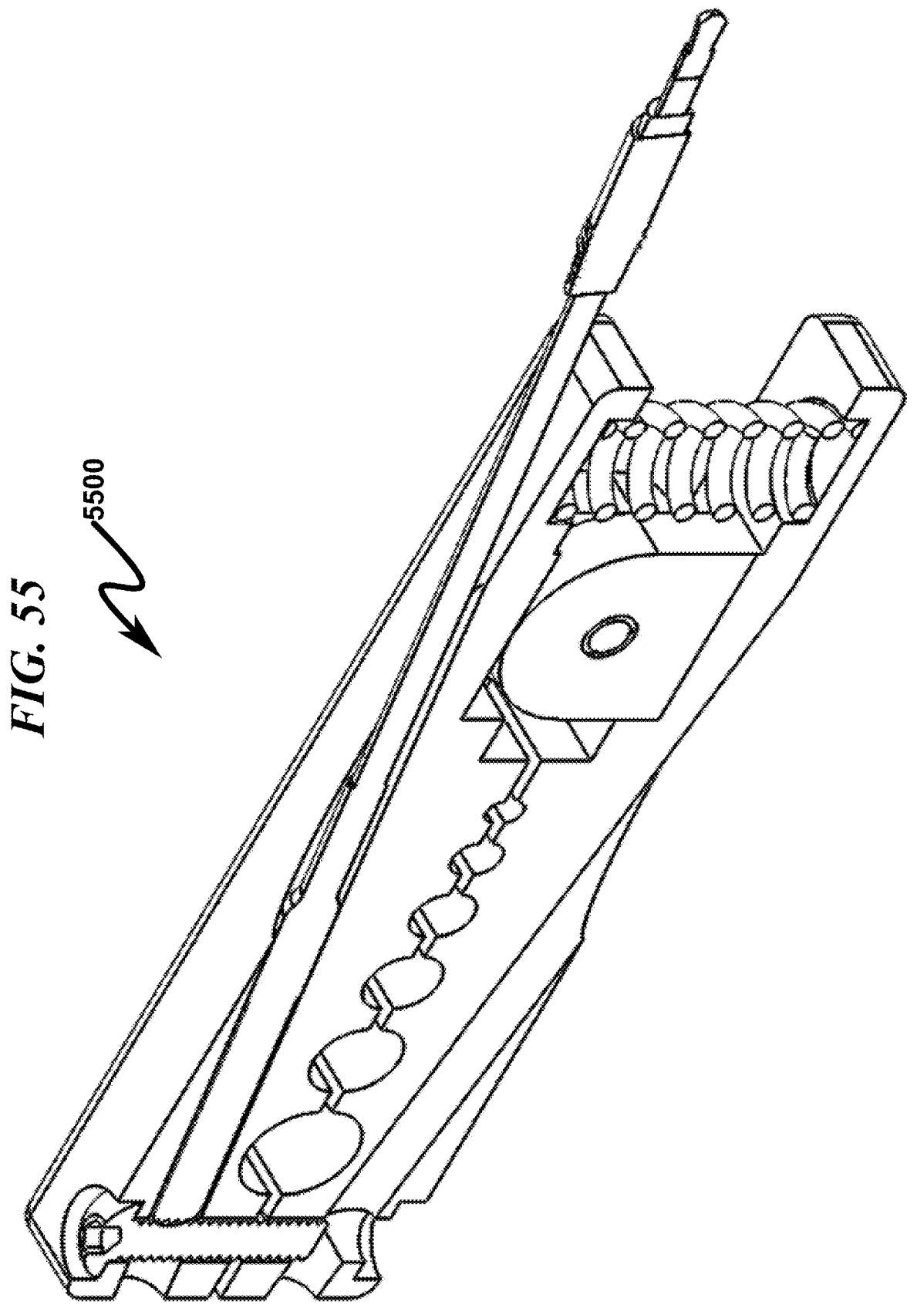
FIG. 55 illustrates a top right front perspective section view of a preferred exemplary THS spring-loaded thermal contact clamp (TCS)

FIG. 30 (3000), FIG. 39 (3900), and FIG. 55 (5500). Furthermore, each provides for positive locking around the HVAC pipe (or other article) to be thermally inspected via the use of a screw and mating threads at the terminal end of the TCC/TCS. Given the inherent vibration in HVAC plumbing systems, this is an important characteristic. The use of positive locking also permits each clamp to be bolted to items within the HVAC system that are NOT plumbing related, such as air fans, air plenums and the like. Thus, the fixing fastener (1706) may be extended in length to attach to a portion of the HVAC system that is to be thermally monitored. This fixing fastener (1706) may further comprise a magnet (as shown in the exemplary depiction of FIG. 3 (0300) as attached to a TCS embodiment (0322)) for planar attachment to metal air fans, air plenums, and other surfaces not normally serviceable by ordinary temperature/humidity sensors. Thus, the thermal contact clamps depicted can be implemented without the need for excessive parts inventory to address the various situations in which the THS are to be deployed.

The thermal contact clamp (TCC) of FIG. 17 (1700)-FIG. 24 (2400) depicts a scenario in which a typical temperature/humidity sensor (such as a AGS02MA/DT20) is located within the TCC body and secured with thermal epoxy. The thermal contact clamp (TCC) of FIG. 33 (3300)-FIG. 48 (4800) depicts a scenario in which a typical thermal sensor (such as an encapsulated DS18B20) is fixed within the TCC body and secured with thermal epoxy. A variant of this structure is depicted in the spring-loaded thermal contact clamp (TCS) of FIG. 25 (2500)-FIG. 32 (3200) and FIG. 49 (4900)-FIG. 64 (6400) in which the clamping action is spring-loaded and does not necessarily require the use of a fastener to enable the clamping action on the HVAC pipe to be thermally monitored. Note that as depicted in FIG. 25 (2500)-FIG. 32 (3200) the thermal sensor may be located within the clamping action of the TCS in some embodiments. In any case the thermal contact area between the pipe to be thermally monitored and the temperature sensor is maximized using this structure.

RLD System Summary

The present invention system may be broadly generalized as a refrigerant leak detection (RLD) system comprising:

(a) plurality of temperature/humidity sensors (THS);

(b) digital control processor (DCP); and (c) alarm status indicator (ASI);

wherein:

said THS are individually positioned within a heating, ventilation, and air conditioning (HVAC) system and configured to measure refrigerant temperature and/or ambient temperature/humidity values (MTV) within said HVAC system;

said THS communicates said measured MTV to said DCP;

said DCP operates a closed control loop (CCL) that continuously monitors said measured MTV;

said CCL determines continuous differential temperature values (DTV) between said measured MTV;

said DCP triggers a refrigerant leak alarm (RLA) and activates said ASI upon determination by said CCL that said measured MTV are outside a predetermined range; and said DCP triggers said refrigerant leak alarm (RLA) and activates said ASI upon determination by said CCL that said DTV are outside a predetermined range.

This general system summary may be augmented by the various elements described herein to produce a wide variety of invention embodiments consistent with this overall design description.

RLC System Summary

The present invention system in some embodiments may be broadly generalized as a refrigerant leak containment (RLC) system comprising:
- (a) plurality of temperature/humidity sensors (THS);
- (b) digital control processor (DCP);
- (c) alarm status indicator (ASI); and
- (d) one or more refrigerant control valves (RCV);

wherein:

said THS are individually positioned within a heating, ventilation, and air conditioning (HVAC) system and configured to measure refrigerant temperature and/or ambient temperature/humidity values (MTV) within said HVAC system;

said THS communicates said measured MTV to said DCP;

said DCP operates a closed control loop (CCL) that continuously monitors said measured MTV;

said CCL determines continuous differential temperature values (DTV) between said measured MTV;

said DCP triggers a refrigerant leak alarm (RLA) and activates said ASI upon determination by said CCL that said measured MTV are outside a predetermined range;

said DCP triggers said refrigerant leak alarm (RLA) and activates said ASI upon determination by said CCL that said DTV are outside a predetermined range; and said RCV are individually closed on activation of said ASI.

This general system summary may be augmented by the various elements described herein to produce a wide variety of invention embodiments consistent with this overall design description.

RLM System Summary

The present invention system may be broadly generalized as a refrigerant leak mitigation (RLM) system comprising:
- (a) plurality of temperature/humidity sensors (THS);
- (b) digital control processor (DCP);
- (c) alarm status indicator (ASI);
- (d) refrigerant flow valve (RFV); and
- (e) evaporator isolation valve (EIV);

wherein:

said THS are individually positioned within a heating, ventilation, and air conditioning (HVAC) system and configured to measure refrigerant temperature and/or ambient temperature/humidity values (MTV) within said HVAC system;

said THS communicates said measured MTV to said DCP;

said DCP operates a closed control loop (CCL) that continuously monitors said measured MTV;

said CCL determines continuous differential temperature values (DTV) between said measured MTV;

said DCP triggers a refrigerant leak alarm (RLA) and activates said ASI upon determination by said CCL that said measured MTV are outside a predetermined range;

said DCP triggers said refrigerant leak alarm (RLA) and activates said ASI upon determination by said CCL that said DTV are outside a predetermined range; and the DCP is configured to close the RFV and the EIV to isolate the RFC when the RLA on activation of said ASI.

RGL Pre-Validation by DTM Method Summary

A present invention refrigerant leak detection (RLD)/containment (RLC) method utilizing RGL pre-validation by DTM comprises the following steps:
- (1) monitoring HVAC measured temperature/humidity sensor (THS) values (MTV) with a digital control processor (DCP) and generating a differential temperature matrix (DTM) from the MTV values (1301);
- (2) with the DCP, determining if the DTM is out of a predetermined range, and if not, proceeding to step (1) (1302);
- (3) with the DCP, activating a refrigerant gas sensor (RGS) and detecting if a refrigerant gas leak (RGL) is present (1303);
- (4) with the DCP, detecting the presence of a RGL, and if a RGL is not detected, proceeding to step (1) (1304);
- (5) activating an ASI alarm (1305); and
- (6) deactivating HVAC compressor contactors and/or closing refrigerant flow valves to mitigate refrigerant loss in the HVAC system (1306).

This general method may be modified heavily depending on a number of factors, with rearrangement and/or addition/deletion of steps anticipated by the scope of the present invention. Integration of this and other preferred exemplary embodiment methods in conjunction with a variety is anticipated by the overall scope of the present invention.

RGL Post-Validation by DTM Method Summary

A present invention refrigerant leak detection (RLD)/containment (RLC) method utilizing RGL post-validation by DTM comprises the following steps:
- (1) with a digital control processor (DCP), activating a refrigerant gas sensor (RGS) and detecting if a refrigerant gas leak (RGL) is present (1401);
- (2) with the DCP, detecting the presence of a RGL, and if a RGL is not detected, proceeding to step (1) (1402);
- (3) monitoring HVAC temperature/humidity sensor (THS) values (MTV) with a DCP and generating a differential temperature matrix (DTM) from the MTV values (1403);
- (4) with the DCP, determining if the DTM is out of a predetermined range, and if not, proceeding to step (1) (1404);
- (5) activating an ASI alarm (1405); and
- (6) deactivating HVAC compressor contactors and/or closing refrigerant flow valves to mitigate refrigerant loss in the HVAC system (1406).

This general method may be modified heavily depending on a number of factors, with rearrangement and/or addition/deletion of steps anticipated by the scope of the present invention. Integration of this and other preferred exemplary embodiment methods in conjunction with a variety is anticipated by the overall scope of the present invention.

RGL Dual-Validation by DTM Method Summary

A present invention refrigerant leak detection (RLD)/containment (RLC) method utilizing RGL dual-validation by DTM comprises the following steps:

(1) with a digital control processor (DCP), activating a refrigerant gas sensor (RGS) and detecting if a refrigerant gas leak (RGL) is present (1501);

(2) with the DCP, detecting the presence of a RGL, and if a RGL is detected, proceeding to step (5) (1502);

(3) monitoring HVAC temperature/humidity sensor (THS) values (MTV) with a DCP and generating a differential temperature matrix (DTM) from the MTV values (1503);

(4) with the DCP, determining if the DTM is out of a predetermined range, and if not, proceeding to step (1) (1504);

(5) activating an ASI alarm (1505); and (6) deactivating HVAC compressor contactors and/or closing refrigerant flow valves to mitigate refrigerant loss in the HVAC system (1506).

This general method may be modified heavily depending on a number of factors, with rearrangement and/or addition/deletion of steps anticipated by the scope of the present invention. Integration of this and other preferred exemplary embodiment methods in conjunction with a variety is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein at least one of the THS are positioned in thermal contact with an element of the HVAC system, the element selected from a group consisting of: condenser coil (HCC); refrigerant compressor (RFC); evaporator coil (HEC); air intake fan (AIF); air intake plenum (AIP); return air duct (RAD); service air duct (SAD); and temperature controlled environment (TCE) serviced by the HVAC system.

An embodiment wherein the DCP stores the DTV in a differential temperature matrix (DTM) and the DCP inspects the DTM a closed control loop to determine if the DTV between elements of the HVAC system exceed predetermined values and if the predetermined values are exceeded, activating the ASI.

An embodiment further comprising a refrigerant gas sensor (RGS) wherein the DCP pre-validates detection of a refrigerant gas leak (RGL) by the RGS using the DTM.

An embodiment further comprising a refrigerant gas sensor (RGS) wherein the DCP post-validates detection of a refrigerant gas leak (RGL) by the RGS using the DTM.

An embodiment wherein further comprising a refrigerant gas sensor (RGS) wherein the DCP dual-validates detection of a refrigerant gas leak (RGL) by the RGS using the DTM.

An embodiment further comprising a refrigerant gas sensor (RGS) contained within the frame of a door.

An embodiment further comprising a refrigerant gas sensor (RGS) contained within a smoke detector.

An embodiment further comprising a wireless temperature interface (WTI) that is configured to wirelessly communicate the MTV from the THS to the DCP.

An embodiment wherein the THS comprises one or more digital temperature sensors comprising a 1-wire serial interface bus.

An embodiment wherein the DCS further comprises a real-time clock (RTC).

An embodiment wherein the DCP further comprises a sensor record memory (SRM) that logs a measurement time, MTV, and/or DTV associated with the THS.

An embodiment wherein the ASI comprises an alarm indicator selected from a group consisting of: a visual alarm indicator; a digital SCT display; an audible alarm indicator; a wireless alarm indication sent to a mobile user device (MUD) via a wireless communication interface (WCI).

An embodiment wherein the CCL triggers the ASI if the MTV exceeds a predetermined value that is based on an ambient temperature reading provided by one of the THS that is configured to read ambient temperature.

An embodiment wherein the CCL triggers the ASI if the MTV exceeds a predetermined value in the range of 210 degrees Fahrenheit to 225 degrees Fahrenheit.

An embodiment wherein the CCL triggers the ASI if the MTV associated with a THS coupled to a compressor discharge line of the HVAC system exceeds a predetermined value that is based on an ambient temperature reading provided by one of the THS that is configured to read ambient temperature.

An embodiment wherein the CCL triggers the ASI if the MTV associated with a THS coupled to a compressor discharge line of the HVAC system is within a predetermined temperature window (PTW) selected from within outer temperature boundaries (OTB) having a lower temperature limit (LTL) of 210 degrees Fahrenheit and an upper temperature limit (UTL) of 225 degrees Fahrenheit.

An embodiment wherein the CCL triggers the ASI if the DTV associated with one of the THS coupled to a supply air plenum (SAP) of the HVAC system and one of the THS coupled to a return air plenum (RAP) of the HVAC system exhibit a predetermined delta temperature value (DTV) in the range of 15 degrees Fahrenheit to 20 degrees Fahrenheit.

An embodiment wherein the CCL incorporates time delays to account for dynamic response characteristics in the THS.

An embodiment wherein the DCP is configured to transmit an indication of the ASI via a wireless communication interface (WCI) to a mobile user device (MUD).

One skilled in the art will recognize that other embodiments are possible based on combinations of elements taught within the above invention description.

CONCLUSION

A refrigerant leak detection (RLD) and/or mitigation/containment (RLM/RLC) system/method for use in heating, ventilation, and air conditioning (HVAC) systems that incorporates a plurality of temperature and/or humidity sensors (THS), alarm status indicator (ASI), and digital control processor (DCP) has been disclosed. The THS are positioned within the HVAC system (condenser coils (HCC), evaporator coils (HEC), air intake fans (AIF), air supply plenums (ASP), air return plenums (ARP), and/or temperature controlled environment (TCE)) and reports THS temperature readings to the DCP via a common temperature sensor bus (TSB) and/or a wireless temperature interface (WTI). The DCP interprets THS temperature readings in a closed control loop (CCL) to dynamically determine if a refrigerant leak has occurred within the HVAC system. If a leak is detected, the DCP activates the ASI and optionally one or more refrigerant control valves (RCV) is closed to limit refrigerant leakage in the HVAC system.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A refrigerant leak detection (RLD) system comprising:
(a) plurality of temperature/humidity sensors (THS);
(b) refrigerant gas sensor (RGS);
(c) digital control processor (DCP); and
(d) alarm status indicator (ASI);
wherein:
said THS are individually positioned within a heating, ventilation, and air conditioning (HVAC) system and configured to measure refrigerant temperature and/or ambient temperature/humidity values (MTV) within said HVAC system;
said THS communicates said measured MTV to said DCP;
said DCP operates a closed control loop (CCL) that continuously monitors said measured MTV;
said CCL determines continuous differential temperature values (DTV) between said measured MTV;
said DCP stores said DTV in a differential temperature matrix (DTM);
said DCP triggers a refrigerant leak alarm (RLA) and activates said ASI upon determination by said CCL that said measured MTV are outside a first predetermined range;
said DCP triggers said refrigerant leak alarm (RLA) and activates said ASI upon determination by said CCL that said DTV are outside second predetermined range;
said RGS is configured to indicate a refrigerant gas leak (RGL) status in said HVAC system to said DCP;
said DCP operates a closed control loop (CCL) that continuously monitors said RGL status;
said DCP triggers said refrigerant leak alarm (RLA) and activates said ASI upon determination by said CCL that said RGL is indicated by said RGS; and
said DCP qualifies/validates a combination of said measured MTV, said DTV, and/or said RGL status in order to determine if said RLA is triggered and said ASI is activated.

2. The refrigerant leak detection (RLD) system of claim 1 wherein at least one of said THS are positioned in thermal contact with an element of said HVAC system, said element selected from a group consisting of: condenser coil (HCC); refrigerant compressor (RFC); evaporator coil (HEC); air intake fan (AIF); air intake plenum (AIP); return air duct (RAD); service air duct (SAD); and temperature controlled environment (TCE) serviced by said HVAC system.

3. The refrigerant leak detection (RLD) system of claim 1 wherein said DCP inspects said DTM a closed control loop to determine if said DTV between elements of said HVAC system exceed predetermined values and if said predetermined values are exceeded, activating said ASI.

4. The refrigerant leak detection (RLD) system of claim 1 wherein said validation is selected from a group consisting of: pre-validation; post-validation; and dual-validation.

5. The refrigerant leak detection (RLD) system of claim 1 wherein said THS comprises a thermal contact clamp (TCC) configured to make thermal contact with HVAC piping.

6. The refrigerant leak detection (RLD) system of claim 1 wherein said THS comprises a spring-loaded thermal contact clamp (TCS) configured to make thermal contact with HVAC piping.

7. The refrigerant leak detection (RLD) system of claim 1 wherein said RGS is contained within a door frame.

8. The refrigerant leak detection (RLD) system of claim 1 wherein said RGS is contained within a smoke detector.

9. The refrigerant leak detection (RLD) system of claim 1 further comprising wireless temperature interface (WTI) that is configured to wirelessly communicate said MTV from said THS to said DCP.

10. The refrigerant leak detection (RLD) system of claim 1 wherein said THS comprises one or more digital temperature sensors comprising a 1-wire serial interface bus.

11. The refrigerant leak detection (RLD) system of claim 1 wherein said DCS further comprises a real-time clock (RTC).

12. The refrigerant leak detection (RLD) system of claim 1 wherein said DCP further comprises a sensor record memory (SRM) that logs a measurement time, MTV, and/or DTV associated with said THS.

13. The refrigerant leak detection (RLD) system of claim 1 wherein said ASI comprises an alarm indicator selected from a group consisting of: a visual alarm indicator; a digital SCT display; an audible alarm indicator; and wireless alarm indication sent to a mobile user device (MUD) via a wireless communication interface (WCI).

14. The refrigerant leak detection (RLD) system of claim 1 wherein said CCL triggers said ASI if said MTV exceeds a predetermined value that is based on an ambient temperature reading provided by one of said THS that is configured to read ambient temperature.

15. The refrigerant leak detection (RLD) system of claim 1 wherein said CCL triggers said ASI if said MTV exceeds a predetermined value in the range of 210 degrees Fahrenheit to 225 degrees Fahrenheit.

16. The refrigerant leak detection (RLD) system of claim 1 wherein said CCL triggers said ASI if said MTV associated with a THS coupled to a compressor discharge line of said HVAC system exceeds a predetermined value that is based on an ambient temperature reading provided by one of said THS that is configured to read ambient temperature.

17. The refrigerant leak detection (RLD) system of claim 1 wherein said CCL triggers said ASI if said MTV associated with a THS coupled to a compressor discharge line of said HVAC system is within a predetermined temperature window (PTW) selected from within outer temperature boundaries (OTB) having a lower temperature limit (LTL) of 210 degrees Fahrenheit and an upper temperature limit (UTL) of 225 degrees Fahrenheit.

18. The refrigerant leak detection (RLD) system of claim 1 wherein said CCL triggers said ASI if said DTV associated with one of said THS coupled to a supply air plenum (SAP) of said HVAC system and one of said THS coupled to a return air plenum (RAP) of said HVAC system exhibit a predetermined delta temperature value (DTV) in the range of 15 degrees Fahrenheit to 20 degrees Fahrenheit.

19. The refrigerant leak detection (RLD) system of claim 1 wherein said CCL incorporates time delays to account for dynamic response characteristics in said THS.

20. The refrigerant leak detection (RLD) system of claim 1 wherein said DCP is configured to transmit an indication of said ASI via a wireless communication interface (WCI) to a mobile user device (MUD).

* * * * *